US012049097B2

(12) United States Patent
Loginov et al.

(10) Patent No.: US 12,049,097 B2
(45) Date of Patent: Jul. 30, 2024

(54) SECURITY DOCUMENTS OR ARTICLES COMPRISING OPTICAL EFFECT LAYERS COMPRISING MAGNETIC OR MAGNETIZABLE PIGMENT PARTICLES AND METHODS FOR PRODUCING SAID OPTICAL EFFECT LAYERS

(71) Applicant: SICPA HOLDING SA, Prilly (CH)

(72) Inventors: Evgeny Loginov, Renens (CH); Andrea Callegari, Ecublens (CH); Claude-Alain Despland, Bussigny (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 18/023,914

(22) PCT Filed: Aug. 30, 2021

(86) PCT No.: PCT/EP2021/073863
§ 371 (c)(1),
(2) Date: Feb. 28, 2023

(87) PCT Pub. No.: WO2022/049024
PCT Pub. Date: Mar. 10, 2022

(65) Prior Publication Data

US 2023/0311556 A1 Oct. 5, 2023

(30) Foreign Application Priority Data

Sep. 2, 2020 (EP) .................................... 20194060

(51) Int. Cl.
*B42D 25/369* (2014.01)
*B42D 25/378* (2014.01)

(52) U.S. Cl.
CPC ......... *B42D 25/369* (2014.10); *B42D 25/378* (2014.10)

(58) Field of Classification Search
CPC .................................................... B42D 25/369
(Continued)

(56) References Cited

U.S. PATENT DOCUMENTS 2,418,479 A 4/1947 Pratt et al.
2,570,856 A 10/1951 Pratt et al.
(Continued)

FOREIGN PATENT DOCUMENTS

DE 2006848 9/1971
EP 0406667 1/1995
(Continued)

OTHER PUBLICATIONS

Extended European Search Report issued with respect to application No. 20194060.8.
(Continued)

*Primary Examiner* — Justin V Lewis
(74) *Attorney, Agent, or Firm* — Muncy, Geissler, Olds & Lowe, P.C.

(57) ABSTRACT

The invention relates to the field of the protection of security documents such as for example banknotes and identity documents against counterfeit and illegal reproduction. In particular, the present invention provides security documents and decorative articles comprising one or more optical effect layers (OELs) and methods for producing said OELs, said OELs comprising magnetically oriented platelet-shaped magnetic or magnetizable pigment particles in an at least partially cured coating layer (x10) and exhibiting an eye-catching optical effect thus allowing an observer to easily authenticate said OELs upon titling at viewing/observation angles between about −45° and about +45°.

19 Claims, 29 Drawing Sheets

(58) Field of Classification Search
USPC .......................... 283/67, 72, 82, 94, 98, 901
See application file for complete search history.

(56) References Cited

U.S. PATENT DOCUMENTS

| | | | |
|---|---|---|---|
| 3,676,273 | A | 7/1972 | Graves |
| 3,791,864 | A | 2/1974 | Steingroever |
| 4,838,648 | A | 6/1989 | Phillips et al. |
| 5,364,689 | A | 11/1994 | Kashiwagi et al. |
| 5,630,877 | A | 5/1997 | Kashiwagi et al. |
| 6,103,361 | A | 8/2000 | Batzar et al. |
| 6,410,130 | B1 | 6/2002 | Schuhmacher et al. |
| 6,531,221 | B1 | 3/2003 | Schuhmacher et al. |
| 6,582,781 | B1 | 6/2003 | Schuhmacher et al. |
| 6,838,166 | B2 | 1/2005 | Phillips et al. |
| 7,047,883 | B2 | 5/2006 | Raksha et al. |
| 2002/0160194 | A1 | 10/2002 | Phillips et al. |
| 2004/0009308 | A1 | 1/2004 | Schlaf et al. |
| 2007/0200002 | A1* | 8/2007 | Raksha ................ B42D 25/378 235/494 |

FOREIGN PATENT DOCUMENTS

| | | |
|---|---|---|
| EP | 0710508 | 5/1996 |
| EP | 0686675 | 2/1998 |
| EP | 1826731 | 8/2007 |
| EP | 1854852 | 11/2007 |
| EP | 2157141 | 2/2010 |
| EP | 2468423 | 6/2012 |
| EP | 2402401 | 11/2013 |
| EP | 2484455 | 12/2014 |
| EP | 2846932 | 3/2018 |
| EP | 3587500 | 1/2020 |
| KR | 20160083578 | 7/2016 |
| WO | 200209002 | 1/2002 |
| WO | 2002073250 | 9/2002 |
| WO | 2002090002 | 11/2002 |
| WO | 2003000801 | 1/2003 |
| WO | 2004007095 | 1/2004 |
| WO | 2005002866 | 1/2005 |
| WO | 2006061301 | 6/2006 |
| WO | 2006063926 | 6/2006 |
| WO | 2007131833 | 11/2007 |
| WO | 2010058026 | 5/2010 |
| WO | 2015018663 | 2/2015 |
| WO | 2016083259 | 6/2016 |
| WO | 2017021504 | 2/2017 |
| WO | 2018019594 | 2/2018 |
| WO | 2019038371 | 2/2019 |
| WO | 2019103937 | 5/2019 |
| WO | 2020006286 | 1/2020 |
| WO | 2020148076 | 7/2020 |

OTHER PUBLICATIONS

International Search Report and Written Opinion issued with respect to application No. PCT/EP2021/073863.

* cited by examiner

Fig. 4A1
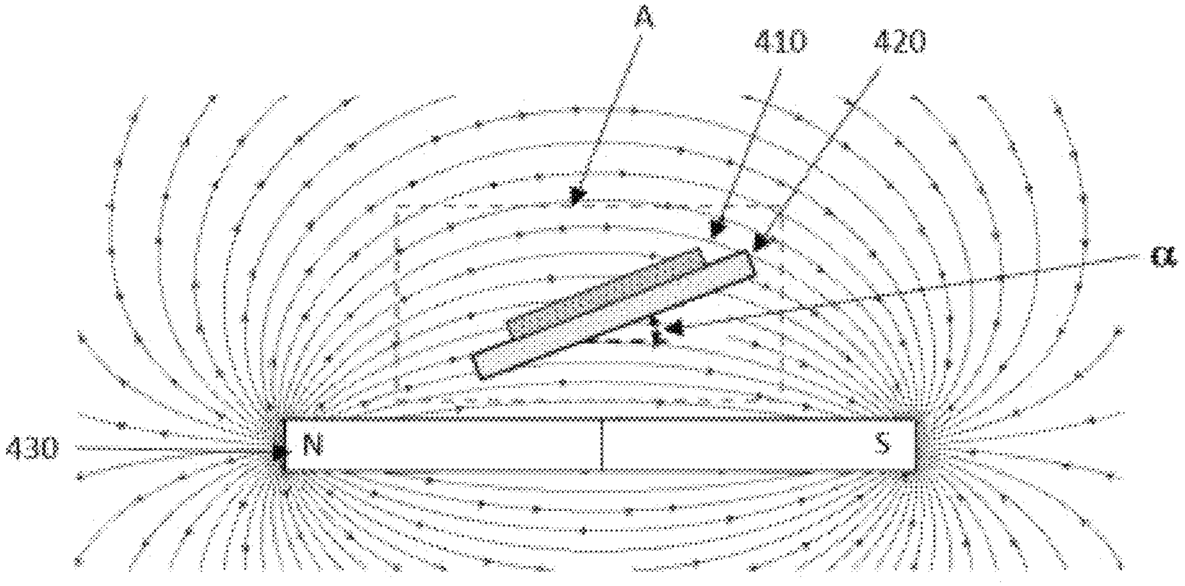

Fig. 4A2
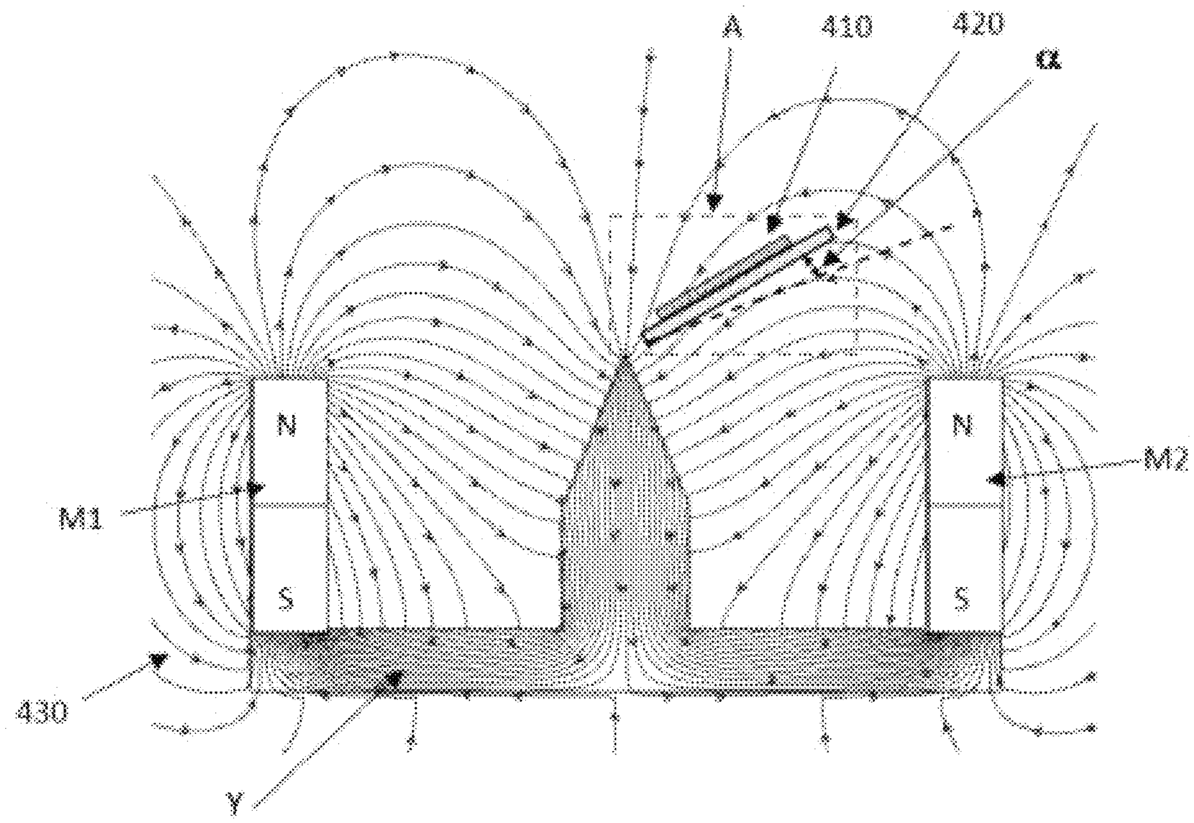

Fig. 4B1
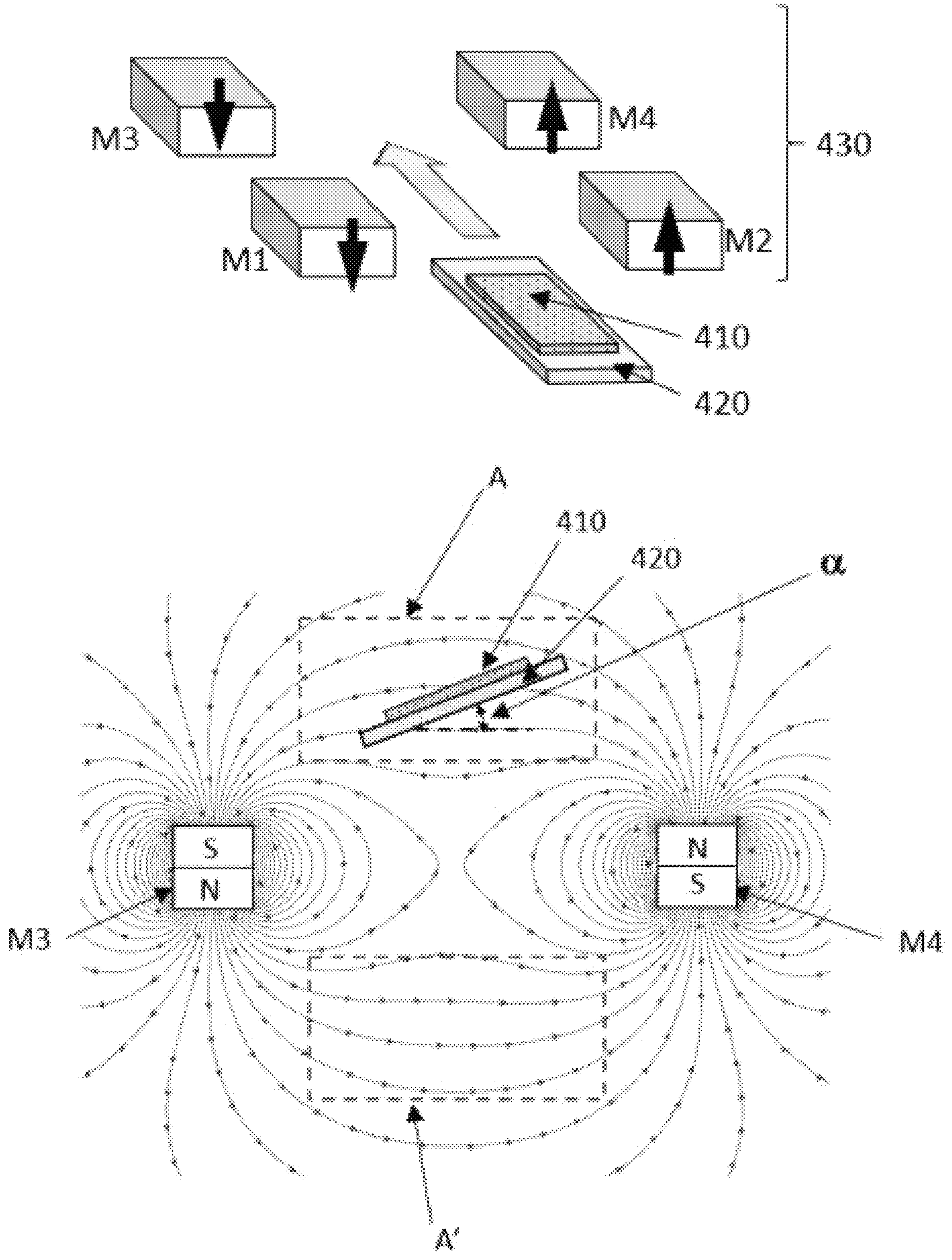

Fig. 4B2
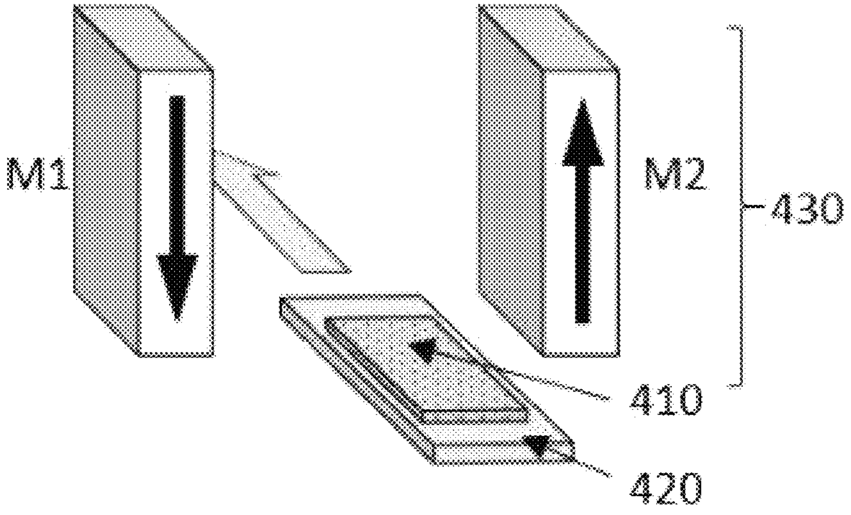
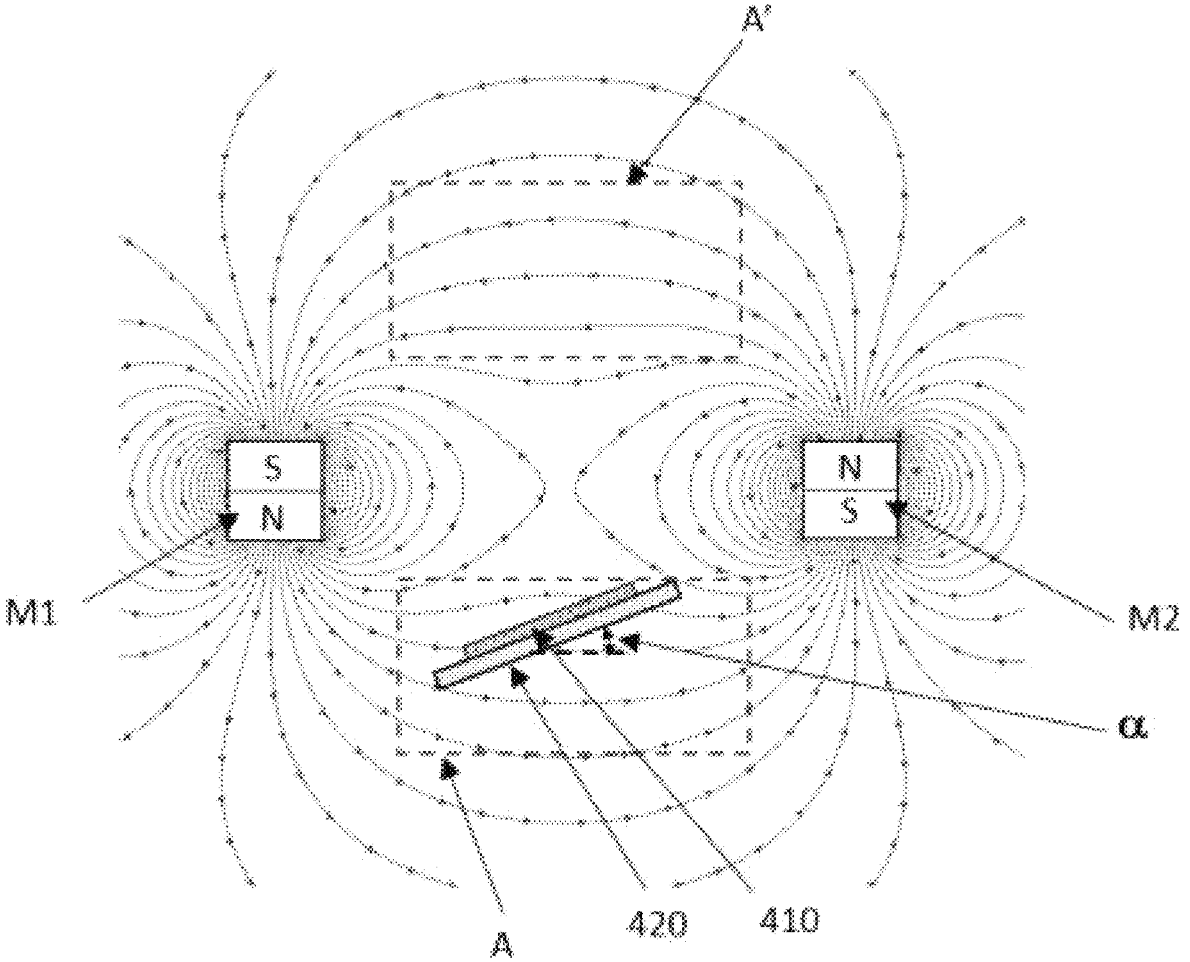

Fig. 4B3
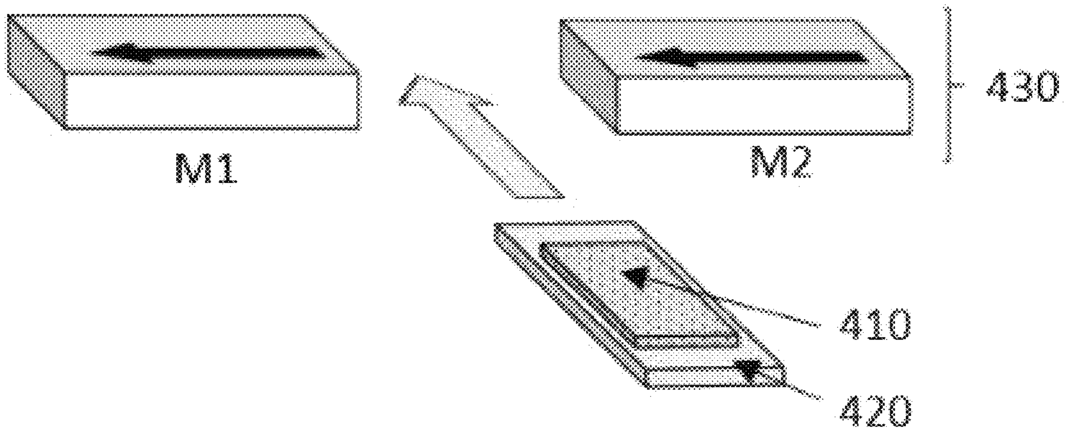
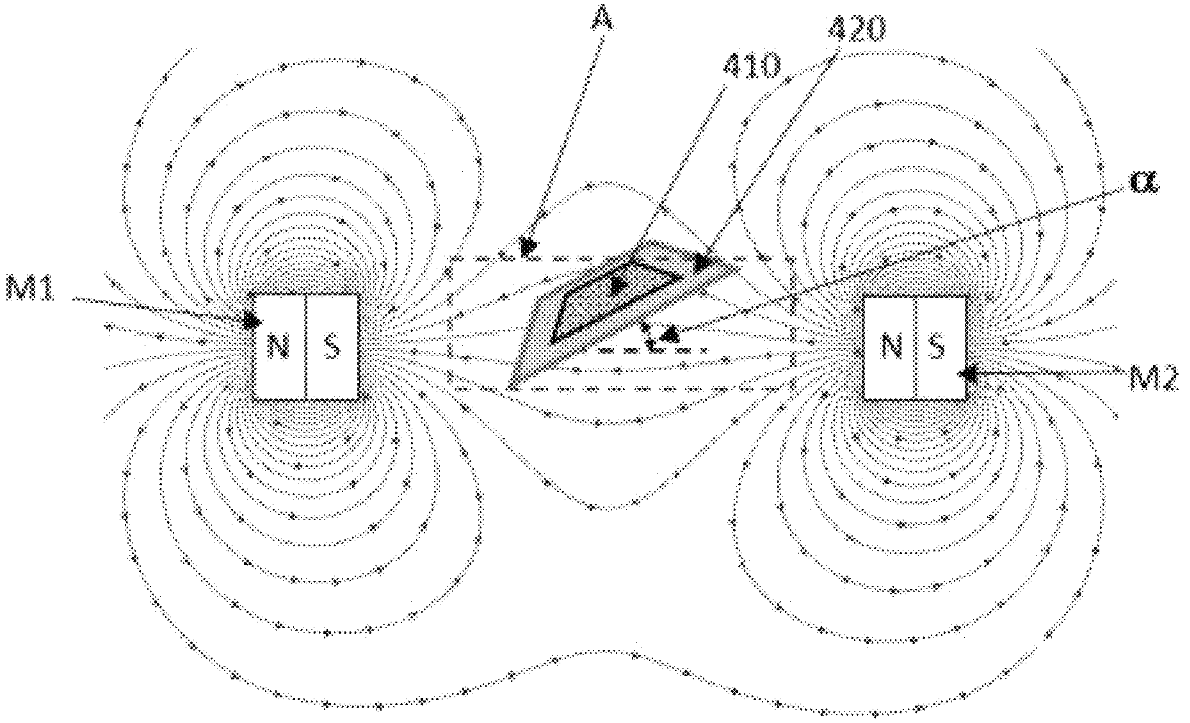

Fig. 4B4
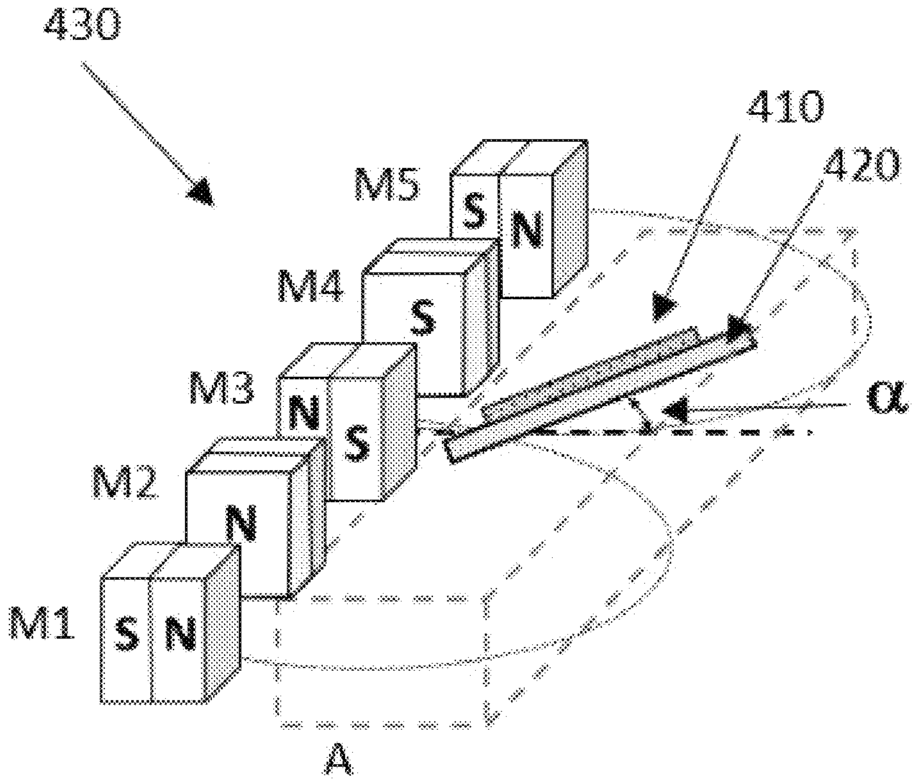

Fig. 4B4 (Cont.)
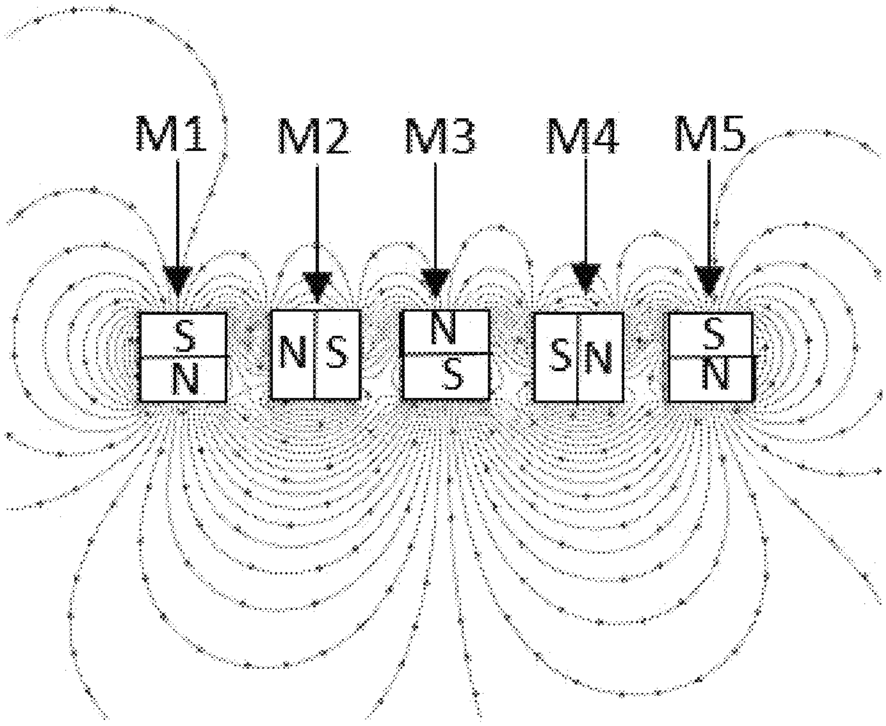

Fig. 4B5
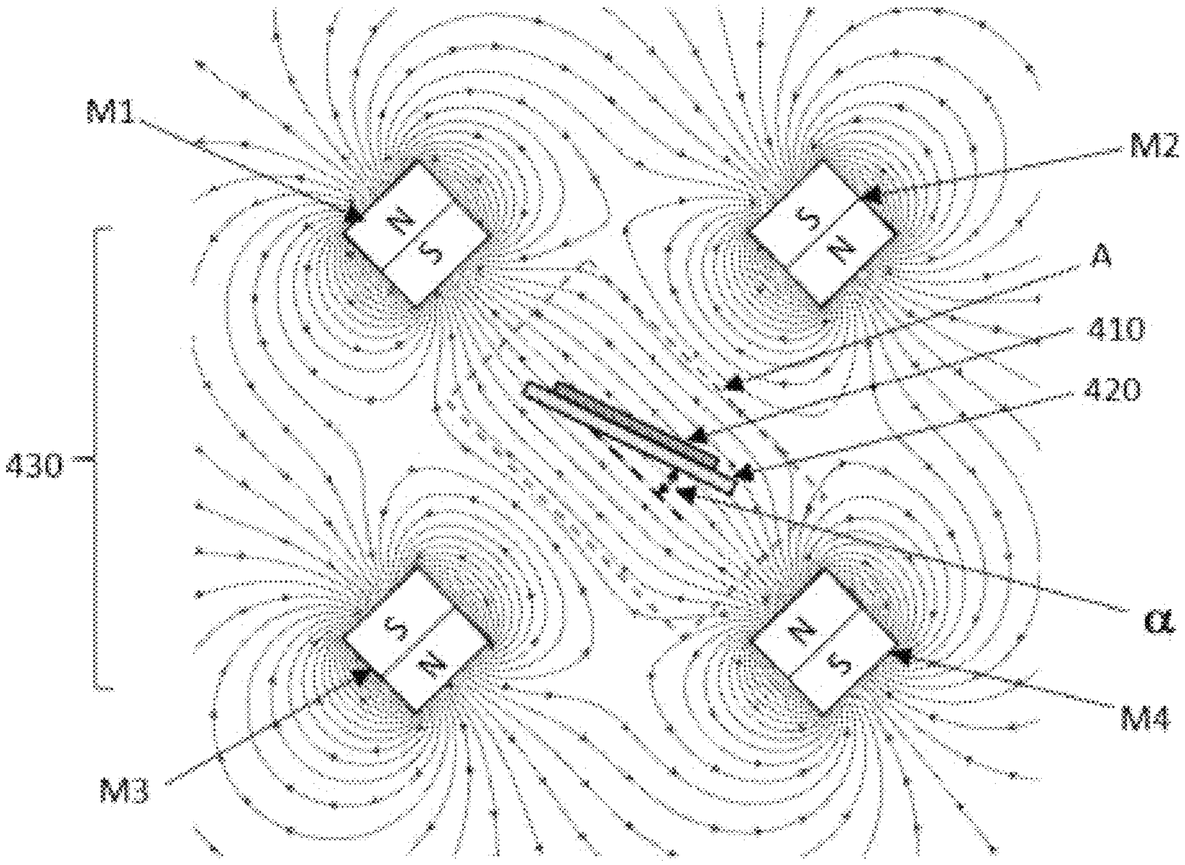

Fig. 4B6
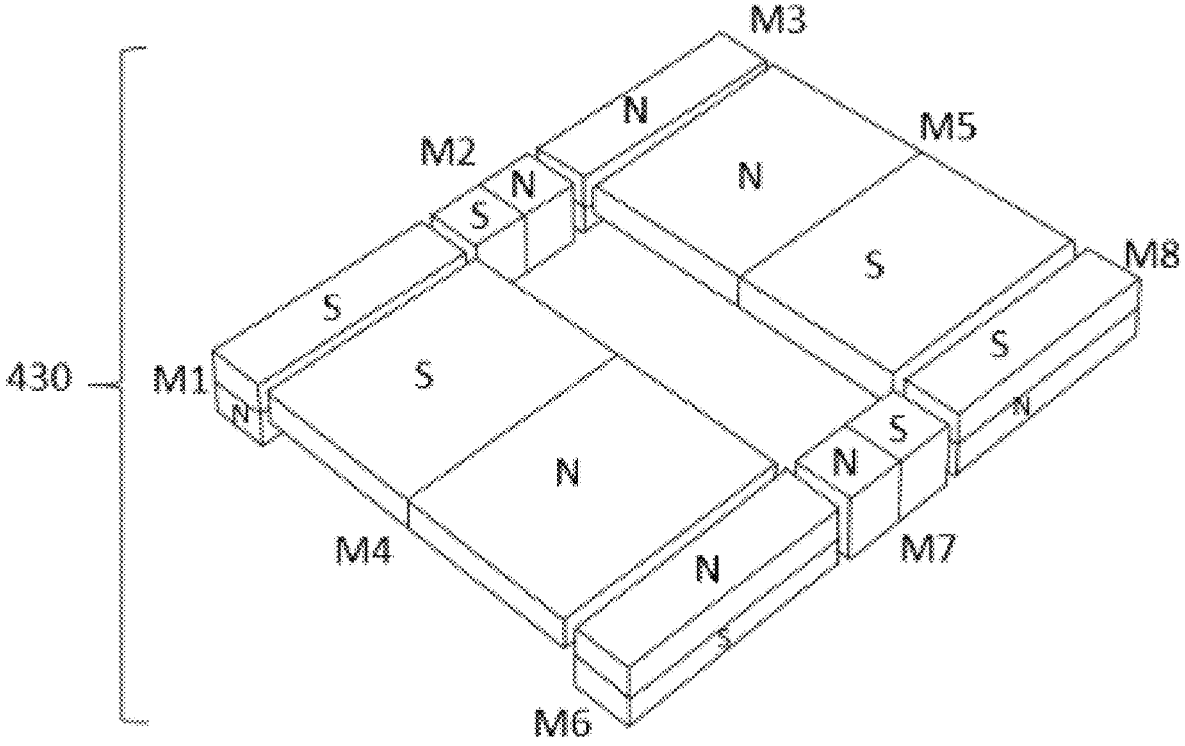

Fig. 4B6 (Cont.)
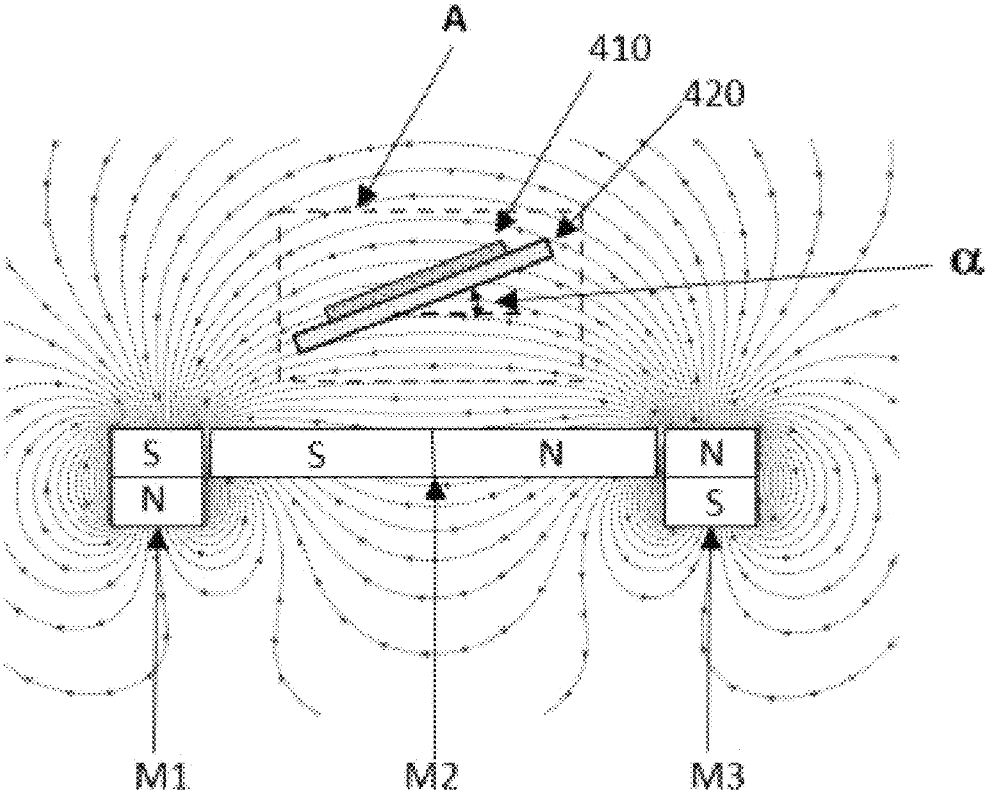

Fig. 5A1
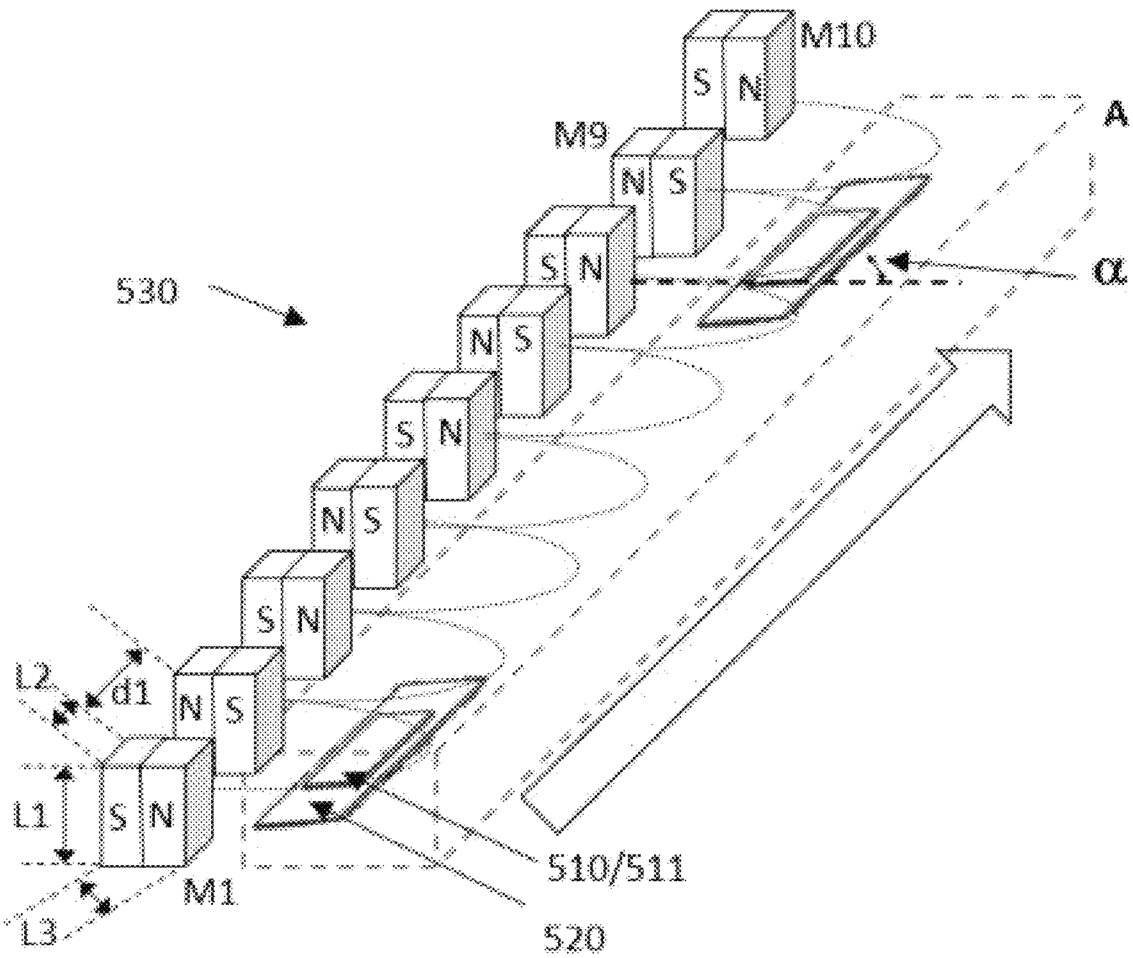
Fig. 5A2
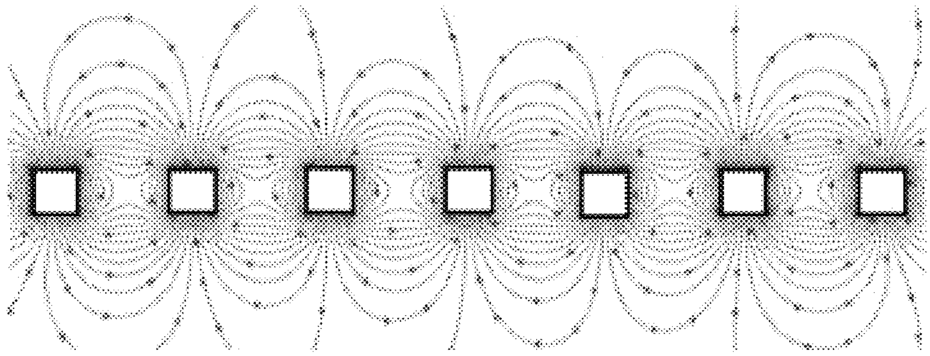

Fig. 5A3
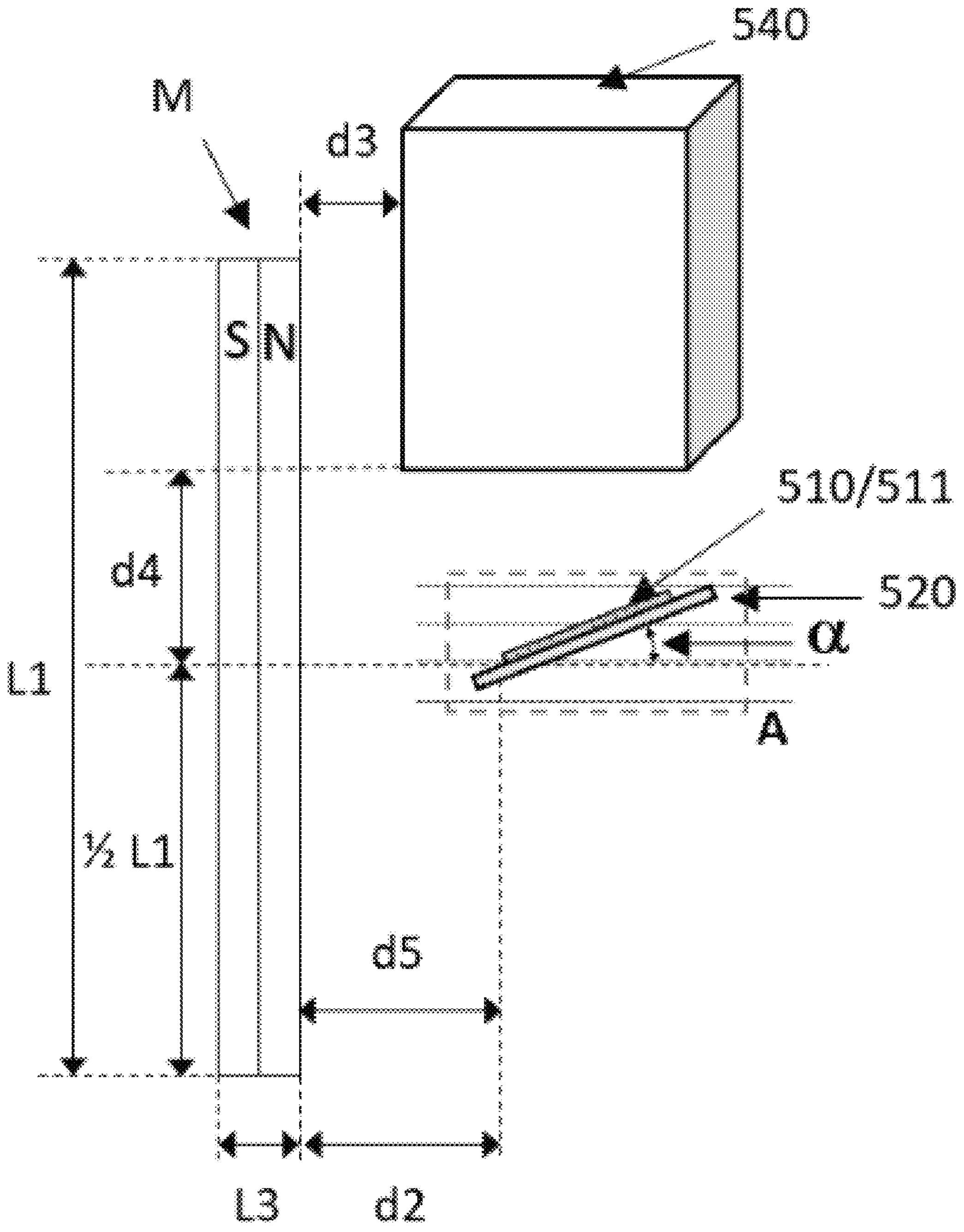

Fig. 6B1
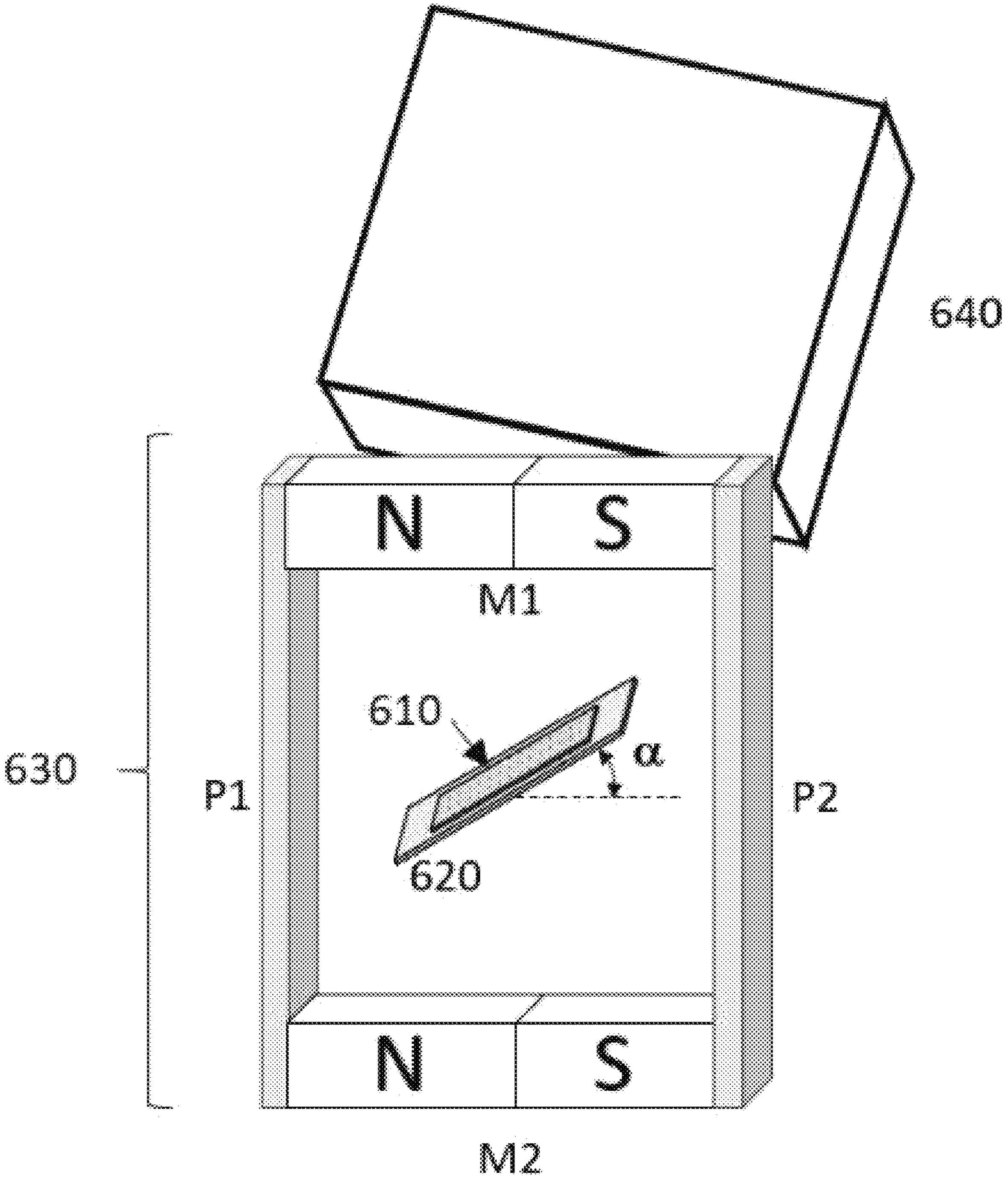

Fig. 6B2
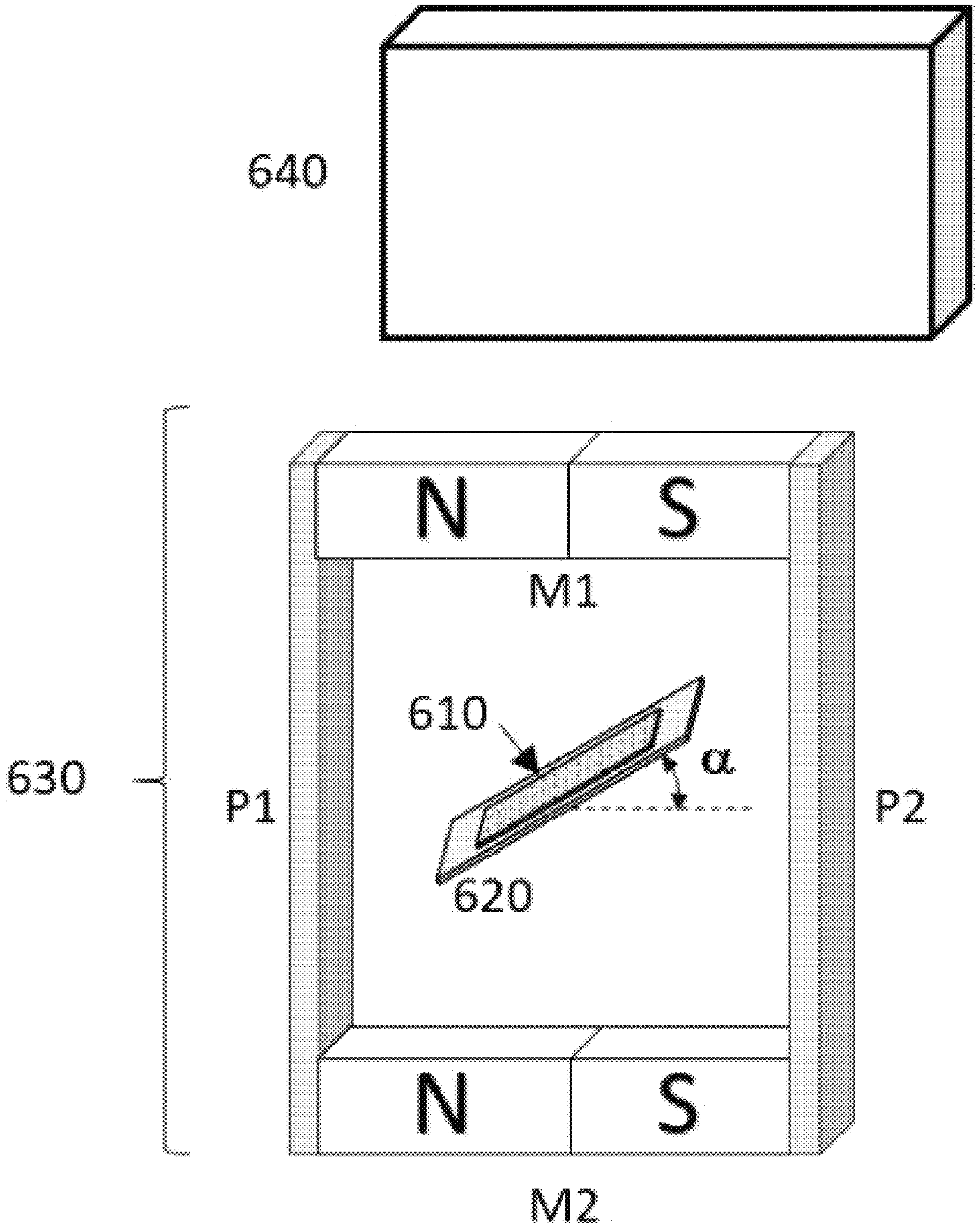

Fig. 8 (Cont.)
| Observation angle θ | E6 | Observation angle θ | E6 |
|---|---|---|---|
| 0° | 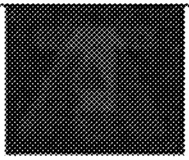 | -50° | 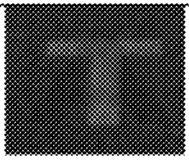 |
| -5° | 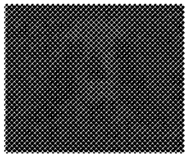 | -55° | 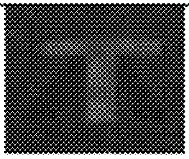 |
| -10° | 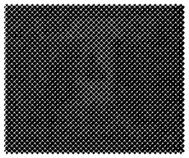 | -60° | 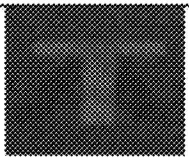 |
| -15° | 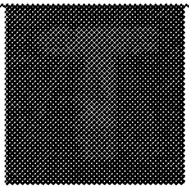 | -65° | 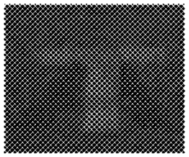 |
| -20° | 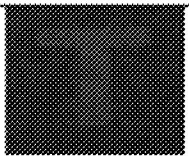 | -70° | 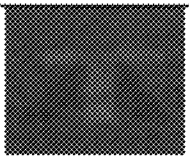 |

SECURITY DOCUMENTS OR ARTICLES COMPRISING OPTICAL EFFECT LAYERS COMPRISING MAGNETIC OR MAGNETIZABLE PIGMENT PARTICLES AND METHODS FOR PRODUCING SAID OPTICAL EFFECT LAYERS

FIELD OF THE INVENTION

The present invention relates to the field of optical effect layers (OELs) comprising magnetically oriented magnetic or magnetizable pigment particles. In particular, the present invention provides security documents and decorative articles comprising one or more optical effect layers (OELs) and methods for producing said OELs and the use of said OELs as anti-counterfeit means on security documents or security articles as well as decorative purposes.

BACKGROUND OF THE INVENTION

It is known in the art to use inks, compositions, coatings or layers containing oriented magnetic or magnetizable pigment particles, particularly also optically variable magnetic or magnetizable pigment particles, for the production of security elements, e.g. in the field of security documents. Coatings or layers comprising oriented magnetic or magnetizable pigment particles are disclosed for example in U.S. Pat. Nos. 2,570,856; 3,676,273; 3,791,864; 5,630,877 and 5,364,689. Coatings or layers comprising oriented magnetic color-shifting pigment particles, resulting in particularly appealing optical effects, useful for the protection of security documents, have been disclosed in WO 2002/090002 A2 and WO 2005/002866 A1.

Security features, e.g. for security documents, can generally be classified into "covert" security features on the one hand, and "overt" security features on the other hand. The protection provided by covert security features relies on the principle that such features are difficult to detect, typically requiring specialized equipment and knowledge for detection, whereas "overt" security features rely on the concept of being easily detectable with the unaided human senses, e.g. such features may be visible and/or detectable via the tactile sense while still being difficult to produce and/or to copy. However, the effectiveness of overt security features depends to a great extent on their easy recognition as a security feature.

Magnetic or magnetizable pigment particles in printing inks or coatings allow for the production of magnetically induced images, designs and/or patterns through the application of a correspondingly structured magnetic field, inducing a local orientation of the magnetic or magnetizable pigment particles in the not yet hardened/cured (i.e. wet) coating, followed by the hardening of the coating. The result is a fixed and stable magnetically induced image, design or pattern. Materials and technologies for the orientation of magnetic or magnetizable pigment particles in coating compositions have been disclosed for example in U.S. Pat. Nos. 2,418,479; 2,570,856; 3,791,864, DE 2006848-A, U.S. Pat. Nos. 3,676,273, 5,364,689, 6,103,361, EP 0 406 667 B1; US 2002/0160194; US 2004/0009308; EP 0 710 508 A1; WO 2002/09002 A2; WO 2003/000801 A2; WO 2005/002866 A1; WO 2006/061301 A1. In such a way, magnetically induced patterns which are highly resistant to counterfeit can be produced. The security element in question can only be produced by having access to both, the magnetic or magnetizable pigment particles or the corresponding ink, and the particular technology employed to print said ink and to orient said pigment in the printed ink.

As described for example in WO 2015/018663 A1, it is known in the art that high contrast, brightness and reflectivity are essential for overt security features comprising of magnetically oriented pigments or particles.

According to the magnetic orientation pattern of the magnetic or magnetizable pigment particles an optical effect layer (OEL) and to the observation direction, said OEL may display bright and dark areas. The optical properties of specific zones of the OEL are directly dependent on the orientation of the magnetic or magnetizable pigment particles in the coating layer forming said OEL.

EP 2 484 455 B1 discloses OELs comprising jointly visible zones of a first and second hardened coating compositions comprising pigment particles oriented to imitate a first and a second curved surfaces. As disclosed in EP 2 484 455 B1 and the prior art cited therein in [003], in particular WO 2004/007095 A2, coating compositions comprising pigment particles oriented to imitate a curved surface produce a specular reflection zone that would be seen by an observer as a bright zone moving upon tilting the substrate carrying the coating composition (i.e. upon varying the observation direction).

EP 2 846 932 B1 discloses OELs with platelet-shaped magnetic or magnetizable pigment particles oriented such as to display a pattern of bright and dark areas which appear to move, or to appear and disappear when the viewing angle of the optical effect layer changes. As disclosed in [0046], based on their shape, the particles have their maximum reflectivity (maximum projection area) in a direction perpendicular to their extended surface, and accordingly, at orthogonal view, in the image of the OEL, the bright areas correspond to particles whose orientation approximately matches that of the surface, i.e. which have a low angle θ with respect to the surface of the OEL such that the incident light is substantially reflected back in the same (orthogonal) direction.

In the field of authenticating an overt security element comprising magnetically oriented platelet-shaped magnetic or magnetizable pigment particles, an observer tilts said security element so as to verify its genuineness from a normal direction (i.e. an observation direction perpendicular to the substrate surface carrying the security element) to grazing angles (i.e. observation directions substantially parallel to the substrate surface), i.e. from ±90°. However, non-expert observers, even though they have been trained about the security element, typically tilt the security element in a narrower range, typically at not larger than ±45° from the normal to the substrate onto which said element is present. Furthermore, the man in the street may not always benefit from the best illumination conditions for the inspection/authentication of the security element.

Prior art documents do not provide any information of the orientation and suitable elevation angles of magnetically oriented particles to produce OELs that exhibit a significative and observable variation (i.e. increase and decrease) of brightness upon conventional tilting by an observer in the process of authenticating said element.

Therefore, a need remains for optical effect layers (OELs) and methods for producing said OELs, said OELs exhibiting an eye-catching and easily recognizable visual appearance by exhibiting highly contrasting highly reflective (bright) and non-reflective (dark) areas at suitable observation angles for the man in the street so at to easily authenticate of said OEL.

SUMMARY OF THE INVENTION

Accordingly, it is an object of the present invention to overcome the deficiencies of the prior art.

This is achieved by the provision of a security document or a decorative object comprising a substrate (x20) having a two-dimensional surface and one or more optical effect layers (OELs) on said substrate (x20), wherein said one or more optical effect layers (OELs) comprise magnetically oriented platelet-shaped magnetic or magnetizable pigment particles having a main axis X and being in an at least partially cured coating layer (x10), wherein an orientation of the platelet-shaped pigment particles is defined by a platelet vector which is the vector parallel to the main axis X of the particle, wherein the platelet vectors of neighboring platelet-shaped magnetic or magnetizable pigment particles are substantially parallel to each other, and wherein the platelet vectors of the platelet-shaped magnetic or magnetizable pigment particles are angled with respect to the two-dimensional surface of the substrate (x20) at the positions of the particles by an elevation angle γ, said elevation angle γ being larger than 0° and smaller than 30° (0°<γ<30°) or larger than 150° and smaller than 180° (150°<γ<180°), preferably larger than or equal to about 5° and smaller than 30° (5°≤γ<30°) or larger than 150° and smaller than or equal to about 175° (150°<γ≤175), more preferably in the range from about 5° to about 25°(5°γ<25°) or from about 155° to about 175° (155°≤γ≤175°), so that the one or more optical effects layers (OELs) exhibit an increase of brightness to reach a maximum value of brightness and a decrease of brightness within a viewing angle from −45° to +45° of the substrate (x20).

The one or more optical effect layers (OELs) described herein comprise mono-axially oriented platelet-shaped magnetic or magnetizable pigment particles or comprise bi-axially oriented platelet-shaped magnetic or magnetizable pigment particles Also described herein are security documents or articles described herein further comprising one or more indicia, said one or more indicia being present between the substrate (x20) and the one or more optical effect layers (OELs).

Also described herein are security documents or articles described herein, wherein the one or more optical effect layers (OELs) comprise the magnetically oriented platelet-shaped magnetic or magnetizable pigment particles in the at least partially cured coating layer (x10) and comprise magnetically oriented second platelet-shaped magnetic or magnetizable pigment particles in an at least partially cured second coating layer (x11), wherein the at least partially cured second coating layer (x11) is either at least partially or fully overlapping the at least partially cured coating layer (x10), or the at least partially cured second coating layer (x11) is adjacent to the at least partially cured coating layer (x10), or the at least partially cured second coating layer (x11) is spaced apart from the at least partially cured coating layer (x10), wherein the platelet vectors of the second platelet-shaped magnetic or magnetizable pigment particles are angled with respect to the two-dimensional surface of the substrate (x20) at the positions of the particles by an additional elevation angle γ' in the at least partially cured second coating layer (x11), the additional elevation angle γ' being larger than 0° and smaller than 30° (0°<γ'<30°) or larger than 150° and smaller than 180°(150°<γ<180°), said elevation angle γ and additional elevation angle γ' being different from each other and/or being not coplanar.

Also described herein are methods for producing the optical effect layers (OELs) described herein and optical effect layers (OELs) obtained thereof. Also described herein are methods for producing an optical effect layer (OEL) on a substrate (x20) having a two-dimensional surface, said method comprising the steps of:

a) applying on the substrate (x20) surface a radiation curable coating composition comprising platelet-shaped magnetic or magnetizable pigment particles, said radiation curable coating composition being in a first, liquid state so as to form a coating layer (x10);

b) exposing the coating layer (x10) to a magnetic field of a magnetic-field generating device (x30) in one or more areas wherein the magnetic field is substantially homogeneous so as to orient at least a part of the platelet-shaped magnetic or magnetizable pigment particles, wherein the substrate (x20) carrying the coating layer (x10) is provided in said one or more areas wherein the magnetic field is substantially homogeneous with an angle α, formed by the coating layer (x10) and a tangent to magnetic field lines of the magnetic field within the one or more areas wherein the magnetic field is substantially homogeneous being larger than 0° and smaller than 30° (0°<α<30°) or larger than 150° and smaller than 180° (150°<α<180°), preferably larger than or equal to about 5° and smaller than 30° (5°≤α<30°) or larger than 150° and smaller than or equal to about 175°(150°≤α≤175°), more preferably in the range from about 5° to about 25°(5°≤α≤25°) or from about 155° to about 175°(155°≤α≤175°);

c) partially simultaneously with or subsequently to step b), a step of at least partially curing the coating layer (x10) with a curing unit (x40) so as to at least partially fix the position and orientation of the platelet-shaped magnetic or magnetizable pigment particles in the coating layer (x10) so as to produce an at least partially cured coating layer (x10), wherein an orientation of the platelet-shaped pigment particles is defined by a platelet vector which is the vector parallel to the main axis X of the particle, wherein the platelet vectors of neighboring platelet-shaped magnetic or magnetizable pigment particles are substantially parallel to each other, and wherein the platelet vectors of the platelet-shaped magnetic or magnetizable pigment particles are angled with respect to the two-dimensional surface of the substrate (x20) at the positions of the particles by an elevation angle γ, said elevation angle γ being larger than 0° and smaller than 30° (0°<γ<30°) or larger than 150° and smaller than 180°(150°<γ<180°).

The step b) of exposing the coating layer (x10) described herein may be carried out so as to mono-axially orient at least a part of the platelet-shaped magnetic or magnetizable pigment particles so that the platelet vectors of neighboring platelet-shaped magnetic or magnetizable pigment particles are substantially parallel to each other. Alternatively, the step b) of exposing the coating layer (x10) described herein may be carried out so as to bi-axially orient at least a part of the platelet-shaped magnetic or magnetizable pigment particles having the main axis X described herein and a second main axis Y, the orientation being further defined by a second platelet vector which is the vector parallel to the second main axis Y of the particle, so that the platelet vectors of neighboring platelet-shaped magnetic or magnetizable pigment particles are substantially parallel to each other and the second platelet vectors of said neighboring platelet-shaped magnetic or magnetizable pigment particles are substantially parallel to each other.

Also described herein are methods for producing optical effect layers (OELs) comprising the at least partially cured coating layer (x10) comprising the platelet-shaped magnetic or magnetizable pigment particles and an at least partially cured second coating layer (x11) comprising second platelet-shaped magnetic or magnetizable pigment particles, wherein said at least partially cured second coating layer (x11) may be at least partially or fully on said at least partially cured coating layer (x10) or may be at adjacent to or spaced apart from the at least partially cured coating layer (x10), wherein an orientation of each of the second platelet-shaped pigment particles is defined by the platelet vector which is the vector parallel to the main axis X of the second platelet-shaped pigment particles, wherein the platelet vectors of neighboring second platelet-shaped magnetic or magnetizable pigment particles are substantially parallel to each other, and wherein the platelet vectors of the second platelet-shaped magnetic or magnetizable pigment particles are angled with respect to the two-dimensional surface of the substrate (x20) at the positions of the particles by an additional elevation angle γ' being larger than 0° and smaller than 30° (0°<γ'<30°) or larger than 150° and smaller than 180°(150°<γ'<180°), said elevation angle γ and additional elevation angle γ' being different from each other and/or being not coplanar.

The present invention provides optical effect layers (OELs) comprising magnetically oriented magnetic or magnetizable pigment particles having specific elevation angles such as to exhibit highly contrasting highly reflective (bright) and non-reflective (dark) areas upon variation of the tilting angle by the man in the street and under diffuse illumination conditions without requiring complicated manipulations. Therefore, the OELs described herein may be easily authenticated by the man in the street.

BRIEF DESCRIPTION OF DRAWINGS

The security documents or articles comprising the one or more optical effect layers (OELs) described herein and the methods described herein for producing said OELs on substrates (x20) are now described in more details with reference to the drawings and to particular embodiments, wherein FIG. 1 schematically illustrates a front view of an OEL as seen by the man in the street, wherein said man in the street tilts about a tilting axis t the OEL with an observation angles from −45° to +45° so as to easily authenticate an OEL on a substrate having a two-dimensional surface.

FIG. 4A1 schematically illustrates a cross-section of a suitable magnetic-field generating device (430) for mono-axially orienting platelet-shaped magnetic or magnetizable pigment particles in a coating layer (410) on a substrate (420), said device (430) consisting of a bar dipole magnet, wherein the platelet-shaped magnetic or magnetizable pigment particles are exposed to the magnetic field (magnetic field lines shown as lines with arrows pointing from the North Pole to the South Pole) of the magnetic-field generating device (430) in one area wherein the magnetic field is substantially homogeneous (shown as a dotted rectangle A) and wherein the substrate (420) carrying the coating layer (410) is provided in said area A with the angle α.

FIG. 4A2 schematically illustrates a suitable magnetic-field generating device (430) for mono-axially orienting platelet-shaped magnetic or magnetizable pigment particles in a coating layer (410) on a substrate (420), said device (430) consisting of two bar dipole magnets (M1, M2) having a same magnetic direction and an iron yoke (Y), wherein the platelet-shaped magnetic or magnetizable pigment particles are exposed to the magnetic field (magnetic field lines shown as lines with arrows pointing from the North Pole to the South Pole) of the magnetic field of the bar dipole magnet (430) in one area wherein the magnetic field is substantially homogeneous (shown as a dotted rectangle A) and wherein the substrate (420) carrying the coating layer (410) is provided in said area A at the specific angle α.

FIG. 4B1 schematically illustrates (left) a suitable magnetic-field generating device (430) and a cross-section (right) of said device (430) for bi-axially orienting at least a part of platelet-shaped magnetic or magnetizable pigment particles in a coating layer (410) on a substrate (420), said device (430) consisting of a linear arrangement of four dipole magnets (M1-M4) that are positioned in a staggered fashion or in zigzag formation, wherein the platelet-shaped magnetic or magnetizable pigment particles are exposed to the magnetic field (magnetic field lines shown as lines with arrows pointing from the North Pole to the South Pole) of magnetic-field generating device (430) in one area wherein the magnetic field is substantially homogeneous (shown as dotted rectangles A and A') and wherein the substrate (420) carrying the coating layer (410) is provided in said area A (or alternatively in area A') with the angle α.

FIG. 4B2 schematically illustrates (left) a suitable magnetic-field generating device (430) and a cross-section (right) of said device (430) for bi-axially orienting at least a part of platelet-shaped magnetic or magnetizable pigment particles in a coating layer (410) on a substrate (420), said device (430) consisting of two dipole magnets (M1, M2) having an opposite magnetic direction, wherein the platelet-shaped magnetic or magnetizable pigment particles are exposed to the magnetic field (magnetic field lines shown as lines with arrows pointing from the North Pole to the South Pole) of the magnetic-field generating device (430) in one area wherein the magnetic field is substantially homogeneous (shown as dotted rectangles A and A') and wherein the substrate (420) carrying the coating layer (410) is provided in said area A (or alternatively in said area A') with the angle α.

FIG. 4B3 schematically illustrates (left) a suitable magnetic-field generating device (430) and a cross-section (right) of said device (430) for bi-axially orienting at least a part of platelet-shaped magnetic or magnetizable pigment particles in a coating layer (410) on a substrate (420), said device (430) consisting of two dipole magnets (M1, M2) having a same magnetic direction, wherein the platelet-shaped magnetic or magnetizable pigment particles are exposed to the magnetic field (magnetic field lines shown as lines with arrows pointing from the North Pole to the South Pole) of the magnetic-field generating device (430) in one area wherein the magnetic field is substantially homogeneous (shown as a dotted rectangle A) and wherein the substrate (420) carrying the coating layer (410) is provided in said area A with the angle α.

FIG. 4B4 schematically illustrates (left) a suitable magnetic-field generating device (430) and a top view (right) of said device (430) for bi-axially orienting at least a part of platelet-shaped magnetic or magnetizable pigment particles in a coating layer (410) on a substrate (420), said device (430) consisting of a Halbach array comprising five dipole magnets (M1-M5), wherein the platelet-shaped magnetic or magnetizable pigment particles are exposed to the magnetic field (magnetic field lines shown as lines with arrows pointing from the North Pole to the South Pole) of the magnetic-field generating device (430) in one area wherein the magnetic field is substantially homogeneous (shown as a dotted parallelepiped A) and wherein the substrate (420) carrying the coating layer (410) is provided in said area A with the angle α.

FIG. 4B5 schematically illustrates a cross-section of a suitable magnetic-field generating device (430) for bi-axially orienting at least a part of platelet-shaped magnetic or magnetizable pigment particles in a coating layer (410) on a substrate (420), said device (430) consisting of Halbach cylinder assembly comprising four structures, each one comprising a magnet bar (M1-M4) surrounded by a magnet-wire coil (not shown), wherein the platelet-shaped magnetic or magnetizable pigment particles are exposed to the magnetic field (magnetic field lines shown as lines with arrows pointing from the North Pole to the South Pole) of the magnetic-field generating device (430) in one area wherein the magnetic field is substantially homogeneous (shown as a dotted rectangle A) and wherein the substrate (420) carrying the coating layer (410) is provided in said area A with the angle α.

FIG. 4B6 schematically illustrates (left) a suitable magnetic-field generating device (430) and a top view (right) of said device (430) for bi-axially orienting at least a part of platelet-shaped magnetic or magnetizable pigment particles in a coating layer (410) on a substrate (420), said device (430) consisting of an assembly of eight bar dipole magnets (M1-M8), said assembly comprising a first set comprising a first bar dipole magnet (M4) and two second bar dipole magnets (M1, M6), a second set comprising a first bar dipole magnet (M5) and two second bar dipole magnets (M3; M8) and a first pair of third bar dipole magnets (M2, M7), wherein the platelet-shaped magnetic or magnetizable pigment particles are exposed to the magnetic field (magnetic field lines shown as lines with arrows pointing from the North Pole to the South Pole) of the magnetic-field generating device (430) in one area wherein the magnetic field is substantially homogeneous (shown as a dotted rectangle A) and wherein the substrate (420) carrying the coating layer (410) is provided in said area A at the specific angle α.

FIGS. 5A1, 5A2 and 5A3 schematically illustrate an oblique view (FIG. 5A1) and a cross-section (FIG. 5A2-3) of a suitable magnetic-field-generating device (530) for bi-axially orienting platelet-shaped magnetic or magnetizable pigment particles comprised in a coating layer (510) on a substrate (520) and a curing device (540). The magnetic-field-generating device (530) comprise nine bar dipole magnets (M1-M9) with alternating North-South magnetic directions and arranged in a row, wherein the platelet-shaped magnetic or magnetizable pigment particles are exposed to the magnetic field (for illustration purpose, magnets M3-M9 have been shown in FIG. 5A2, magnetic field lines shown as lines with arrows pointing from the North Pole to the South Pole) of the magnetic field of the magnetic-field generating device (530) in one area wherein the magnetic field is substantially homogeneous (shown as a dotted parallelepiped A) and wherein the substrate (520) carrying the coating layer (510) is provided in said area A with the angle α, FIG. 5A3 illustrates a process wherein the at least partially curing step with the curing device (540) is carried out partially simultaneously with the magnetic orientation step.

FIGS. 6A, 6B1 and 6B2 schematically illustrate front views of a magnetic-field-generating device (630) for mono-axially orienting platelet-shaped magnetic or magnetizable pigment particles comprised in a coating layer (610) on a substrate (620) and a curing device (640). The magnetic-field-generating device (630) comprise two bar dipole magnets (M1, M2) and two pole pieces (P1, P2) arranged as a rectangular assembly, wherein the platelet-shaped magnetic or magnetizable pigment particles are exposed to the magnetic field (magnetic field lines shown as lines with arrows pointing from the North Pole to the South Pole) of the magnetic field of the magnetic-field generating device (630) in one area wherein the magnetic field is substantially homogeneous (shown as a dotted rectangle A) and wherein the substrate (620) carrying the coating layer (610) is provided in said area A with the angle α. FIG. 6B1 illustrate a process wherein the at least partially curing step is carried out partially simultaneously with the magnetic orientation step and FIG. 6B2 illustrates a process wherein the at least partially curing step is carried out subsequently to the magnetic orientation step.

Figure 1:
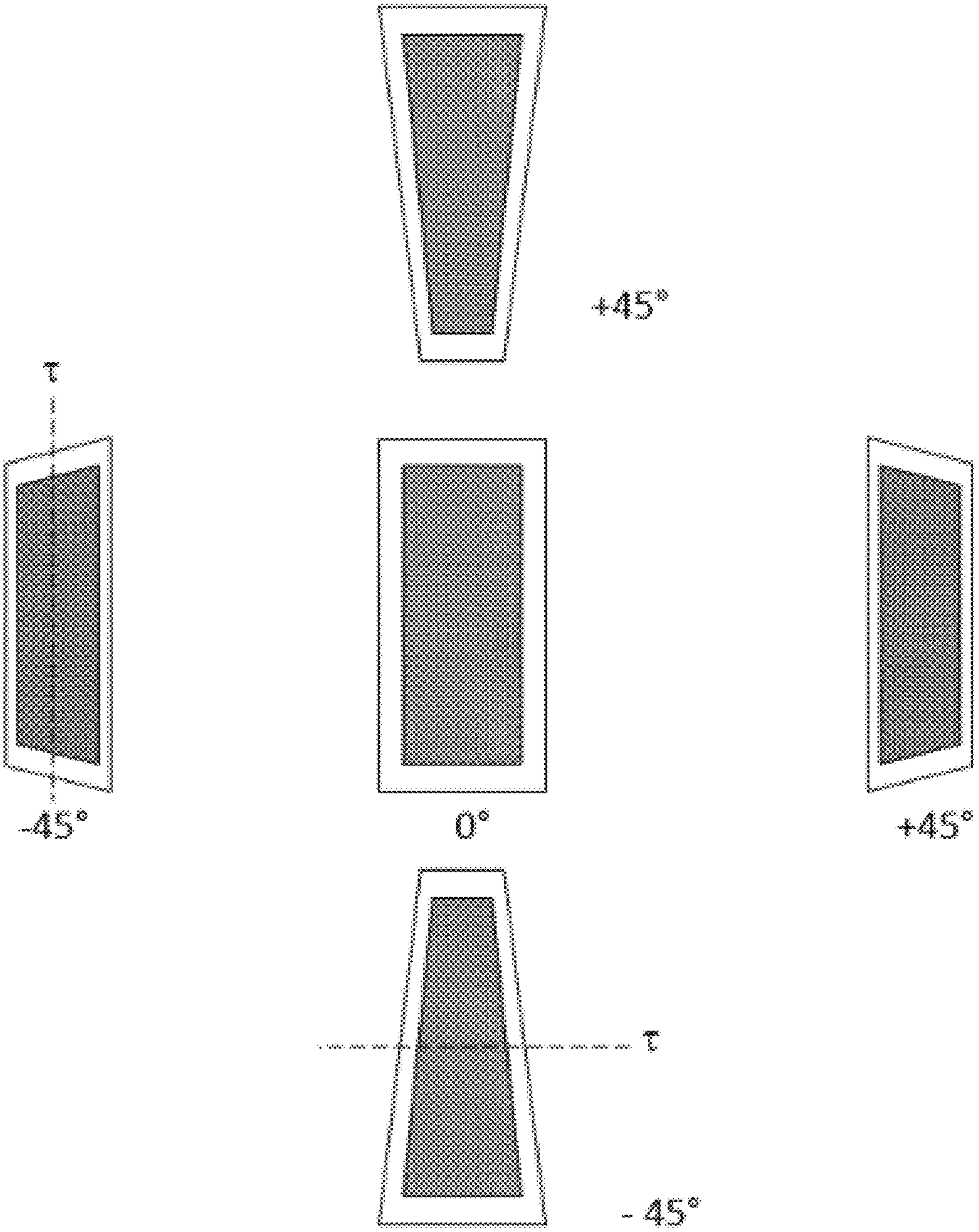

The magnetic field lines (shown as lines with arrows pointing from the North Pole to the South Pole) of the magnetic-field generating device (x30) shown in the figures for illustration purpose have been obtained by simulation, said magnetic field simulations have been performed with the software Vizimag 3.19.

DETAILED DESCRIPTION

Definitions

The following definitions are to be used to interpret the meaning of the terms discussed in the description and recited in the claims.

As used herein, the term "at least one" is meant to define one or more than one, for example one or two or three.

As used herein, the terms "about" and "substantially" mean that the amount or value in question may be the specific value designated or some other value in its neighborhood. Generally, the terms "about" and "substantially" denoting a certain value is intended to denote a range within ±5% of the value. As one example, the phrase "about 100" denotes a range of 100-5, i.e. the range from 95 to 105. Generally, when the term "about" is used, it can be expected that similar results or effects according to the invention can be obtained within a range of ±5% of the indicated value.

The terms "substantially parallel" refer to deviating not more than 2° as averaged on a coating layer surface of at least 1 $mm^2$, or on at least about 100 particles from parallel alignment.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

The term "comprising" as used herein is intended to be non-exclusive and open-ended. Thus, for instance a coating composition comprising a compound A may include other compounds besides A.

However, the term "comprising" also covers, as a particular embodiment thereof, the more restrictive meanings of "consisting essentially of" and "consisting of", so that for instance "a mixture comprising A, B and optionally C" may also (essentially) consist of A and B, or (essentially) consist of A, B and C.

The term "optical effect layer (OEL)" as used herein denotes a coating layer that comprises oriented magnetic or magnetizable pigment particles, wherein said magnetic or magnetizable pigment particles are oriented by a magnetic field and wherein the oriented magnetic or magnetizable pigment particles are fixed/frozen in their orientation and position (i.e. after curing) so as to form a magnetically induced image.

The term "coating composition" refers to any composition which is capable of forming an optical effect layer (OEL) on a solid substrate and which can be applied preferably but not exclusively by a printing method. The coating composition comprises the platelet-shaped magnetic or magnetizable pigment particles described herein and the binder described herein.

As used herein, the term "wet" refers to a coating layer which is not yet at least partially cured, for example a coating in which the platelet-shaped magnetic or magnetizable pigment particles are still able to change their positions and orientations under the influence of external forces acting upon them.

The term "security document" refers to a document which is usually protected against counterfeit or fraud by at least one security feature. Examples of security documents include without limitation value documents and value commercial goods.

The term "security feature" is used to denote an image, pattern or graphic element that can be used for authentication purposes.

Where the present description refers to "preferred" embodiments/features, combinations of these "preferred" embodiments/features shall also be deemed as disclosed as long as this combination of "preferred" embodiments/features is technically meaningful.

The present invention provides security documents and decorative articles comprising a substrate (x20) having a two-dimensional surface and one or more optical effect layers (OELs) on said substrate (x20), wherein said OELs are based on magnetically oriented platelet-shaped magnetic or magnetizable pigment particles, wherein the orientation of the substrate (x20) is defined by a substrate vector which is the local normal vector to the substrate (x20) perpendicular to the two-dimensional surface of the substrate (x20) at the respective position of the one or more optical effect layers (OELs).

Typical examples of decorative articles include without limitation luxury goods, cosmetic packaging, automotive parts, electronic/electrical appliances, furniture and fingernail articles. Alternatively, the one or more OELs described herein may be comprised onto an auxiliary substrate such as for example a label and consequently transferred to a decorative article in a separate step.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets, academic diploma or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, security documents and decorative articles are given exclusively for exemplifying purposes, without restricting the scope of the invention. Alternatively, the one or more OELs described herein may be comprised onto an auxiliary substrate such as for example a security thread, security stripe, a foil, a decal, a window or a label and consequently transferred to a security document in a separate step.

The shape of the one or more OELs described herein may be continuous or discontinuous. According to one embodiment, the shape of the one or more OELs independently represent one or more indicia, dots and/or lines. For embodiments wherein the security documents and decorative articles comprise more than one, i.e. two, three, etc., OELs, said OELs may be adjacent or spaced apart.

As mentioned herein, the eye-catching OELs described herein allows an observer to easily authenticate them upon titling between about −45° and about +45°. The eye-catching visual appearance is seen as a sharp and contrasted switch-on/switch off effect of the brightness and consists off an increase of the brightness value to reach a maximum value of brightness and then a decrease of said brightness within the viewing/observation angles about −45° and about +45°, said brightness change being observable with the naked eye.

As shown in FIG. 1, the man in the street usually tilts about the tilting axis t the OEL with an observation angles from −45° to +45°, wherein said OEL may be tilted about i) a vertical/longitudinal axis (up/down motion) or ii) about a horizontal/latitudinal axis (left/right motion). However, any other kind of tilting axes t may be used.

For embodiments wherein the security document or decorative article comprises a single OEL, the eye-catching visual appearance may be seen upon tilting about i) a vertical/longitudinal axis or ii) about a horizontal/latitudinal axis.

For embodiments wherein the security document or decorative article comprises at least two OELs, the eye-catching visual appearance of both of said two OELs may be seen upon tilting about i) a vertical/longitudinal axis or ii) about a horizontal/latitudinal axis; alternatively, the eye-catching visual appearance of one of said two OELs may be seen upon tilting about a vertical/longitudinal axis while, the eye-catching visual appearance of the other of said two OELs may be seen upon tilting about a horizontal/latitudinal axis.

The platelet-shaped magnetic or magnetizable pigment particles are comprised in the radiation curable coating composition described herein as well as the coating layer (x10) as well as the at least partially cured coating layer (x10). As mentioned herein, the methods described herein comprise the step c) of at least partially curing the coating layer (x10) to a second state, where the platelet-shaped magnetic or magnetizable pigment particles are fixed in their current positions and orientations and can no longer move nor rotate within said layer. As used herein, by "at least partially curing the coating layer (x10)", it means that the platelet-shaped magnetic or magnetizable pigment particles are fixed/frozen in their adopted positions and orientations and cannot move and rotate anymore (also referred in the art as "pinning" of the particles).

As mentioned therein, the one or more optical effect layers (OELs) described herein comprise the magnetically oriented platelet-shaped magnetic or magnetizable pigment particles in the at least partially cured coating layer. Preferably, the platelet-shaped magnetic or magnetizable pigment particles described herein are present in an amount from about 5 wt-% to about 40 wt-%, more preferably about 10 wt-% to about 30 wt-%, the weight percentages being based on the total weight of at least partially cured coating layer. Preferably, the platelet-shaped magnetic or magnetizable pigment particles described herein are present in an amount from about 5 wt-% to about 40 wt-%, more preferably about 10 wt-% to about 30 wt-%, the weight percentages being based on the total weight of the radiation curable coating layer described herein.

Platelet-shaped magnetic or magnetizable pigment particles described herein are defined as having, due to their non-spherical shape, non-isotropic reflectivity with respect to an incident electromagnetic radiation for which the cured binder material is at least partially transparent. As used herein, the term "non-isotropic reflectivity" denotes that the proportion of incident radiation from a first angle that is reflected by a particle into a certain (viewing/observation) direction (a second angle) is a function of the orientation of the particles, i.e. that a change of the orientation of the particle with respect to the first angle can lead to a different magnitude of the reflection to the viewing/observation direction.

Figure 2A:
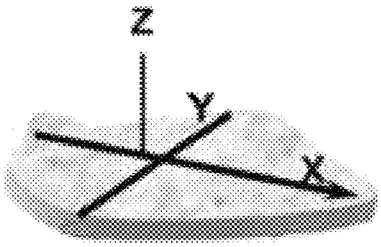
FIG. 2A schematically illustrates a platelet-shaped particle with its main axis X and its main axis Y.

Preferably, the platelet-shaped magnetic or magnetizable pigment particles described herein have a non-isotropic reflectivity with respect to incident electromagnetic radiation in some parts or in the complete wavelength range of from about 200 to about 2500 nm, more preferably from about 400 to about 700 nm, such that a change of the particle's orientation results in a change of reflection by that particle into a certain direction. As known by the man skilled in the art, the magnetic or magnetizable pigment particles described herein are different from conventional pigments, in that said conventional pigment particles exhibit the same color and reflectivity, independent of the particle orientation, whereas the magnetic or magnetizable pigment particles described herein exhibit either a reflection or a color, or both, that depend on the particle orientation. In contrast to needle-shaped pigment particles which can be considered as one-dimensional particles, platelet-shaped pigment particles have an X-axis and a Y-axis defining a plane of predominant extension of the particles (FIG. 2A). In other words and as shown in FIG. 2A, platelet-shaped pigment particles may be considered to be two-dimensional particles due to the large aspect ratio of their dimensions, wherein the dimensions X and Y are substantially larger than dimension Z. Platelet-shaped pigment particles are also referred in the art as oblate particles or flakes. Such pigment particles may be described with a main axis X corresponding to the longest dimension crossing the pigment particle and a second main axis Y perpendicular to X which also lies within said pigment particles.

The orientation of the platelet-shaped magnetic or magnetizable pigment particles is defined by a platelet vector which is the vector parallel to the main axis X of the particle, wherein the platelet vectors of neighboring platelet-shaped magnetic or magnetizable pigment particles are substantially parallel to each other (see FIG. 2B), and wherein the platelet vectors of the platelet-shaped magnetic or magnetizable pigment particles are angled with respect to the two-dimensional surface of the substrate (×20) at the positions of the particles by the elevation angle γ described herein. The elevation angle γ described herein is larger than 0° and smaller than 30° (0°<γ<30°) or larger than 150° and smaller than 180°(150°<γ<180°), preferably larger than or equal to about 5° and smaller than 30° (5°≤γ<30°) or larger than 150° and smaller than or equal to about 175°(150°<γ≤175°). More preferably, the elevation angle γ is in the range from about 5° to about 25°(5°γ<25°) or from about 155° to about 175°(155°≤γ≤175°).

OELs comprising platelet-shaped magnetic or magnetizable pigment particles with an elevation angle of 0° are not distinguishable and could be imitated with non-magnetic pigments typically dispersed in solvent based inks, wherein upon solvent evaporation the pigments are forced to adopt elevation angle of 0°.

Figure 3A:
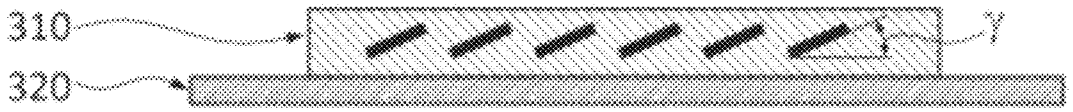
FIG. 3A schematically illustrates a cross-section of an OEL comprising magnetically oriented platelet-shaped magnetic or magnetizable pigment particles in a coating layer (310) on a substrate (320).

As shown for example in FIG. 3A, the platelet-shaped magnetic or magnetizable pigment particles are oriented as described above with the elevation angle γ described herein. In other words, the elevation angle is formed by the main axis X of the platelet-shaped magnetic or magnetizable pigment particles and the two-dimensional surface of the substrate (×20) and, wherein said elevation angle γ, when measured (for example with a conoscopic scatterometer or with a microscope such as described hereafter) in a cross-section of the optical effect layer (OEL) and measured in a counterclockwise direction, is larger than 0° and smaller than 30° (0°<γ<30°) or larger than 150° and smaller than 180°(150°<γ<180°), preferably larger than or equal to about 5° and smaller than 30° (5°≤γ<30°) or larger than 150° and smaller than or equal to about 175°(150°≤γ≤175°). More preferably, the elevation angle γ is in the range from about 5° to about 25°(5°≤γ≤250) or from about 155° to about 175°(155°≤γ≤175°).

Figure 2C:
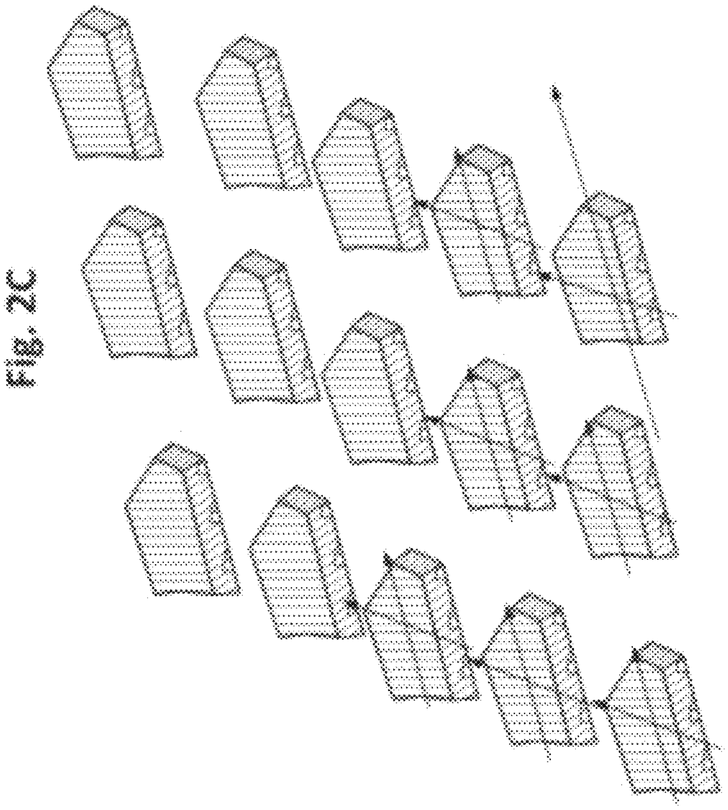
FIG. 2C schematically illustrate bi-axially oriented platelet-shaped particles, wherein the platelet vectors (vectors parallel to the main axis X of the particle) of neighboring platelet-shaped magnetic or magnetizable pigment particles are substantially parallel to each other and the second platelet vectors (vectors parallel to the main axis Y of the particle) of neighboring platelet-shaped magnetic or magnetizable pigment particles are substantially parallel to each other.
Figure 2B:
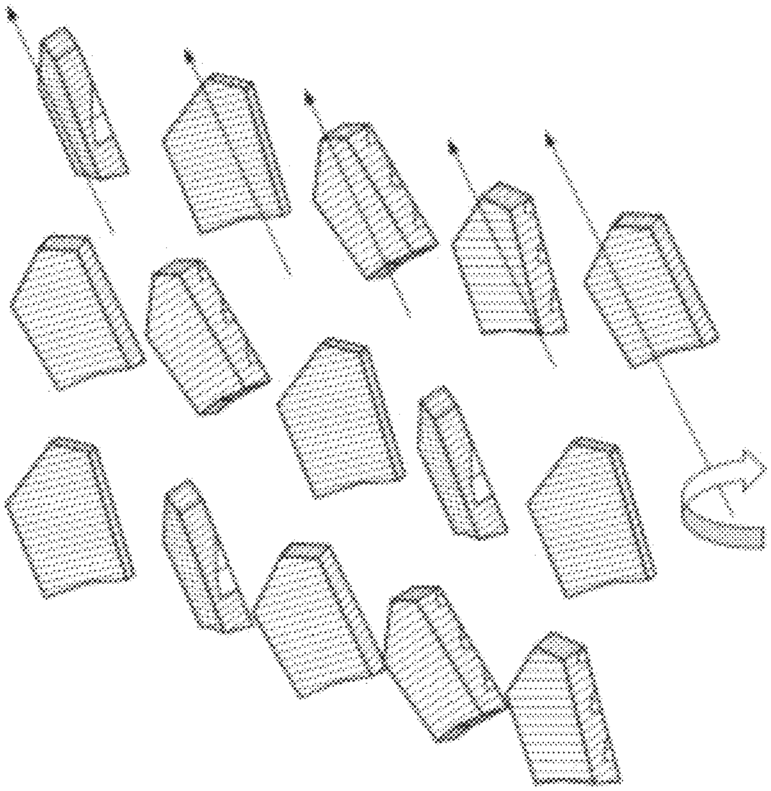
FIG. 2B schematically illustrate mono-axially oriented platelet-shaped particles, wherein the platelet vectors (vectors parallel to the main axis X of the particle) of neighboring platelet-shaped magnetic or magnetizable pigment particles are substantially parallel to each other.

For embodiments wherein the platelet-shaped magnetic or magnetizable pigment particles are mono-axially oriented as shown for example in FIG. 2B, the orientation of the platelet-shaped pigment particles is defined by the platelet vector which is the vector parallel to the main axis X of the particle, wherein the platelet vectors of neighboring platelet-shaped magnetic or magnetizable pigment particles are substantially parallel to each other; i.e. only the main axes X of neighboring platelet-shaped magnetic or magnetizable pigment particles are substantially parallel to each other (in other words, neighboring platelet-shaped magnetic or magnetizable pigment particles have a substantially same elevation angle γ).

For embodiments wherein the platelet-shaped magnetic or magnetizable pigment particles are bi-axially oriented as shown for example in FIG. 2C, the orientation of the platelet-shaped pigment particles is defined by the platelet vector which is the vector parallel to the main axis X of the particle, wherein the platelet vectors of neighboring platelet-shaped magnetic or magnetizable pigment particles are substantially parallel to each other and is further defined by a second platelet vector which is the vector parallel to the second axis Y of the particle, wherein the platelet vectors of neighboring platelet-shaped magnetic or magnetizable pigment particles are substantially parallel to each other and the second platelet vectors of said neighboring platelet-shaped magnetic or magnetizable pigment particles are substantially parallel to each other. For embodiments wherein the platelet-shaped magnetic or magnetizable pigment particles are bi-axially oriented shown for example in FIG. 2C, the platelet vectors of neighboring platelet-shaped magnetic or magnetizable pigment particles are substantially parallel to each other and not only the main axes X of neighboring platelet-shaped magnetic or magnetizable pigment particles are substantially parallel to each other (in other words, neighboring platelet-shaped magnetic or magnetizable pigment particles have a substantially same elevation angle γ) but also the main axes Y of neighboring platelet-shaped magnetic or magnetizable pigment particles are substantially parallel to each other. For embodiments wherein the platelet-shaped magnetic or magnetizable pigment particles are bi-axially oriented as shown for example in FIG. 2C, the platelet-shaped magnetic or magnetizable particles are substantially parallel to each other.

Suitable examples of platelet-shaped magnetic or magnetizable pigment particles described herein include without limitation pigment particles comprising a magnetic metal selected from the group consisting of cobalt (Co), iron (Fe), and nickel (Ni); a magnetic alloy of iron, manganese, cobalt, nickel or a mixture of two or more thereof; a magnetic oxide of chromium, manganese, cobalt, iron, nickel or a mixture of two or more thereof; or a mixture of two or more thereof. The term "magnetic" in reference to the metals, alloys and oxides is directed to ferromagnetic or ferrimagnetic metals, alloys and oxides.

Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of platelet-shaped, magnetic or magnetizable pigment particles described herein include without limitation pigment particles comprising a magnetic layer M made from one or more of a magnetic metal such as cobalt (Co), iron (Fe), or nickel (Ni); and a magnetic alloy of iron, cobalt or nickel, wherein said magnetic or magnetizable pigment particles may be multilayered structures comprising one or more additional layers. Preferably, the one or more additional layers are layers A independently made from one or more selected from the group consisting of metal fluorides such as magnesium fluoride ($MgF_2$), silicon oxide (SiO), silicon dioxide ($SiO_2$), titanium oxide ($TiO_2$), and aluminum oxide ($Al_2O_3$), more preferably silicon dioxide ($SiO_2$); or layers B independently made from one or more selected from the group consisting of metals and metal alloys, preferably selected from the group consisting of reflective metals and reflective metal alloys, and more preferably selected from the group consisting of aluminum (Al), chromium (Cr), and nickel (Ni), and still more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation A/M multilayer structures, A/M/A multilayer structures, A/M/B multilayer structures, A/B/M/A multilayer structures, A/B/M/B multilayer structures, A/B/M/B/A/multilayer structures, B/M multilayer structures, B/M/B multilayer structures, B/A/M/A multilayer structures, B/A/M/B multilayer structures, B/A/M/B/A/multilayer structures, wherein the layers A, the magnetic layers M and the layers B are chosen from those described hereabove.

According to one embodiment, at least a part of the preferred platelet-shaped, magnetic or magnetizable particles is constituted by platelet-shaped optically variable magnetic or magnetizable pigment particles. Optically variable pigments refer to pigment exhibiting a change of lightness or a combination of a change of lightness and a change of hue. According to one embodiment, at least a part of the platelet-shaped, magnetic or magnetizable particles is constituted by particles exhibiting a metallic color, more preferably a silver color or a gold color.

In addition to the overt security provided by the color-shifting property of the optically variable magnetic or magnetizable pigment particles, which allows easily detecting, recognizing and/or discriminating an article or security document carrying an ink, coating composition, or coating layer comprising the optically variable magnetic or magnetizable pigment particles described herein from their possible counterfeits using the unaided human senses, the optical properties of the optically variable magnetic or magnetizable pigment particles may also be used as a machine readable tool for the recognition of the OEL. Thus, the optical properties of the optically variable magnetic or magnetizable pigment particles may simultaneously be used as a covert or semi-covert security feature in an authentication process wherein the optical (e.g. spectral) properties of the pigment particles are analyzed and thus increase the counterfeiting resistance.

The use of platelet-shaped, optically variable magnetic or magnetizable pigment particles in an OEL enhances the significance of said OEL as a security feature in security document applications, because such materials are reserved to the security document printing industry and are not commercially available to the public.

Preferably, the platelet-shaped, magnetic or magnetizable pigment particles are selected from the group consisting of magnetic thin-film interference pigment particles, magnetic cholesteric liquid crystal pigment particles, interference coated pigment particles comprising a magnetic material and mixtures of two or more thereof.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 B1; WO 2019/103937 A1; WO 2020/006286 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure and/or pigment particles having a multilayer structure combining one or more multilayer Fabry-Perot structures.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/dielectric/reflector/magnetic/dielectric/absorber multilayer structures.

Preferred seven-layer Fabry Perot multilayer structures consist of absorber/dielectric/reflector/magnetic/reflector/dielectric/absorber multilayer structures such as disclosed in U.S. Pat. No. 4,838,648.

Preferred pigment particles having a multilayer structure combining one or more Fabry-Perot structures are those described in WO 2019/103937 A1 and consist of combinations of at least two Fabry-Perot structures, said two Fabry-Perot structures independently comprising a reflector layer, a dielectric layer and an absorber layer, wherein the reflector and/or the absorber layer can each independently comprise one or more magnetic materials and/or wherein a magnetic layer is sandwich between the two structures. WO 2020/006/286 A1 and EP 3 587 500 A1 disclose further preferred pigment particles having a multilayer structure.

Preferably, the reflector layers described herein are independently made from one or more selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicon oxide (SiO), silicium dioxide ($SiO_2$), titanium oxide ($TiO_2$), aluminum oxide ($Al_2O_3$), more preferably selected from the group consisting of magnesium fluoride ($MgF_2$) and silicon dioxide ($SiO_2$) and still more preferably magnesium fluoride ($MgF_2$). Preferably, the absorber layers are independently made from one or more selected from the group consisting of aluminum (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a $Cr/MgF_2/Al/Ni/Al/MgF_2/Cr$ multilayer structure.

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 B1 whose content is hereby incorporated by reference in its entirety.

Suitable magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. Nos. 6,582,781; 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. Nos. 6,582,781; 6,410,130 disclose platelet-shaped cholesteric multilayer pigment particles which comprise the sequence $A^1/B/A^2$, wherein $A^1$ and $A^2$ may be identical or different and each comprises at least one cholesteric layer, and B is an interlayer absorbing all or some of the light transmitted by the layers $A^1$ and $A^2$ and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigment particles comprising one or more magnetic materials include without limitation structures consisting of a substrate selected from the group consisting of a core coated with one or more layers, wherein at least one of the core or the one or more layers have magnetic properties. For example, suitable interference coated pigment particles comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicon dioxides ($SiO_2$), aluminum oxides ($Al_2O_3$), titanium oxides ($TiO_2$), graphites and mixtures of two or more thereof. Furthermore, one or more additional layers such as coloring layers may be present.

The platelet-shaped, magnetic or magnetizable pigment particles described herein preferably have a size d50 between about 2 m and about 50 m (as measured by direct optical granulometry).

The platelet-shaped magnetic or magnetizable pigment particles described herein may be surface treated so as to protect them against any deterioration that may occur in the coating composition and coating layer and/or to facilitate their incorporation in said coating composition and coating layer; typically corrosion inhibitor materials and/or wetting agents may be used.

According to one embodiment shown for example in FIG. 3A, the OELs described herein comprise a single at least partially cured coating layer (310) with magnetically oriented platelet-shaped magnetic or magnetizable pigment particles incorporated therein, wherein substantially all the platelet-shaped magnetic or magnetizable pigment particles have substantially the same elevation angle $\gamma$.

According to one embodiment shown for example in FIG. 3B-E, the OELs described herein comprise two zones comprising the platelet-shaped magnetic or magnetizable pigment particles, wherein substantially all the platelet-shaped magnetic or magnetizable pigment particles in the one zone have substantially the same elevation angle $\gamma$ and substantially all the platelet-shaped magnetic or magnetizable pigment particles in another zone have substantially the same additional elevation angle $\gamma'$, wherein the elevation angle $\gamma$ is larger than 0° and smaller than 30° (0°<$\gamma$<30°) or larger than 1500 and smaller than 180°(150°<$\gamma$<180°), preferably larger than or equal to about 5° and smaller than 30° (5°≤$\gamma$<30°) or larger than 150° and smaller than or equal to about 175°(150°<$\gamma$<175°), more preferably, in the range from about 5° to about 25°(5°≤$\gamma$≤25°) or from about 155° to about 175°(155°≤$\gamma$≤175°) and wherein the additional elevation angle $\gamma'$ is larger than 0° and smaller than 30° (0°<$\gamma'$<30°) or larger than 150° and smaller than 180° (150°<$\gamma'$<180°), preferably larger than or equal to about 5° and smaller than 30° (5°≤$\gamma'$<30°) or larger than 150° and smaller than or equal to about 175°(150°<$\gamma'$≤175°), more preferably, in the range from about 5° to about 25° (5°≤$\gamma'$≤25°) or from about 1550 to about 175° (155°≤$\gamma'$≤$\gamma$175°), said elevation angle $\gamma$ and additional elevation angle $\gamma'$ being different from each other (preferably they differ of at least 10°) and/or being not coplanar.

According to one embodiment for OELs comprising platelet-shaped magnetic or magnetizable pigment particles having the elevation angle $\gamma$ and the additional elevation angle $\gamma'$, being different, the additional elevation angle $\gamma'$ has the following value: $\gamma'=180-\gamma$, such as for example, should γ be 20°, then γ' is 160°(in other words, the magnetic orientation patterns of the two zones are substantially symmetric).

Figure 3B:
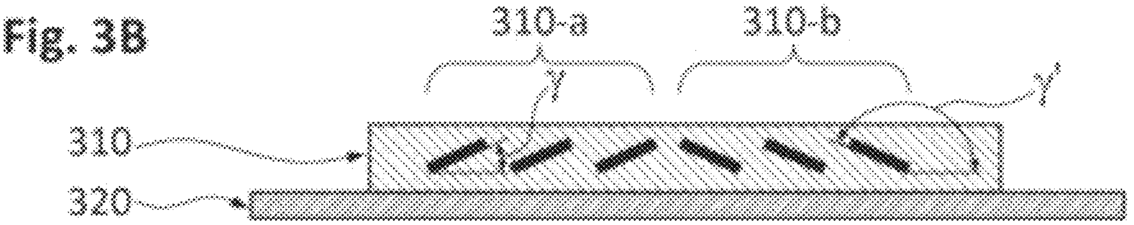
FIG. 3B schematically illustrates a cross-section (along a plane perpendicular to the tilting axis t of the OEL) of an OEL comprising a single at least partially cured coating layer (310) comprising platelet-shaped magnetic or magnetizable pigment particles in one or more first zones (310-*a*) and platelet-shaped magnetic or magnetizable pigment particles in one or more second zones (310-*b*), wherein substantially all the platelet-shaped magnetic or magnetizable pigment particles in the one or more zones (310-*a*) have substantially the same elevation angle γ and substantially all the platelet-shaped magnetic or magnetizable pigment particles in the one or more zones (310-*b*) have substantially the same additional elevation angle γ', said elevation angle γ and additional elevation angle γ' being different from each other and/or being not coplanar.

According to one embodiment shown for example in FIG. 3B, the OELs described herein comprise a single at least partially cured coating layer (310) comprising the platelet-shaped magnetic or magnetizable pigment particles in one or more first zones (310-*a*) and the platelet-shaped magnetic or magnetizable pigment particles in one or more second zones (310-*b*), wherein substantially all the platelet-shaped magnetic or magnetizable pigment particles in the one or more first zones (310-*a*) have substantially the same elevation angle γ and substantially all the platelet-shaped magnetic or magnetizable pigment particles in the one or more second zones (310-*b*) have substantially the same additional elevation angle γ', wherein the elevation angle γ is larger than 0° and smaller than 30° (0°<γ<30°) or larger than 150° and smaller than 180° (150°<γ<180°), preferably larger than or equal to about 5° and smaller than 30° (5°≤γ<30°) or larger than 150° and smaller than or equal to about 1750 (150°<γ<175°), more preferably, in the range from about 5° to about 25°(5°≤γ≤25°) or from about 155° to about 175° (155°≤γ≤175°) and wherein the additional elevation angle γ' is larger than 0° and smaller than 30° (0°<γ'<30°) or larger than 150° and smaller than 180°(150°<γ'<180°), preferably larger than or equal to about 5° and smaller than 30° (5°≤γ'<30°) or larger than 150° and smaller than or equal to about 175°(150°<7'≤175°), more preferably, in the range from about 5° to about 25°(5°≤γ'≤25°) or from about 155° to about 175°(155°≤γ'≤175°), said elevation angle γ and additional elevation angle γ' being different from each other (preferably they differ of at least 10°) and/or being not coplanar.

Figure 3C:
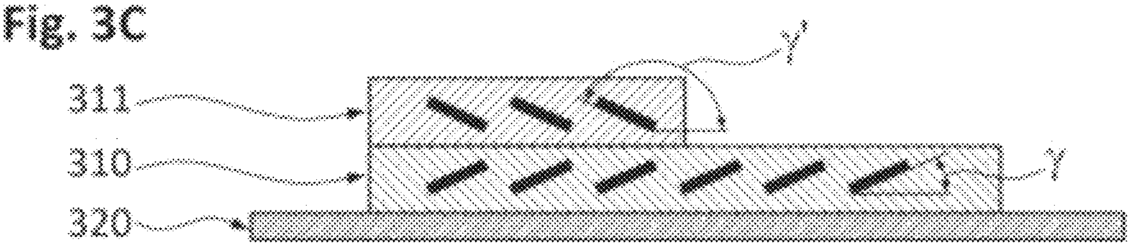
FIG. 3C schematically illustrates a cross-section of an OEL comprising an at least partially cured coating layer (310) with magnetically oriented platelet-shaped magnetic or magnetizable pigment particles incorporated therein and an at least partially cured second coating layer (311) with magnetically oriented second platelet-shaped magnetic or magnetizable pigment particles incorporated therein, said at least partially cured second coating layer (311) partially overlapping the at least partially cured coating layer (310), wherein substantially all the platelet-shaped magnetic or magnetizable pigment particles in the at least partially cured coating layer (310) have substantially the same elevation angle γ and substantially all second platelet-shaped magnetic or magnetizable pigment particles in the at least partially cured second coating layer (311) have substantially the same additional elevation angle γ', said elevation angle γ and additional elevation angle γ' being different from each other and/or being not coplanar.
Figure 3D:
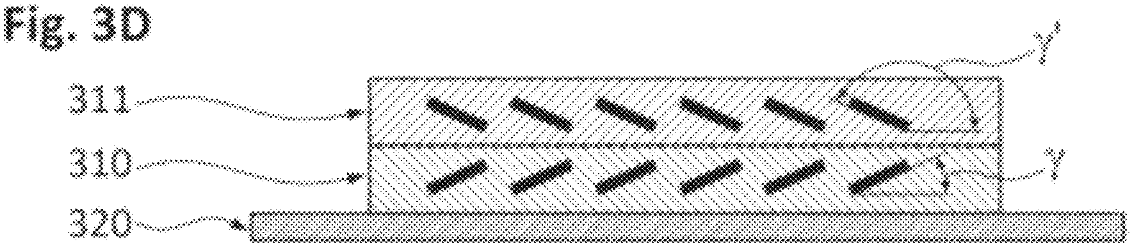
FIG. 3D schematically illustrates a cross-section of an OEL comprising an at least partially cured coating layer (310) with magnetically oriented platelet-shaped magnetic or magnetizable pigment particles incorporated therein and an at least partially cured second coating layer (311) with magnetically oriented second platelet-shaped magnetic or magnetizable pigment particles incorporated therein, said at least partially cured second coating layer (311) fully overlapping the at least partially cured coating layer (310), wherein all the platelet-shaped magnetic or magnetizable pigment particles in the at least partially cured coating layer (310) have substantially the same elevation angle γ and all second platelet-shaped magnetic or magnetizable pigment particles in the at least partially cured second coating layer (311) have substantially the same additional elevation angle γ', said elevation angle γ and additional elevation angle γ' being different from each other and/or being not coplanar.
Figure 3E:
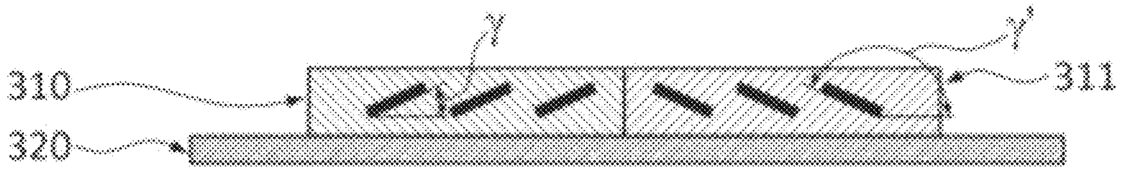
FIG. 3E schematically illustrates a cross-section of an OEL comprising an at least partially cured coating layer (310) with magnetically oriented platelet-shaped magnetic or magnetizable pigment particles incorporated therein and an at least partially cured second coating layer (311) with magnetically oriented second platelet-shaped magnetic or magnetizable pigment particles incorporated therein, said at least partially cured second coating layer being adjacent to the at least partially cured coating layer (310), wherein all the platelet-shaped magnetic or magnetizable pigment particles in the at least partially cured coating layer (310) have substantially the same elevation angle γ and all second platelet-shaped magnetic or magnetizable pigment particles in the at least partially cured second coating layer (311) have substantially the same additional elevation angle γ', said elevation angle γ and additional elevation angle γ' being different from each other and/or being not coplanar.

According to one embodiment shown for example in FIG. 3C-E, the OELs described herein comprise the at least partially cured coating layer (310) with magnetically oriented platelet-shaped magnetic or magnetizable pigment particles incorporated therein, wherein substantially all the platelet-shaped magnetic or magnetizable pigment particles have substantially the same elevation angle γ and further comprise an at least partially cured second coating layer (311) with magnetically oriented second platelet-shaped magnetic or magnetizable pigment particles incorporated therein, wherein the platelet vectors of the second platelet-shaped magnetic or magnetizable pigment particles are angled with respect to the two-dimensional surface of the substrate (x20) at the positions of the particles by an additional elevation angle γ', the additional elevation angle γ' being larger than 0° and smaller than 30° (0°<γ<30°) or larger than 150° and smaller than 180°(150°<γ<180°), said elevation angle γ and additional elevation angle γ' being different from each other. The at least partially cured second coating layer (x11) is either at least partially or fully overlapping the at least partially cured coating layer (x10), or the at least partially cured second coating layer (x11) is adjacent to the at least partially cured coating layer (x10), or the at least partially cured second coating layer (x11) is spaced apart from the at least partially cured coating layer (x10).

According to one embodiment shown for example in FIG. 3C, the OELs described herein comprise two at least partially cured coating layers (310 and 311). The OELs comprise i) the at least partially cured coating layer (310) with magnetically oriented platelet-shaped magnetic or magnetizable pigment particles incorporated therein as described herein and ii) an at least partially cured second coating layer (311) with magnetically oriented second platelet-shaped magnetic or magnetizable pigment particles incorporated therein, said at least partially cured second coating layer (311) partially overlapping the at least partially cured coating layer (310), wherein substantially all the platelet-shaped magnetic or magnetizable pigment particles in the at least partially cured coating layer (310) have substantially the same elevation angle γ and substantially all second platelet-shaped magnetic or magnetizable pigment particles in the at least partially cured second coating layer (311) have substantially the same additional elevation angle γ', wherein the elevation angle γ is larger than 0° and smaller than 30° (0°<γ<30°) or larger than 150° and smaller than 180° (150°<γ<1800), preferably larger than or equal to about 5° and smaller than 30° (5°≤γ<30°) or larger than 150° and smaller than or equal to about 175°(150°<γ<175°), more preferably in the range from about 5° to about 25° (5°≤γ≤25°) or from about 155° to about 175°(155°≤γ≤175°) and wherein the additional elevation angle γ' is larger than 0° and smaller than 30° (0°<γ'<30°) or larger than 150° and smaller than 180° (150°<γ'<180°), preferably larger than or equal to about 5° and smaller than 30° (5° γ'<30°) or larger than 150° and smaller than or equal to about 175° (150°<γ' '≤175°), more preferably in the range from about 5° to about 25°(5°≤γ'<25°) or from about 155° to about 175°(155°≤γ'≤175°), said elevation angle γ and additional elevation angle γ' being different from each other (preferably they differ of at least 10°) and/or being not coplanar.

According to one embodiment shown for example in FIG. 3D the OELs described herein comprise two at least partially cured coating layers (310 and 311). The OELs comprise i) an at least partially cured coating layer (310) with magnetically oriented platelet-shaped magnetic or magnetizable pigment particles incorporated therein as described herein and ii) an at least partially cured second coating layer (311) with magnetically oriented second platelet-shaped magnetic or magnetizable pigment particles incorporated therein, said at least partially cured second coating layer (311) fully overlapping the at least partially cured coating layer (310), wherein substantially all the platelet-shaped magnetic or magnetizable pigment particles in the at least partially cured coating layer (310) have substantially the same elevation angle γ and substantially all second platelet-shaped magnetic or magnetizable pigment particles in the at least partially cured second coating layer (311) have substantially the same elevation angle γ', wherein the elevation angle γ is larger than 0° and smaller than 30° (0°<γ<30°) or larger than 150° and smaller than 180° (150°<γ<180°), preferably larger than or equal to about 5° and smaller than 30° (5°≤γ<30°) or larger than 150° and smaller than or equal to about 175° (150°<γ<175°), more preferably in the range from about 5° to about 25°(5°<γ<25°) or from about 155° to about 175° (155°≤γ≤175°) and wherein the additional elevation angle γ' is larger than 0° and smaller than 30° (0°<γ'<30°) or larger than 150° and smaller than 180° (150°<γ' <180°), preferably larger than or equal to about 5° and smaller than 30° (5°≤γ'<30°) or larger than 150° and smaller than or equal to about 175°(150°<γ'≤175°). more preferably in the range from about 5° to about 25°(5°≤γ'<25°) or from about 155° to about 175°(155°≤γ'≤175°), said elevation angle γ and additional elevation angle γ' being different from each other (preferably they differ of at least 10°) and/or being not coplanar.

According to one embodiment shown for example in FIG. 3E, the OELs described herein comprise two at least partially cured coating layers (310 and 311). The OELs comprise i) an at least partially cured coating layer (310) with magnetically oriented platelet-shaped magnetic or magnetizable pigment particles incorporated therein as described herein and ii) an at least partially cured second coating layer (311) with magnetically oriented second platelet-shaped magnetic or magnetizable pigment particles incorporated therein, said at least partially cured second coating layer being adjacent to (FIG. 3E) or spaced apart from (not shown) the at least partially cured coating layer (310), wherein substantially all the platelet-shaped magnetic or magnetizable pigment particles in the at least partially cured coating layer (310) have substantially the same elevation angle $\gamma$ and substantially all second platelet-shaped magnetic or magnetizable pigment particles in the at least partially cured second coating layer (311) have substantially the same additional elevation angle $\gamma'$, wherein the elevation angle $\gamma$ is larger than 0° and smaller than 30° ($0°<\gamma<30°$) or larger than 150° and smaller than 180° ($150°<\gamma<180°$), preferably larger than or equal to about 5° and smaller than 30° ($5°\leq\gamma<30°$) or larger than 150° and smaller than or equal to about 175°($150°\leq175°$), more preferably in the range from about 5° to about 25°($5°\gamma<25°$) or from about 155° to about 175°($155°\leq\gamma\leq175°$) and wherein the elevation angle $\gamma'$ is larger than 0° and smaller than 30° ($0°<\gamma'<30°$) or larger than 150° and smaller than 180° ($150°<\gamma'<180°$), preferably larger than or equal to about 5° and smaller than 30° ($5°\leq\gamma'<30°$) or larger than 150° and smaller than or equal to about 175°($150°<\gamma'175°$), more in the range from about 5° to about 25°($5°\leq\gamma'\leq25°$) or from about 155° to about 175° ($155°\leq\gamma'\leq175°$), said elevation angle $\gamma$ and additional elevation angle $\gamma'$ being different from each other (preferably they differ of at least 10°) and/or being not coplanar.

The substrate (×20) described herein is preferably selected from the group consisting of papers or other fibrous materials (including woven and non-woven fibrous materials), such as cellulose, paper-containing materials, glasses, metals, ceramics, plastics and polymers, metallized plastics or polymers, composite materials and mixtures or combinations of two or more thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents.

According to another embodiment, the substrate (×20) described herein is based on plastics and polymers, metallized plastics or polymers, composite materials and mixtures or combinations of two or more thereof. Suitable examples of plastics and polymers include polyolefins such as polyethylene (PE) and polypropylene (PP) including biaxially oriented polypropylene (BOPP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical examples of metals include without limitation aluminum (Al), chromium (Cr), copper (Cu), gold (Au), silver (Ag), alloys thereof and combinations of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as fillers, sizing agents, whiteners, processing aids, reinforcing or wet strengthening agents, etc. When the OELs described herein are used for decorative or cosmetic purposes including for example fingernail lacquers, said OEL may be produced on other type of substrates including nails, artificial nails or other parts of an animal or human being. The substrates (×20) described herein may be in the form of webs, sheets, thread reels, film reels, labels of the roll or label stocks.

Should the one or more OELs described herein be on a security document, and with the aim of further increasing the security level and the resistance against counterfeiting and illegal reproduction of said security document, the substrate may comprise printed, coated, or laser-marked or laser-perforated indicia, watermarks, security threads, fibers, planchettes, luminescent compounds, windows, foils, decals and combinations of two or more thereof. With the same aim of further increasing the security level and the resistance against counterfeiting and illegal reproduction of security documents, the substrate may comprise one or more marker substances or taggants and/or machine readable substances (e.g. luminescent substances, UV/visible/IR absorbing substances, magnetic substances and combinations thereof).

According to one embodiment, the security documents and decorative articles comprising the substrate (×20) and the one or more OELs described herein further comprise one or more patterns, each of them independently having the shape of an indicium, wherein said one or more patterns are present between the substrate (×20) and the one or more OELs (or in other words, the one or more OELS at least partially overlap the one or more patterns). As used herein, the term "indicium" and "indicia" shall mean continuous and discontinuous layer(s) consisting of distinguishing markings or signs or patterns.

Preferably, the indicia described herein are selected from the group consisting of codes, symbols, alphanumeric symbols, motifs, geometric patterns (e.g. circles, triangles and regular or irregular polygons), letters, words, numbers, logos, drawings, portraits and combinations thereof. Examples of codes include encoded marks such as an encoded alphanumeric data, a one-dimensional barcode, a two-dimensional barcode, a QR-code, datamatrix and IR-reading codes. The one or more indicia described herein may be solids indicia and/or raster indicia.

According to one embodiment, the security documents and decorative articles comprising the substrate (×20) and the one or more OELs described herein further comprise one or more primer layers, wherein said one or more primer layers are present between the substrate (×20) and the one or more OELs. This may enhance the quality of the one or more OELs described herein or promote adhesion. Examples of such primer layers may be found in WO 2010/058026 A2.

With the aim of increasing the durability through soiling or chemical resistance and cleanliness and thus the circulation lifetime of the security documents or decorative articles comprising the one or more OELs described herein, or with the aim of modifying their aesthetical appearance (e.g. optical gloss), one or more protective layers may be applied on top of the one or more OELs. When present, the one or more protective layers are typically made of protective varnishes. Protective varnishes may be radiation curable compositions, thermal drying compositions or any combination thereof. Preferably, the one or more protective layers are radiation curable compositions, more preferable UV-Vis curable compositions. The protective layers are typically applied after the formation of the OEL.

The OELs described herein may be provided directly on the substrate (x20) on which it shall remain permanently (such as for banknote applications or labels applications). Alternatively, the OELs may also be provided on a temporary substrate for production purposes, from which the OELs are subsequently removed.

Alternatively, one or more adhesive layers may be present on the one or more OELs or may be present on the substrate (x20), said one or more adhesive layers being on the side of the substrate opposite to the side where the one or more OELs are provided and/or on the same side as the one or more OELs and on top of the one or more OELs. Therefore, one or more adhesive layers may be applied to the one or more OELs or to the substrate, said one or more adhesive layers being applied after the curing step has been completed. Such an object may be attached to all kinds of documents or other articles or items without printing or other processes involving machinery and rather high effort.

Alternatively, the substrate described herein comprising the one or more OELs described herein may be in the form of a transfer foil, which can be applied to a document or to an article in a separate transfer step. For this purpose, the substrate is provided with a release coating, on which the one or more OELs are produced.

The present invention provides methods for producing the one or more optical effect layers (OELs) described herein on the substrates (x20) having a two-dimensional surface described herein.

The methods described herein comprise the step a) of applying on the substrate (x20) surface described herein the radiation curable coating composition comprising the platelet-shaped magnetic or magnetizable pigment particles described herein, said radiation curable coating composition being in a first, liquid state which allows its application as a coating layer (x10) and which is in a not yet at least partially cured (i.e. wet) state wherein the pigment particles can move and rotate within the layer. Since the radiation curable coating composition described herein is to be provided on the substrate (x20) surface, the radiation curable coating composition comprises at least a binder material and the magnetic or magnetizable pigment particles, wherein said composition is in a form that allows its processing on the desired printing or coating equipment. Preferably, said step a) is carried out by a printing process, preferably selected from the group consisting of screen printing, rotogravure printing, flexography printing, intaglio printing (also referred in the art as engraved copper plate printing, engraved steel die printing), pad printing and curtain coating, more preferably selected from the group consisting of screen printing, rotogravure printing, pad printing and flexography printing and still more preferably screen printing, rotogravure printing and flexography printing.

The methods described herein further comprise the step b) of exposing the coating layer (x10) to a magnetic field of a magnetic-field generating device (x30) so as to orient at least a part of the platelet-shaped magnetic or magnetizable pigment particles, wherein the platelet vectors of the platelet-shaped magnetic or magnetizable pigment particles are angled with respect to the two-dimensional surface of the substrate (x20) at the positions of the particles by the elevation angle γ, said elevation angle γ being larger than 0° and smaller than 30° ($0°<\gamma<30°$) or larger than 150° and smaller than 180°($150°<\gamma<180°$), preferably larger than or equal to about 5° and smaller than 30° ($5°\leq\gamma\leq30°$) or larger than 150° and smaller than or equal to about 175° ($150°<\gamma\leq175°$), more preferably, in the range from about 5° to about 25°($5°\leq\gamma\leq25°$) or from about 155° to about 175° ($155°\leq\gamma\leq175°$).

The orientation of the platelet-shaped magnetic or magnetizable pigment particles and the elevation angles γ described herein are obtained by submitting the platelet-shaped magnetic or magnetizable pigment particles to the magnetic field of the magnetic-field generating device (x30) described herein in one or more areas (shown in the figures as dotted rectangles A and A') wherein the magnetic field is substantially homogeneous (i.e. a magnetic field which has a substantially constant magnitude and direction over the entire area(s) of interest (for mono-axial orientation); or a magnetic field which is substantially confined to a plane (for bi-axial orientation), wherein the substrate (x20) carrying the coating layer (x10) is provided in said one or more areas with an angle α formed by the coating layer (x10) and a tangent to magnetic field lines of the magnetic field of the magnetic-field generating device (x30) within the one or more areas wherein the magnetic field is substantially homogeneous. The angle α is larger than 0° and smaller than 30° ($0°<\alpha<30°$) or larger than 150° and smaller than 180° ($150°<\alpha<180°$), preferably larger than or equal to about 5° and smaller than 30° ($5°\leq\alpha<30°$) or larger than 150° and smaller than or equal to about 175°($150°\leq\alpha\leq175°$), more preferably in the range from about 5° to about 25° ($5°\leq\alpha\leq25°$) or from about 155° to about 175° ($155°\leq\alpha\leq175°$).

The step b) described herein is carried out to so as to mono-axially or bi-axially orient at least a part of the platelet-shaped magnetic or magnetizable pigment particles described herein. In contrast to a mono-axial orientation wherein magnetic or magnetizable pigment particles are orientated in such a way that only their main axis is constrained by the magnetic field (FIG. 2B), carrying out a bi-axial orientation means that the platelet-shaped magnetic or magnetizable pigment particles are made to orientate in such a way that their two main axes X and Y are constrained (FIG. 2C). That is, each platelet-shaped magnetic or magnetizable pigment particle can be considered to have a major axis in the plane of the pigment particle and an orthogonal minor axis in the plane of the pigment particle. The axes X and Y of the platelet-shaped magnetic or magnetizable pigment particles are each caused to orient according to the magnetic field. Effectively, this results in neighboring platelet-shaped magnetic pigment particles that are close to each other in space to be substantially parallel to each other. Put another way, a bi-axial orientation aligns the planes of the platelet-shaped magnetic or magnetizable pigment particles so that the planes of said pigment particles are oriented to be substantially parallel relative to the planes of neighboring (in all directions) platelet-shaped magnetic or magnetizable pigment particles.

According to one embodiment, the step b) is carried out to so as to mono-axially orient at least a part of the platelet-shaped magnetic or magnetizable pigment particles described herein. Suitable magnetic-field generating devices for mono-axially orienting the platelet-shaped magnetic or magnetizable pigment particles described herein are not limited.

According to one embodiment shown in FIG. 4A1, a suitable magnetic-field generating device (430) for mono-axially orienting at least a part of the platelet-shaped magnetic or magnetizable pigment particles consists of a bar dipole magnet. As shown in FIG. 4A1, the platelet-shaped magnetic or magnetizable pigment particles in the coating layer (410) on the substrate (420) are exposed to the magnetic field (magnetic field lines shown as lines with arrows pointing from the North Pole to the South Pole) of the magnetic field of the magnetic-field generating device (430) described herein in one or more areas (shown as a dotted rectangle A) wherein the magnetic field is substantially homogeneous and wherein the magnetic field lines are substantially parallel to each other in said one or more areas and wherein the substrate (420) carrying the coating layer (410) is provided in said one or more areas with the angle α described herein.

According to one embodiment shown in FIG. 4A2, a suitable magnetic-field generating device (430) for mono-axially orienting at least a part of the platelet-shaped magnetic or magnetizable pigment particles consists of an assembly comprising two bar dipole magnets (M1, M2) having a same magnetic direction and an iron yoke (Y), wherein said magnetic-field generating device is described in U.S. Pat. No. 7,047,883. As shown in FIG. 4A2, the platelet-shaped magnetic or magnetizable pigment particles in the coating layer (410) on the substrate (420) are exposed to the magnetic field (magnetic field lines shown as lines with arrows pointing from the North Pole to the South Pole) of the magnetic field of the magnetic-field generating device (430) described herein in one or more areas (shown as a dotted rectangle A) wherein the magnetic field is substantially homogeneous and wherein the magnetic field lines are substantially parallel to each other in said one or more areas and wherein the substrate (420) carrying the coating layer (410) is provided in said one or more areas with the angle α described herein.

Figure 6A:
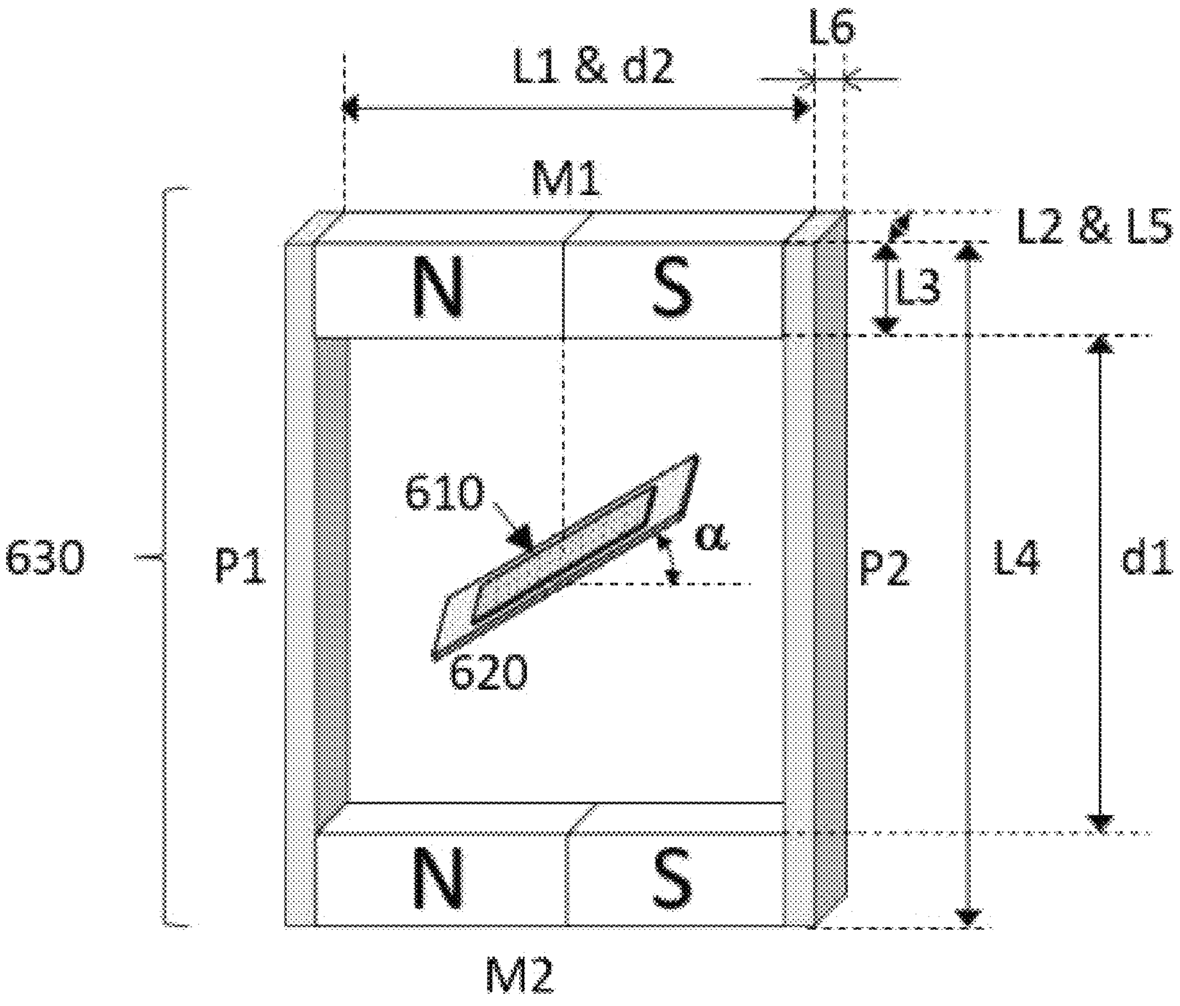

According to one embodiment shown in FIGS. 6A-B and used in the Examples hereafter, a suitable magnetic-field generating device (630) for mono-axially orienting at least a part of the platelet-shaped magnetic or magnetizable pigment particles consists of a rectangular assembly comprising two bar dipole magnets (M1, M2) and two pole pieces (P1, P2). The platelet-shaped magnetic or magnetizable pigment particles in the coating layer (610) on the substrate (620) are exposed to the magnetic field (magnetic field lines shown as lines with arrows pointing from the North Pole to the South Pole) of the magnetic-field generating device (630) in one or more areas (shown as an dotted rectangle A) wherein the magnetic field is substantially homogeneous and wherein the magnetic field lines are substantially parallel to each other in said area and wherein the substrate (620) carrying the coating layer (610) is provided in said one or more areas with the angle α described herein.

According to another embodiment, the step b) is carried out so as to bi-axially orient at least a part of the platelet-shaped magnetic or magnetizable pigment particles. For embodiments wherein the method described herein comprises the step of exposing the coating layer (×10) to the magnetic field of the magnetic-field generating device (×30) described herein so as to bi-axially orient at least a part of the magnetic or magnetizable pigment particle, the coating layer (×10) may be exposed more than one time to said magnetic-field generating device. Suitable magnetic-field generating devices for bi-axially orienting the platelet-shaped magnetic or magnetizable pigment particles described herein are not limited. As known by the man skilled in the art, bi-axial orientation of platelet-shaped magnetic or magnetizable pigment particles requires a dynamic magnetic field (i.e. time-variable/time-dependent magnetic field) that changes its direction, forcing the particles to oscillate until both main axes, X-axis and Y-axis, become aligned. In other words, bi-axial orientation requires a non-concomitant movement of the coating layer (×10) comprising the platelet-shaped magnetic or magnetizable pigment particles with respect to the magnetic-field-generating device.

Figure 10:
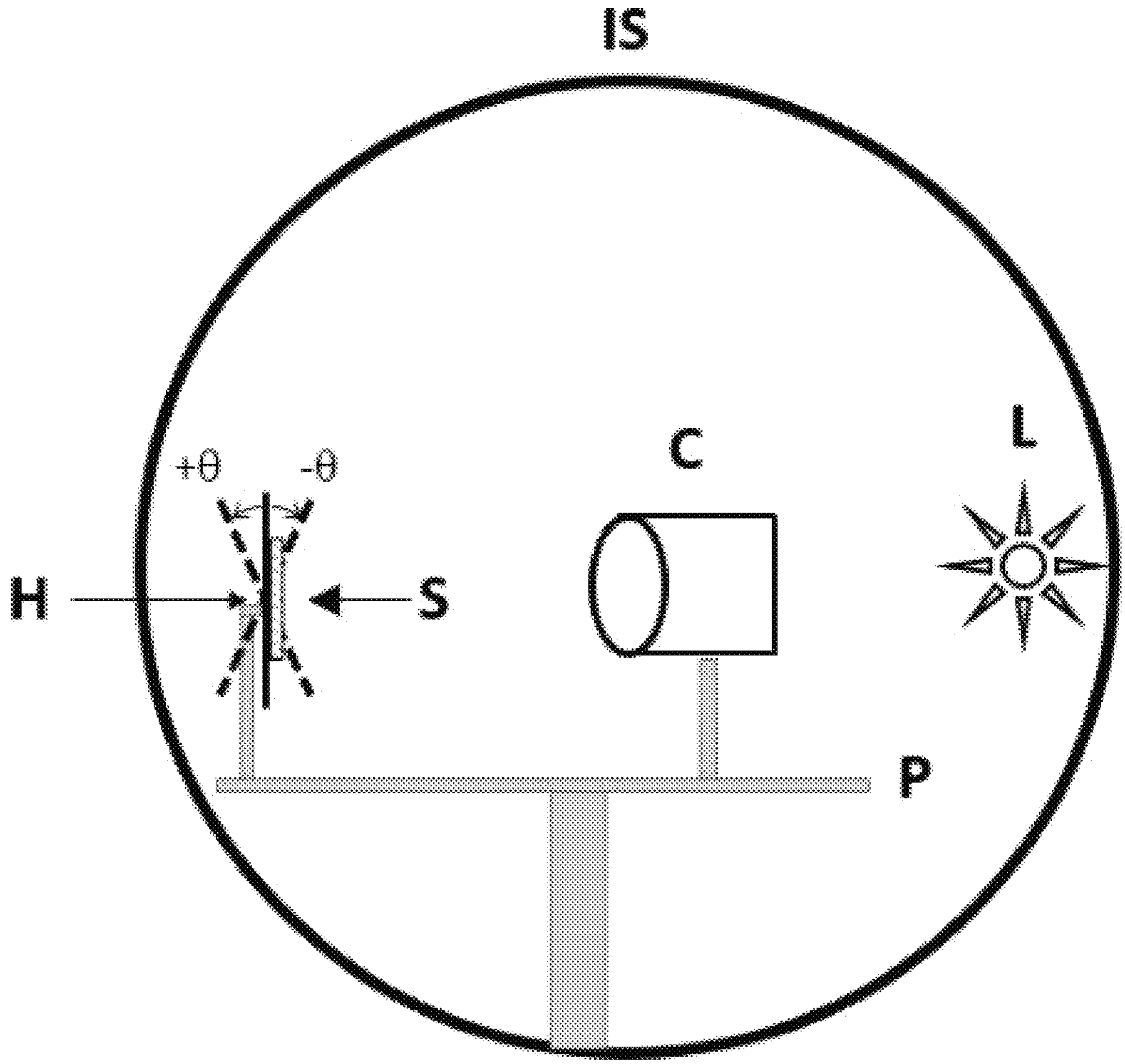
FIG. 10 schematically illustrates an apparatus for taking the photographic images shown in FIGS. 7A and 8 at different observation angles θ, the apparatus comprising an integration sphere (IS), an illumination source (L), a camera (C) and a movable holder (H) for the samples (S), the camera (C) and the movable holder (H) being fixed on a plate (P), so as to vary the observation angle θ of the sample.

According to one embodiment shown in FIG. 10 of WO 2018/019594, a suitable magnetic-field generating device (430) for bi-axially orienting at least a part of the platelet-shaped magnetic or magnetizable pigment particles consists of a linear arrangement of at least four, magnets (M1-M4) that are positioned in a staggered fashion or in zigzag formation. As shown in FIG. 4B1, the platelet-shaped magnetic or magnetizable pigment particles in the coating layer (410) on the substrate (420) are exposed to the magnetic field (magnetic field lines shown as lines with arrows pointing from the North Pole to the South Pole) of the magnetic fields of the magnetic-field generating device (430) in one or more areas (shown as dotted rectangles A, A') wherein the magnetic field is substantially homogeneous and wherein the magnetic field lines are substantially parallel to each other in said one or more areas and wherein the substrate (420) carrying the coating layer (410) is provided in said one or more areas with the angle α described herein. EP 2 157 141 A1 discloses a similar suitable magnetic-field generating device in FIG. 5, wherein the magnetic-field generating device may be used for bi-axially orienting at least a part of the platelet-shaped magnetic or magnetizable pigment particles and consists of a linear arrangement of at least three, preferably at least four, magnets that are positioned in a staggered fashion or in zigzag formation.

According to one embodiment shown in FIG. 4B2 and in FIG. 8A-B of WO 2018/019594 A1, a suitable magnetic-field generating device (430) for bi-axially orienting at least a part of the platelet-shaped magnetic or magnetizable pigment particles consists of two dipole magnets (M1, M2) having an opposite magnetic direction. As shown in FIG. 4B2, the platelet-shaped magnetic or magnetizable pigment particles in the coating layer (410) on the substrate (420) are exposed to the magnetic field (magnetic field lines shown as lines with arrows pointing from the North Pole and the South Pole) of the magnetic fields of the magnetic-field generating device (430) in one or more areas (shown as dotted rectangles A, A') wherein the magnetic field is substantially homogeneous and wherein the magnetic field lines are substantially parallel to each other in said one or more areas and wherein the substrate (420) carrying the coating layer (410) is provided in said one or more areas with the angle α described herein.

According to one embodiment shown in FIGS. 4B3 and 7A-B of WO 2018/019594 A1, a suitable magnetic-field generating device (430) for bi-axially orienting at least a part of the platelet-shaped magnetic or magnetizable pigment particles consists of two dipole magnets (M1, M2) having a same magnetic direction. As shown in FIG. 4B3, the platelet-shaped magnetic or magnetizable pigment particles in the coating layer (410) on the substrate (420) are exposed to the magnetic field (magnetic field lines shown as lines with arrows pointing from the North Pole to the South Pole) of the magnetic fields of the magnetic-field generating device (430) in one or more areas (shown as a dotted rectangle A) wherein the magnetic field is substantially homogeneous and wherein the magnetic field lines are substantially parallel to each other in said one or more areas and wherein the substrate (420) carrying the coating layer (410) is provided in said one or more areas with the angle α described herein.

According to one embodiment shown in 4B4 and FIG. 3A-B of WO 2018/019594 A1, a suitable magnetic-field generating device (430) for bi-axially orienting at least a part of the platelet-shaped magnetic or magnetizable pigment particles consists of a Halbach array comprising five dipole magnets (M1-M5). As shown in FIG. 4B4, the platelet-shaped magnetic or magnetizable pigment particles in the coating layer (410) on the substrate (420) are exposed to the magnetic field (magnetic field lines shown as lines with arrows pointing from the North Pole to the South Pole) of the magnetic fields of the magnetic-field generating device (430) in one or more areas (shown as a dotted parallelepiped A) wherein the magnetic field is substantially homogeneous and wherein the magnetic field lines are substantially parallel to each other in said one or more areas and wherein the substrate (420) carrying the coating layer (410) is provided in said one or more areas with the angle α described herein.

According to one embodiment shown in 4B5 and FIG. 12A of WO 2016/083259 A1, a suitable magnetic-field generating device (430) for bi-axially orienting at least a part of the platelet-shaped magnetic or magnetizable pigment particles consists of a Halbach cylinder assembly comprising four structures, each one comprising a magnet bar (M1-M4) surrounded by a magnet-wire coil (not shown).

As shown in FIG. 4B5, the platelet-shaped magnetic or magnetizable pigment particles in the coating layer (410) on the substrate (420) are exposed to the magnetic field (magnetic field lines shown as lines with arrows pointing from the North Pole to the South Pole) of the magnetic fields of the magnetic-field generating device (430) in one or more areas (shown as a dotted rectangle A) wherein the magnetic field is substantially homogeneous and wherein the magnetic field lines are substantially parallel to each other in said one or more areas and wherein the substrate (420) carrying the coating layer (410) is provided in said one or more areas with the angle α described herein.

Figure 6A:
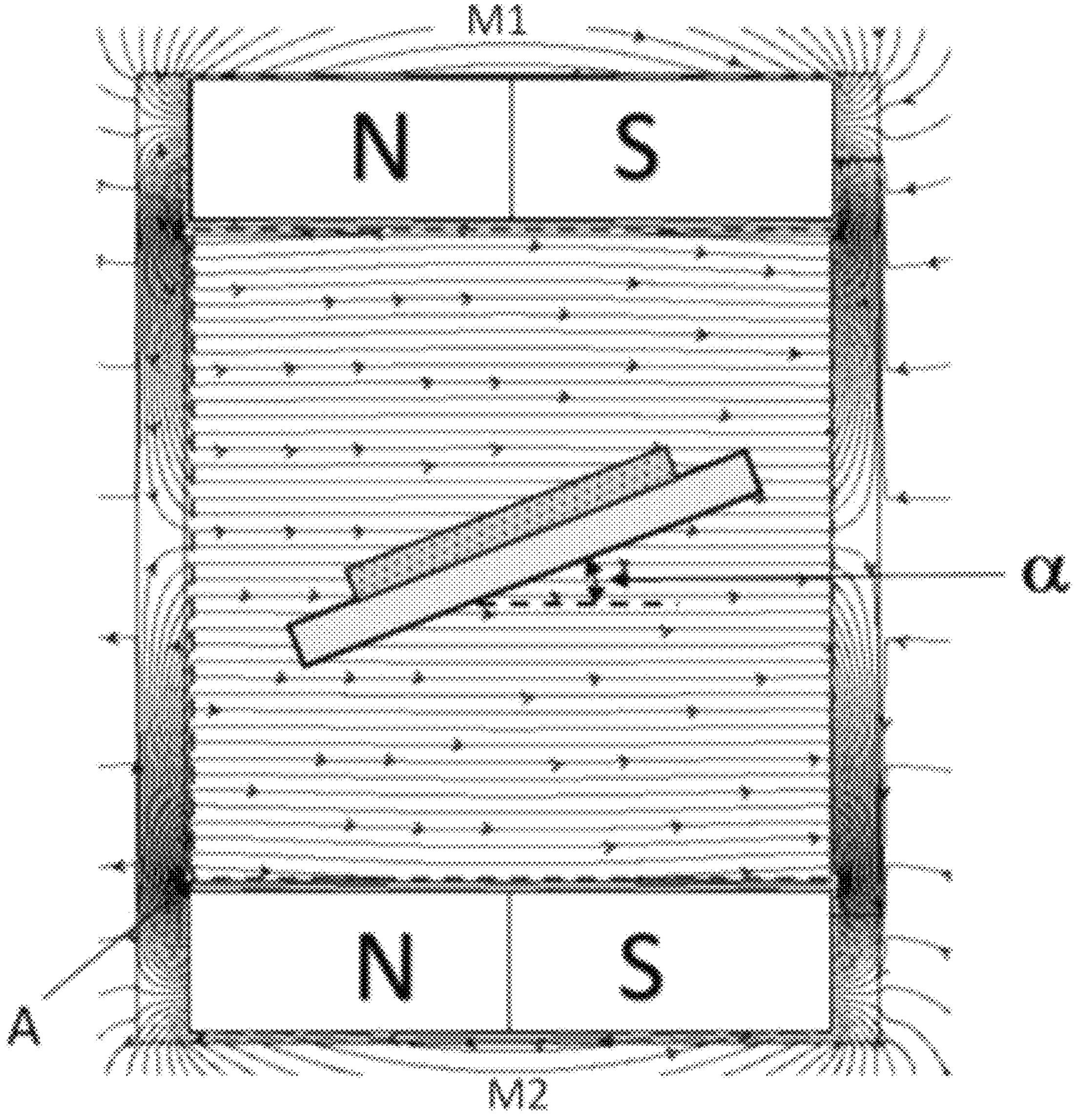

According to one embodiment shown in 4B6 and FIG. 2A of the co-pending application EP 20176506.2, a suitable magnetic-field generating device (430) for bi-axially orienting at least a part of the platelet-shaped magnetic or magnetizable pigment particles consists of an assembly of eight bar dipole magnets (M1-M8), said assembly comprising a first set comprising a first bar dipole magnet (M4) and two second bar dipole magnets (M1, M6), a second set comprising a first bar dipole magnet (M5) and two second bar dipole magnets (M3; M8) and a first pair of third bar dipole magnets (M2, M7). As shown in FIG. 4B6, the platelet-shaped magnetic or magnetizable pigment particles in the coating layer (410) on the substrate (420) are exposed to the magnetic field (magnetic field lines shown as lines with arrows pointing from the North Pole to the South Pole) of the magnetic fields of the magnetic-field generating device (430) in one or more areas (shown as a dotted rectangle A) wherein the magnetic field is substantially homogeneous and wherein the magnetic field lines are substantially parallel to each other in said one or more areas and wherein the substrate (420) carrying the coating layer (410) is provided in said one or more areas with the angle α described herein.

According to one embodiment shown in FIG. 5A1-3 and used in the Examples hereafter, a suitable magnetic-field generating device (530) for bi-axially so as orient at least a part of the platelet-shaped magnetic or magnetizable pigment particles consists of an assembly comprising nine bar dipole magnets (M1-M9) with alternating North-South magnetic directions and arranged in a row. As shown in FIG. 5A2, the platelet-shaped magnetic or magnetizable pigment particles in the coating layer (510) on the substrate (520) are exposed to the magnetic field (magnetic field lines shown as lines with arrows pointing from the North Pole to the South Pole) of the magnetic fields of the magnetic-field generating device (530) in one or more areas (shown as a dotted parallelepiped A) wherein the magnetic field is substantially homogeneous and wherein the magnetic field lines are substantially parallel to each other in said one or more areas and wherein the substrate (520) carrying the coating layer (510) is provided in said one or more areas with the angle α described herein.

As known by the man skilled in the art, if the substrate (×20) carrying the coating layer (×10) is static or concomitantly moves with the magnetic-field generating devices (i.e. moves at the same speed as the magnetic-field generating device) shown in FIGS. 4B1-4B6 and FIG. 5, the platelet-shaped magnetic or magnetizable pigment particles are mono-axially oriented upon exposure to said devices.

During the magnetic orientation described herein of the magnetic or magnetizable pigment particles, the substrate (×20) carrying the coating layer (×10) may be disposed on a non-magnetic supporting plate (×40) which is made of one or more non-magnetic materials.

The methods described herein further comprise, partially simultaneously with or subsequently to step b), the step c) of at least partially curing the coating layer (×10) with the curing unit (×40) described herein so as to at least partially fix the position and orientation of the platelet-shaped magnetic or magnetizable pigment particles in the coating layer (×10) so as to produce the at least partially cured coating layer (×10) described herein, wherein the elevation angle γ described herein is larger than 0° and smaller than 30° (0°<γ<30°) or larger than 150° and smaller than 180° (150°<γ<180°), preferably larger than or equal to about 5° and smaller than 30° (5°≤γ<30°) or larger than 150° and smaller than or equal to about 175°(150°≤γ≤175°), more preferably in the range from about 5° to about 25°(5°≤γ25°) or from about 155° to about 175°(155°≤γ≤175°).

For embodiments, wherein the step b) is carried out to so as to bi-axially orient at least a part of the platelet-shaped magnetic or magnetizable pigment particles described herein, the step c) of at least partially curing the coating layer (×10) with the curing unit (×40) described herein is preferably carried out partially simultaneously with step b).

According to one embodiment for preparing the one or more OELs such as those shown in FIG. 3B and described hereabove, i.e. said OELs comprising or consisting of the single at least partially cured coating layer (×10) comprising the platelet-shaped magnetic or magnetizable pigment particles in one or more first zones (×10-a) and the platelet-shaped magnetic or magnetizable pigment particles in one or more second zones (×10-b) with magnetically oriented platelet-shaped magnetic or magnetizable pigment particles incorporated therein having an elevation angle γ in the one or more first zones (×10-a) and an additional elevation angle γ' in the one or more second zones (×10-b), wherein the elevation angle γ and additional elevation angle γ' independently are larger than 0° and smaller than 30° (0°<γ, γ'<30°) or larger than 150° and smaller than 180° (150°<γ'<180°), preferably larger than or equal to about 5° and smaller than 30° (5°≤γ, γ'<30°) or larger than 150° and smaller than or equal to about 175°(150°<γ, γ'≤175°), more preferably, in the range from about 5° to about 25°(5°≤γ, γ'≤25°) or from about 155° to about 175°(155°≤γ, γ'≤175°), said elevation angle γ and elevation angle γ' being different from each other and/or being not coplanar; the method comprises the steps of the step a) of applying on the substrate (×20) surface described herein the radiation curable coating composition comprising the platelet-shaped magnetic or magnetizable pigment particles described herein, the step b) of exposing the coating layer (×10) to the magnetic field of the magnetic-field generating device (×30) described herein with the substrate (×20) carrying the coating layer (×10) being provided in the one or more areas wherein the magnetic field is substantially homogeneous described herein with the angle c described herein, c) a step of selectively at least partially curing with a selective curing unit (×50) the one or more first areas of the coating layer (×10) to fix at least a part of the platelet-shaped magnetic or magnetizable particles in their adopted positions and orientations, such that one or more second zones (of the coating layer (×10) remain unexposed to irradiation; said step being carried out partially simultaneously with or subsequently to step b);

d) a step of exposing the coating layer (×10) to a second magnetic field of a second magnetic-field generating device in one or more areas wherein the second magnetic field is homogeneous so as to orient at least a part of the platelet-shaped magnetic or magnetizable pigment particles, wherein the substrate (×20) carrying the coating layer (×10) is provided in said one or more areas wherein the magnetic field is substantially homogeneous with an angle α', formed by the coating layer (×10) and a tangent to magnetic field lines of the second magnetic field within the one or more areas wherein the magnetic field is homogeneous, the angle α' being larger than 0° and smaller than 30° (0°<α'<30°) or larger than 150° and smaller than 180° (150°<Ω̅'<180°), preferably larger than or equal to about 5° and smaller than 30° (5°≤α'<30°) or larger than 150° and smaller than or equal to about 175° (150°<α'≤175°), more preferably in the range from about 5° to about 25°(5°≤α'≤25°) or from about 155° to about 175°(155°≤α'≤175°); α' being different from a; and, e) partially simultaneously with or subsequently to the step d) of exposing the coating layer (×10) to the magnetic field of the second magnetic-field-generating device, the step c) of at least partially curing the coating layer (×10) with the curing unit (×40) described herein.

According to one embodiment for preparing the one or more OELs such as those shown in FIGS. 3C-D and described hereabove, i.e. said OELs comprising or consisting of i) an at least partially cured coating layer (×10) with magnetically oriented platelet-shaped magnetic or magnetizable pigment particles incorporated therein and ii) an at least partially cured second coating layer (×11) with magnetically oriented second platelet-shaped magnetic or magnetizable pigment particles incorporated therein, said at least partially cured second coating layer (×11) partially or fully overlapping the at least partially cured coating layer (×10), wherein substantially all the platelet-shaped magnetic or magnetizable pigment particles in the at least partially cured coating layer (×10) have substantially the same elevation angle γ and substantially all second platelet-shaped magnetic or magnetizable pigment particles in the at least partially cured second coating layer (×11) have substantially the same additional elevation angle γ'. The orientation of each of the second platelet-shaped pigment particles is defined by the platelet vector described herein and the platelet vectors of the second platelet-shaped magnetic or magnetizable pigment particles are angled with respect to the two-dimensional surface of the substrate (×20) at the positions of the particles by the additional elevation angle γ'. The elevation angle γ and additional elevation angle γ' independently are larger than 0° and smaller than 30° (0°<γ, γ'<30°) or larger than 150° and smaller than 180° (150°<γ, γ'<180°), preferably larger than or equal to about 5° and smaller than 30° (5°≤γ,γ'<30°) or larger than 150° and smaller than or equal to about 175°(150°<γ, γ'≤175°), more preferably, in the range from about 5° to about 25°(5°≤γ, γ'≤125°) or from about 155° to about 175°(155°≤γ, γ'≤175°), said elevation angle γ and additional elevation angle γ' being different from each other and/or being not coplanar, the method comprises the step of a) applying on the substrate (×20) surface described herein the radiation curable coating composition comprising the platelet-shaped magnetic or magnetizable pigment particles described herein, the step b) of exposing the coating layer (×10) to the magnetic field of the magnetic-field generating device (×30) described herein with the substrate (×20) carrying the coating layer (×10) being provided in the one or more areas wherein the magnetic field is substantially homogeneous described herein with the angle α described herein, partially simultaneously with or subsequently to the step b), the step c) of at least partially curing the coating layer (×10) with the curing unit (×40) described herein;

subsequently to step c), a step d) of applying either partially (FIG. 3C) or fully (FIG. 3D) on the at least partially cured coating layer (×10) a second radiation curable coating composition comprising the second platelet-shaped magnetic or magnetizable pigment particles, said second radiation curable coating composition being in a first, liquid state so as to form a second coating layer (×11), wherein said second radiation curable coating composition is the same as or is different from the radiation curable coating composition of step a);

a step e) of exposing the second coating layer (×11) to a second magnetic field of a second magnetic-field generating device in one or more areas wherein the second magnetic field is homogeneous so as to orient at least a part of the second platelet-shaped magnetic or magnetizable pigment particles, wherein the substrate (×20) carrying the second coating layer (×11) is provided in said one or more areas with an angle α', formed by the second coating layer (×11) and a tangent to magnetic field lines of the second magnetic field within the one or more areas wherein the magnetic field is homogeneous, said angle α' being larger than 0° and smaller than 30° (0°<α'<30°) or larger than 150° and smaller than 180° (150°<α'<180°), preferably larger than or equal to about 5° and smaller than 30° (5° & α'<30°) or larger than 150° and smaller than or equal to about 175°(150°<α'≤175°), more preferably in the range from about 5° to about 25°(5°≤α'≤25°) or from about 155° to about 175°(155°≤α'≤175°); wherein the second magnetic-field generating device is the same as or is different from the magnetic-field generating device of step b); α' being different from α, and partially simultaneously with or subsequently to the step e) of exposing the second coating layer (×11) to the second magnetic-field generating device, a step f) of at least partially curing the second coating layer (×11) with a curing unit (×40) so as to at least partially fix the position and orientation of second the platelet-shaped magnetic or magnetizable pigment particles in the second coating layer (×11) so as to produce the at least partially cured second coating layer (×11).

According to one embodiment for preparing the one or more OELs such as those shown in FIG. 3E and described hereabove, i.e. said OELs comprising or consisting of i) an at least partially cured coating layer (×10) with magnetically oriented platelet-shaped magnetic or magnetizable pigment particles incorporated therein and ii) an at least partially cured second coating layer (×11) with magnetically oriented second platelet-shaped magnetic or magnetizable pigment particles incorporated therein, said at least partially cured second coating layer being adjacent to (FIG. 3E) or spaced apart (not shown) from the at least partially cured coating layer (×10), wherein substantially all the platelet-shaped magnetic or magnetizable pigment particles in the at least partially cured coating layer (×10) have substantially the same elevation angle γ and substantially all second platelet-shaped magnetic or magnetizable pigment particles in the at least partially cured second coating layer (×11) have substantially the same additional elevation angle γ'. The orientation of each of the second platelet-shaped pigment particles is defined by the platelet vector described herein and the platelet vectors of the second platelet-shaped magnetic or magnetizable pigment particles are angled with respect to the two-dimensional surface of the substrate (×20) at the positions of the particles by the additional elevation angle γ'. The elevation angle γ and additional elevation angle γ' independently are larger than 0° and smaller than 30° (0°<γ, γ'<30°) or larger than 150° and smaller than 180°(150°<γ, γ'<180°), preferably larger than or equal to about 5° and smaller than 30° (5°≤γ, γ'<30°) or larger than 150° and smaller than or equal to about 175°(150°<γ, γ'≤175°), more preferably, in the range from about 5° to about 25°(5°≤γ, γ'≤25°) or from about 155° to about 175°(155°≤γ, γ'≤175°), said elevation angle γ and additional elevation angle γ' being different from each other and/or being not coplanar; the method comprises

- the step of a) applying on the substrate (×20) surface described herein the radiation curable coating composition comprising the platelet-shaped magnetic or magnetizable pigment particles described herein,
- the step b) of exposing the coating layer (×10) to the magnetic field of the magnetic-field generating device (×30) described herein with the substrate (×20) carrying the coating layer (×10) being provided in the one or more areas wherein the magnetic field is substantially homogeneous described herein with the angle α described herein,
- partially simultaneously with or subsequently to the step b), the step c) of at least partially curing the coating layer (×10) with the curing unit (×40) described herein;
- subsequently to step c), a step d) of applying a second radiation curable coating composition comprising second platelet-shaped magnetic or magnetizable pigment particles, said second radiation curable coating composition being in a first, liquid state so as to form a second coating layer (×11), wherein said second coating layer (×11) is either adjacent to (FIG. 3E) or spaced apart (not shown) from the coating layer (×10) and wherein said second radiation curable coating composition is the same as or is different from the radiation curable coating composition of step a);
- a step of e) exposing the second coating layer (×11) to a magnetic field of a second magnetic-field generating device in one or more areas wherein the second magnetic field is homogeneous so as to orient at least a part of the second platelet-shaped magnetic or magnetizable pigment particles, wherein the substrate (×20) carrying the second coating layer (×11) is provided in said one or more areas with an angle α', formed by the second coating layer (×11) and a tangent to the magnetic field lines of the second magnetic field within the one or more areas wherein the magnetic field is homogeneous, said angle α' being larger than 0° and smaller than 30° (0°<α'<30°) or larger than 150° and smaller than 180° (150°<α'<180°), preferably larger than or equal to about 5° and smaller than 30° (5°≤α'<30°) or larger than 150° and smaller than or equal to about 175° (150°<α'≤175°), more preferably in the range from about 5° to about 25°(5°≤α'≤25°) or from about 155° to about 175°(155°≤α'≤175°);
- wherein the second magnetic-field generating device is the same as or is different from the magnetic-field generating device of step b); α' being different from α, and
- partially simultaneously with or subsequently to the step e) of exposing the second coating layer (×11) to the second magnetic-field generating device, a step f) of at least partially curing the second coating layer (×11) with a curing unit (×40) so as to at least partially fix the position and orientation of the second platelet-shaped magnetic or magnetizable pigment particles in the second coating layer (×11) so as to produce the at least partially cured second coating layer (×11).

Suitable curing units (×40) include equipments for UV-visible curing units comprising a high-power light-emitting-diode (LED) lamp, or an arc discharge lamp, such as a medium-pressure mercury arc (MPMA) or a metal-vapor arc lamp, as the source of the actinic radiation. The selective curing units (×50) described herein may comprise one or more fixed or removable photomasks including one or more voids corresponding to a pattern to be formed as a part of the coating layer. The one or more selective curing units (×50) may be addressable such as the scanning laser beam disclosed in EP 2 468 423 A1, an array of light-emitting diodes (LEDs) disclosed in WO 2017/021504 A1 or an actinic radiation LED source (×41) comprising an array of individually addressable actinic radiation emitters disclosed in the co-pending patent application PCT/EP2019/087072.

According to one embodiment wherein the security documents or decorative articles comprising the substrate (×20) described herein, the one or more OELs described herein and the one or more patterns described herein between the substrate (×20) and the one or more OELs, each of them independently having the shape of an indicium, the method described herein comprises a step of applying a composition in the form of the one or more patterns having the shape of an indicium, said step occurring prior to the step a) described herein. The step of applying the composition in the form of the one or more patterns described herein may be carried out by a contactless fluid microdispensing process such as curtain coating, spray coating, aerosol jet printing, electrohydrodynamic printing and inkjet printing or may be carried out by a printing process selected from the group consisting of offset, screen printing, rotogravure printing, flexography printing, intaglio printing (also referred in the art as engraved copper plate printing, engraved steel die printing).

Also described herein are printing apparatuses comprising one or more printing units, one or more magnetic-field-generating devices (×30) and one or more curing units (×40), the one or more printing units, the one more magnetic-field-generating devices (×30) and the one or more curing units (×40) being arranged in sequential and alternating stationary locations, that is so that a stationary magnetic-field-generating device (×30) is disposed after a stationary printing unit and before a stationary curing unit.

Also described herein are printing apparatuses comprising a rotating magnetic cylinder and the one or more magnetic-field generating devices (x30) described herein, wherein said one or more magnetic-field generating devices (x30) are mounted to circumferential or axial grooves of the rotating magnetic cylinder as well as printing assemblies comprising a flatbed printing unit and one or more of the magnetic-field generating devices (x30) described herein, wherein said one or more magnetic-field generating devices (x30) are mounted to recesses of the flatbed printing unit.

The rotating magnetic cylinder is meant to be used in, or in conjunction with, or being part of a printing or coating equipment, and bearing one or more of the magnetic-field generating devices (x30) described herein. In an embodiment, the rotating magnetic cylinder is part of a rotary, sheet-fed or web-fed industrial printing press that operates at high printing speed in a continuous way.

The flatbed printing unit is meant to be used in, or in conjunction with, or being part of a printing or coating equipment, and bearing one or more of the magnetic-field generating devices (x30) described herein. In an embodiment, the flatbed printing unit is part of a sheet-fed industrial printing press that operates in a discontinuous way.

The printing apparatuses comprising the rotating magnetic cylinder described herein or the flatbed printing unit described herein may include a substrate feeder for feeding a substrate such as those described herein having thereon the coating layer (x10, x11) comprising the platelet-shaped magnetic or magnetizable pigment particles described herein. In an embodiment of the printing apparatuses comprising a rotating magnetic cylinder described herein, the substrate is fed by the substrate feeder under the form of sheets or a web. In an embodiment of the printing apparatuses comprising a flatbed printing unit described herein, the substrate is fed under the form of sheets.

The printing apparatuses comprising the rotating magnetic cylinder described herein or the flatbed printing unit described herein may include a coating or printing unit for applying the radiation curable coating composition comprising the platelet-shaped magnetic or magnetizable pigment particles described herein on the substrate (x20) described herein. In an embodiment of the printing apparatuses comprising a rotating magnetic cylinder described herein, the coating or printing unit works according to a rotary, continuous process. In an embodiment of the printing apparatuses comprising a flatbed printing unit described herein, the coating or printing unit works according to a linear, discontinuous process.

The printing apparatuses comprising the rotating magnetic cylinder described herein or the flatbed printing unit described herein may include the curing unit (x40) described herein for at least partially curing the radiation curable coating composition comprising the platelet-shaped magnetic or magnetizable pigment particles that have been magnetically oriented by the magnetic-field generating devices (x30) described herein, thereby fixing the orientation and position of the pigment particles to produce the one or more OELS described herein.

EXAMPLES

The Examples and Comparative Examples have been carried out by using the UV-Vis curable screen printing ink of the formula given in Table 1 and the first and second magnetic assemblies described herebelow.

TABLE 1

| | |
|---|---|
| Epoxyacrylate oligomer (Allnex) | 30.1 wt-% |
| Trimethylolpropane triacrylate monomer (Allnex) | 21.0 wt-% |
| Tripropyleneglycol diacrylate monomer (Allnex) | 21.5 wt-% |
| Genorad 16 (Rahn) | 1.1 wt-% |
| Aerosil 200 (Evonik) | 1.1 wt-% |
| Speedcure TPO-L (Lambson) | 2.2 wt-% |
| Irgacure ® 500 (IGM) | 6.4 wt-% |
| Genocure ® EPD (Rahn) | 2.2 wt-% |
| BYK ® 371 (BYK) | 2.2 wt-% |
| Tego Foamex N (Evonik) | 2.2 wt-% |
| magnetic pigment particles (*) | 10.0 wt-% |

(*) 5-layer platelet-shaped magnetic pigment particles exhibiting a metallic silver color having a flake shape of diameter $d_{50}$ about 12 μm and thickness about 1 μm, obtained from VIAVI Solutions, Santa Rosa, CA.

Examples according to the present invention E1-E8 exhibited an eye-catching visual appearance upon tilting about a horizontal/latitudinal axis, wherein eye-catching visual appearance is seen as a sharp and contrasted switch-on/switch off effect of the brightness and consists off an increase of the brightness value to reach a maximum value of brightness and then a decrease of said brightness within the viewing/observation angles about −45° and about +45°, Magnetic-Field Generating Device for Bi-Axial Orientation (FIG. 5)

A magnetic assembly (530) was used to bi-axially orient the pigment particles. The magnetic assembly (530) comprised nine bar dipole magnets (M1-M9).

Each of the nine bar dipole magnets (M1-M9) had the following dimensions: 100 mm (L1)x10 mm (L2)x10 mm (L3). The magnetic field generating device (530) was embedded in a non-magnetic holder made of polyoxymethylene (POM) (not shown) having the following dimensions: 250 mmx150 mmx12 mm. The nine bar dipole magnets (M1-M9) were made of NdFeB N40.

The nine bar dipole magnets (M1-M9) were disposed in a row at a distance (d1) of about 10 mm from each other, the top surface of the nine bar dipole magnets (M1-M9) being flush. The magnetic axis of each of the nine bar dipole magnets (M1-M9) was substantially parallel to the thickness (L3) of said magnets, the magnetic direction of two neighboring magnets (M1-M9) pointing in opposite direction (alternating magnetization).

As shown in FIG. 5A1-A2, the magnetic field was substantially homogeneous and the magnetic field lines were substantially coplanar in the area A.

Magnetic-Field-Generating Device for Mono-Axial Orientation (FIG. 6)

A magnetic field generating device (630) was used to mono-axially orient the pigment particles. The magnetic field generating device (630) comprised two bar dipole magnets (M1, M2) and two pole pieces (P1, P2).

Each of the two bar dipole magnets (M1, M2) had the following dimensions: 40 mm (L1)x40 mm (L2)x10 mm (L3). The two bar dipole magnets (M1, M2) were made of NdFeB N42.

The two bar dipole magnets (M1, M2) were at a distance (d1) of about 40 mm from each other.

The magnetic axis of each of the two bar dipole magnets (M1, M2) was substantially parallel to the length (L1) of said magnets, the magnetic direction of said two bar dipole magnets (M1, M2) pointing in the same direction.

Each of the two pole pieces (P1, P2) had the following dimensions: 60 mm (L4)x40 mm (L5)x3 mm (L6). The two pole pieces (P1, P2) were made of iron (ARMCO®).

The two bar dipole magnets (M1, M2) and the two pole pieces (P1, P2) were disposed such as to form a rectangular cuboid with a centered rectangular cuboid void, said void consisting of the area A wherein the magnetic field was substantially homogeneous and wherein the magnetic field lines were substantially parallel to each other, such that the distance (d2) between the two pole pieces (P1, P2) was about 40 mm, i.e. the distance (d2) between the two pole pieces (P1, P2) was the length (L1) of the two bar dipole magnets (M1, M2).

E1-E5 and C1-C3 (FIG. 3A, FIG. 5, FIG. 7)

For each sample, the UV-Vis curable screen printing ink of Table 1 was applied onto on a piece of PET (BG71 Colour Laser Printer & Copier OHP Film from Folex 100 micrometers thick, 45 mm×30 mm) (520) so as to form a coating layer (40 mm×25 mm) (510), wherein said application step was carried out with a laboratory screen printing device using a 90T screen so as to form a coating layer (510) having a thickness of about 20 μm.

While the coating layer (510) was still in a wet and not yet at least partially cured state, the substrate (520) was placed on top of the center of a supporting plate (300 mm×40 mm×1 mm) made of high density polyethylene (HDPE). The supporting plate carrying the substrate (520) and the coating layer (510) were moved at a speed of about 10 cm/sec beside the magnetic-field generating device (530) (as illustrated in FIG. 5) at a distance (d5) of about 20 mm between the magnetic-field-generating device (530) surface facing the substrate (520) and the nearest edge of the coating layer (510), and a height between said nearest coating layer (510) edge and the bottom surface of the magnetic magnetic-field generating device (530) being half the length (½ L1) of the bar dipole magnets (M1-M9). The supporting plate carrying the substrate (520) and the coating layer (510) was concomitantly moved while adopting an angle α, formed by the coating layer (510) and a tangent to the magnetic field lines of the magnetic field of the magnetic-field-generating device (530) within the area A wherein the magnetic field was homogeneous, said angle α having a value of about 1° (E1), 5° (E2), 10° (E3), 20° (E4), 25°(E5), 30° (C1), 40° (C2) and 50° (C3).

The coating layers (510) were independently at least partially cured by a curing unit (540) (UV LED lamp (FireFly 395 nm, 4 W/cm$^2$, from Phoseon) disposed above the substrate path at a distance (d4) of about 15 mm for the center of the length (L1) of the bar dipole magnet (M1-M9), beside the space between the eighth and ninth dipole magnets (M8 and M9) and beside the ninth bar dipole magnet (M9) at a distance (d3) of about 10 mm, as illustrated in FIG. 5A1-3.

E6 (FIG. 3D, FIG. 5, FIG. 8)

The UV-Vis curable screen printing ink of Table 1 was applied onto on a piece of PET (BG71 Colour Laser Printer & Copier OHP Film from Folex 100 micrometers thick, 45 mm×30 mm) (520) so as to form a first coating layer (510) having the shape of "A" (6 mm) (510), wherein said application step was carried out with a laboratory screen printing device using a 90T screen so as to form a coating layer (510) having a thickness of about 20 μm.

While the coating layer (510) was still in a wet and not yet at least partially cured state, the substrate (520) was placed on top of the center of a supporting plate (300 mm×40 mm×1 mm) made of high density polyethylene (HDPE). The supporting plate carrying the substrate (520) and the coating layer (510) was moved at a speed of about 10 cm/sec beside the magnetic-field generating device (530) (as illustrated in FIG. 5) at a distance (d5) of about 20 mm between the magnetic-field-generating device (530) surface facing the substrate (520) and the nearest edge of the coating layer (510), and a height between said nearest coating layer (510) edge and the bottom surface of the magnetic magnetic-field generating device (530) being half the length (½ L1) of the bar dipole magnets (M1-M9). The supporting plate carrying the substrate (520) and the coating layer (510) were concomitantly moved while adopting an angle α, formed by the coating layer (510) and a tangent to the magnetic field lines of the magnetic field of the magnetic-field-generating device (530) within the area A wherein the magnetic field was homogeneous, having a value of about 20°.

The first coating layer (510) was at least partially cured by the curing unit (540) under the same conditions/position positions as for E1-E5 and C1-C3.

For each sample, the UV-Vis curable screen printing ink of Table 1 was applied on top of the already applied coating layer (510) so as to form a second coating layer (511) having the shape of "T" (6 mm), wherein said application step was carried out with a laboratory screen printing device using a 90T screen so as to form a coating layer (511) having a thickness of about 20 μm.

While the second coating layer (511) was still in a wet and not yet at least partially cured state, the substrate (520) was exposed to the magnetic field of the magnetic-field-generating device (530) under the same conditions as for the first coating layer (510) except that the angle α' was about 160°.

The second coating layer (511) was at least partially cured by the curing unit (540) under the same conditions/position positions as for E1-E5 and C1-C3.

E7-E8 (FIG. 3A, FIG. 6, FIG. 9)

The UV-Vis curable screen printing ink of Table 1 was applied onto on a piece of PET (BG71 Colour Laser Printer & Copier OHP Film from Folex 100 micrometers thick, 45 mm×30 mm) (620) so as to form a coating layer (40 mm×25 mm) (610), wherein said application step was carried out with a laboratory screen printing device using a 90T screen so as to form a coating layer (610) having a thickness of about 20 μm.

While the coating layer (610) was still in a wet and not yet at least partially cured state, the substrate (620) was placed on top of the center of a supporting plate (60 mm×40 mm×1 mm) made of high density polyethylene (HDPE).

The supporting plate carrying the substrate (620) and the coating layer (610) were disposed in the center of the void of the magnetic assembly (630) as illustrated in FIG. 6 while adopting angle α, formed by the coating layer (610) and a tangent to magnetic field lines of the magnetic-field-generating device (630) within the area A wherein the magnetic field was homogeneous, having a value of about 20°.

For sample E7, after about 1 second, the coating layer (610) was at least partially cured by a curing unit (640) (UV LED lamp (FireFly 395 nm, 4 W/cm$^2$, from Phoseon) as illustrated in FIG. 6B1.

For sample E8, subsequently to the exposure to the magnetic field, the supporting plate carrying the substrate (620) and the coating layer (610) were moved at a distance (d) of about 1 cm away from the magnetic assembly (630), the coating layer (610) was cured upon exposure during about 0.5 second to a UV-LED-lamp (640) from Phoseon (Type FireFlex 50×75 mm, 395 nm, 8 W/cm$^2$), as illustrated in FIG. 6B2.

Correlation Between the Angles α During the Orientation Step and the Elevation Angles γ of the Pigment Particles in the Coating Layer (×10)

The correlation between the angles σ during the method described hereabove and the elevation angles γ was assessed by measuring said elevation angles γ by using the conoscopic scatterometer measurements according to the method disclosed in WO 2019/038371 A1 and by measuring the elevation angles of a selection of five adjacent pigment particles on a SEM picture (ZEISS EVO HD15, using standard method of sample preparation by embedding into an epoxy matrix (Technicol 9461) with the following dimensions: 10 mm×10 mm×30 mm) a cross-section of the coating layer (×10). Results are provided in Table 2.

TABLE 2

| | Angle α | Expected elevation angle γ | Elevation angle γ measured by a conoscopic scatterometer | Elevation angle γ as measured on SEM pictures |
|---|---|---|---|---|
| E1 | 1° | 1° | NA[1] | NA[2] |
| E2 | 5° | 5° | NA[1] | NA[2] |
| E3 | 10° | 10° | 11° | 10° |
| E4 | 20° | 20° | 20° | 19° |
| E5 | 25° | 25° | NA[1] | NA[1] |
| C1 | 30° | 30° | 29° | NA[3] |
| C2 | 40° | 40° | NA[3] | NA[1] |

[1]not measured

[2]the elevation angle was too small to be measured with sufficient accuracy with SEM images

[3]the elevation angle is too big to be measured by conoscopic scatterometer (total field of view is limited to 40° and the scatterometer does not allow to use 100% of the field)

The conoscopic scatterometer measurements have been performed by using a conoscopic scatterometer as described in WO 2019/038371 A1, FIG. 4A (obtained from Eckhartd Optics LLC, 5430 Jefferson Ct, White Bear Lake, MN 55110; http://eckop.com). The elevation angles γ were measured on a coating layer surface of about 1 $mm^2$, i.e. the reported values were averaged on about one thousand particles SEM measurements have been performed by using a SEM microscope (ZEISS EVO HD15, magnification ×500) on a microtome slice of the samples (slice plane perpendicular to the substrate surface and the coating layer thickness, and perpendicular to the tilting axis, as illustrated in FIG. 3). The substrates carrying the coating layer were first independently embedded in an epoxy resin (Technicol 9461) that was left to dry for 24 hours at room temperature before cutting and polishing the microtome slice to produce samples with the following dimensions: 10 mm×10 mm×30 mm. The reported values were averaged on five particles.

As illustrated in Table 2, there was an excellent correlation between the angles c with the measured elevation angles γ.

Brightness at Different Observation Angles θ

The samples were disposed and fixed with a scotch tape on a paper substrate (respectively black or white). The assemblies carrying the coating layer (×10, ×11), the PET substrate (×20) and the paper substrate were independently disposed on a tilting holder in an integration sphere (internal diameter 1 m from Dongguan Yaoke Instrument) as illustrated in FIG. 10. The assemblies were illuminated with an illumination source (light bulb (30 W, at 100% power) disposed at a distance of about 100 cm from the PET substrate surface.

A camera (Nikon D800, lens Nikkor 105/2.8 ED, shutter speed 1/200 sec, aperture f/36, ISO 6400) was disposed on an imaginary line between the assemblies and the illumination source, at a distance of about 50 cm from the PET substrate. The images were acquired at 3680×2456 pixels (TIFF).

The holder supporting the assembly was rotated so that it was observed at observation angles θ=50°, 40°, 30°, 20°, 10° 0, −5°, −10°, −15°, −20°, −25°, −30°, −35°, −40°, −45°, −50°, −55°, −60°, −65° and −70° (θ<0° corresponding to the assembly top edge being near the camera; θ>0° corresponding to the assembly bottom edge being near the camera) as illustrated in FIG. 1.

Figure 7A:
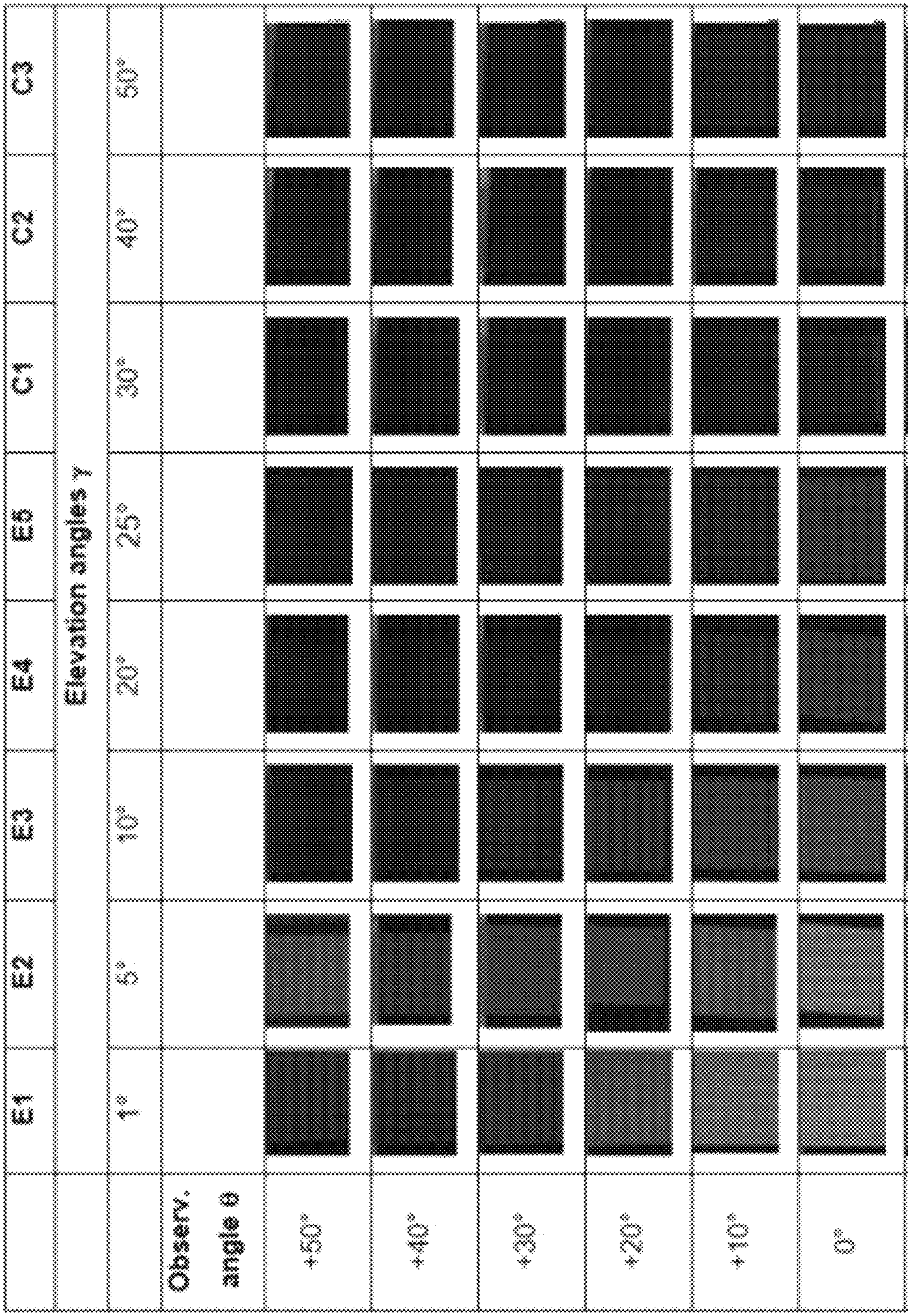
FIG. 7A show photographic images of OELs, said OELs being obtained by using the method and device shown in FIG. 5.
Figure 7A:
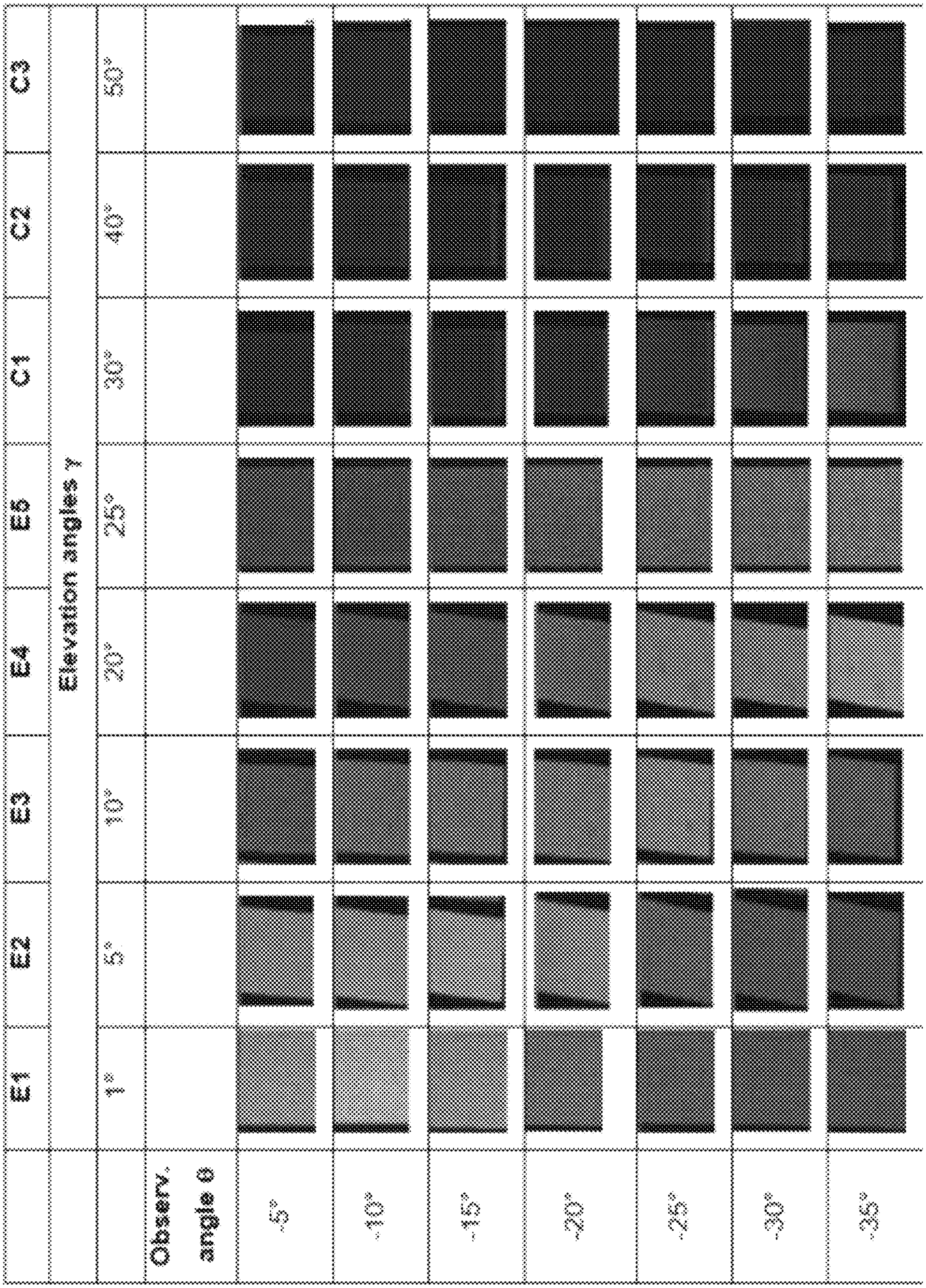
Figure 7A:
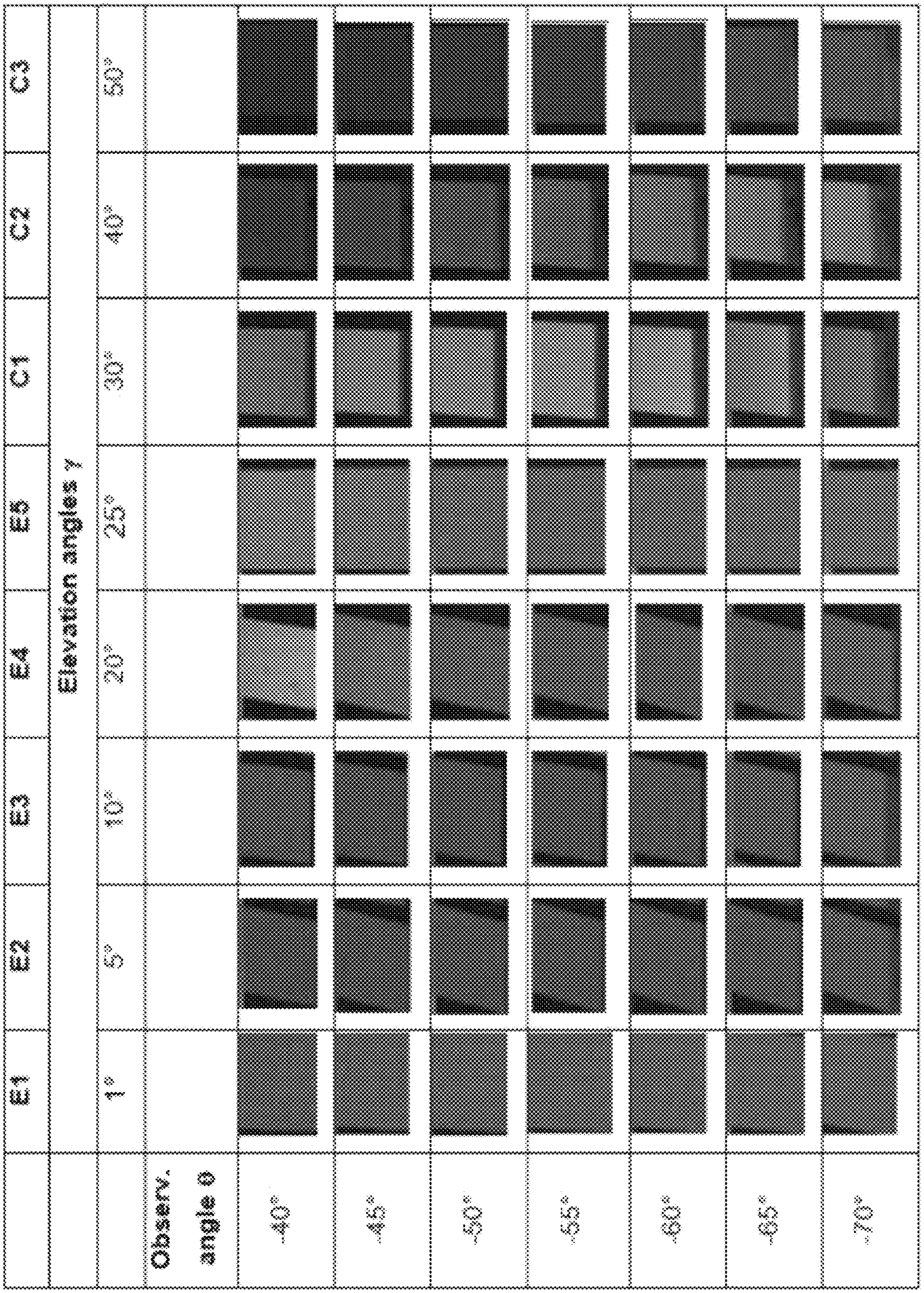
Figure 8:
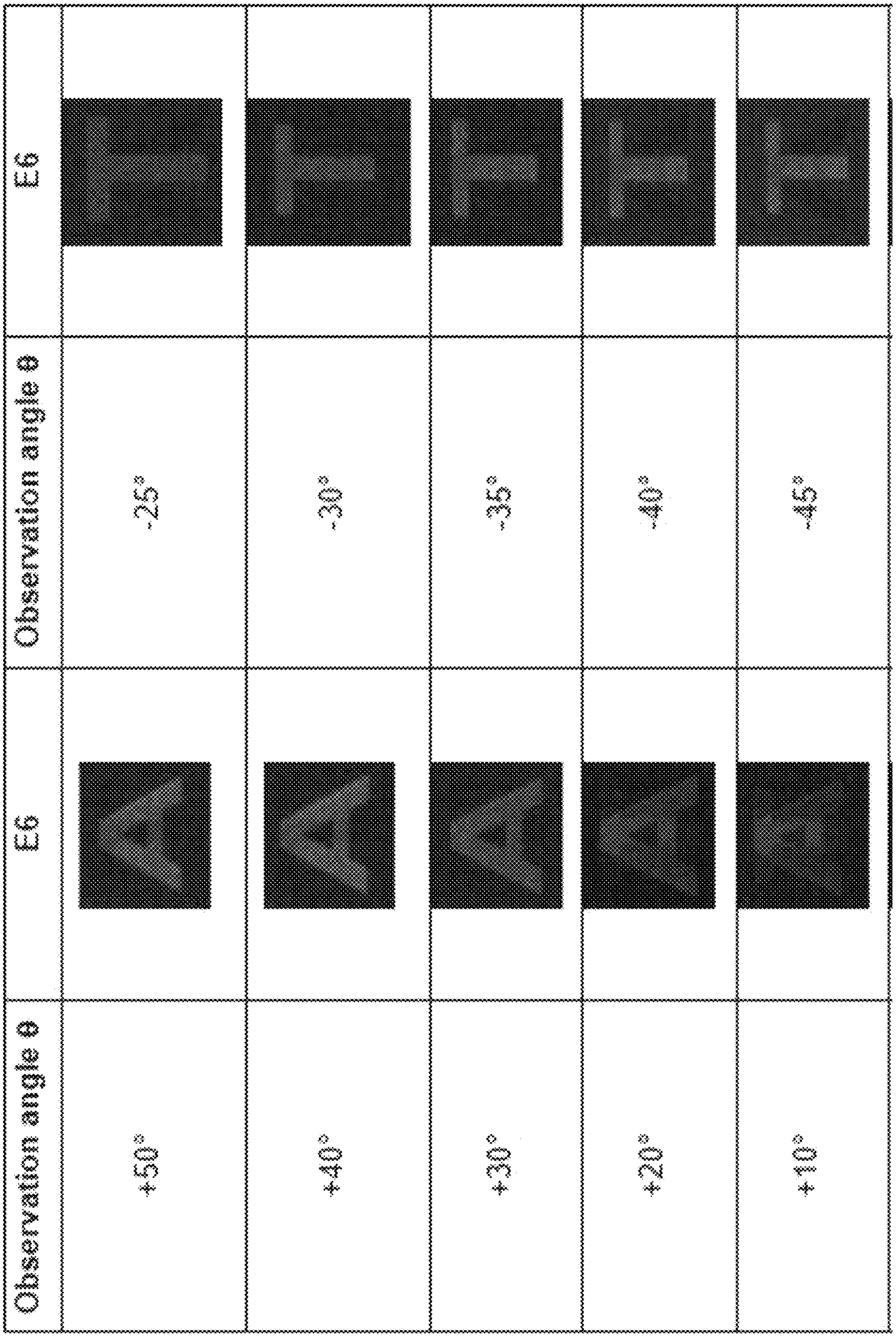
FIG. 8 show photographic images of OELs comprising bi-axially oriented pigment particles and similar to FIG. 3D, said OELs being obtained by using the method and device shown in FIG. 5.

The so-obtained pictures of E1-E5 and C1-C3 at different observation angles are shown in FIG. 7A and the so-obtained pictures of E6 at different observation angles are shown in FIG. 8.

Figure 7B:
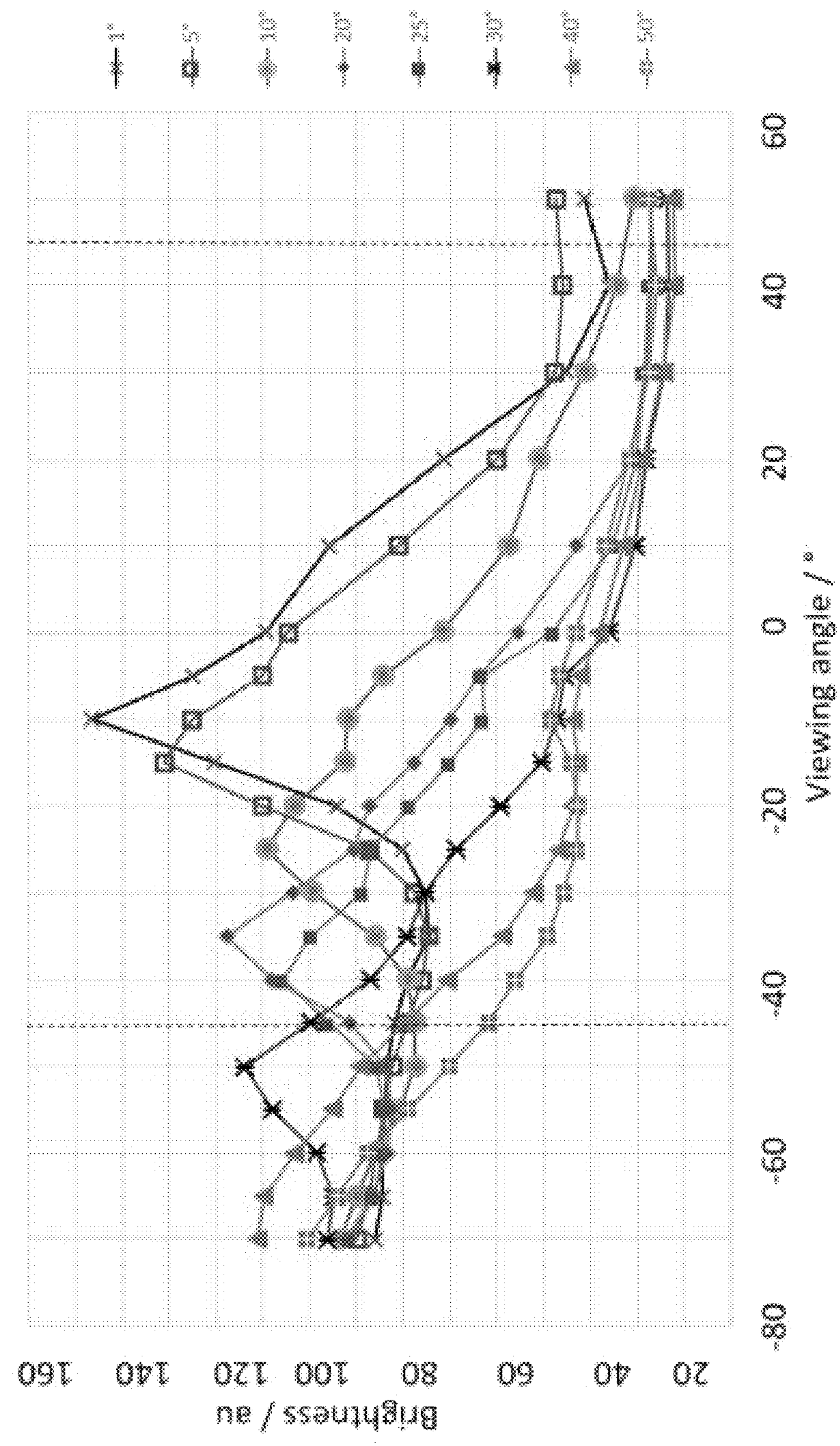
FIG. 7B illustrates curves of the brightness values of the OELs comprising bi-axially oriented pigment particles shown in FIG. 7A and having different elevation angles γ, wherein the OELs have been printed on a transparent PET substrate disposed on a black substrate. The y-axis represents the brightness of the OEL in arbitrary units as calculated on 100×100 pixels areas of OEL's pictures, the x-axis representing the observation angles θ.

The brightness of E1-E5, E7-E8 and C1-C3 were assessed using Adobe Photoshop® and by calculating the brightness average of a 100 pixels×100 pixels area of each individual assembly comprising the coating layer (×10, ×11), the PET substrate (×20) and the paper substrate. FIG. 7B illustrates a graph obtained by reporting the brightness of E1-E5 and C1-C3 and FIG. 9 illustrate graphs obtained by reporting the brightness of E7-E8 at different observation angles θ varying from −50° to +70° (x-axis: observation angles θ [in degrees, °]; y-axis: brightness (arbitrary units)). The brightness curves are asymmetric as a result of the slightly less illuminated regions of the sphere due to the presence of the plate (P).

As shown in FIG. 7A-B, the optical effects layers of E1-E5 (0°<γ<30°, in particular 5°≤γ<30°, 5°≤γ≤25°) exhibited an eye-catching effect and an easily observable increase of the brightness to reach a maximum value of brightness and then a decrease of said brightness value within the viewing/observation angles about −45° and about +45°.

E1 (1°) exhibited a maximum brightness at an observation angle θ of about −10°; E2 (5°) exhibited a maximum brightness at an observation angle θ of about −15°; E3 (10°) exhibited a maximum value of brightness at an observation angle θ of about −25°; E4 exhibited a maximum value of brightness at an observation angle θ of about −35°; and E5 exhibited a maximum value of brightness at an observation angle θ of about −40°.

As shown in FIG. 8, the first coating layer (510 in FIG. 5, 310 in FIG. 3D) of E6 having the shape of a "A" was visible at observation angles from about 0° to about +50° with a maximum value of brightness at an observation angle of about +40°, while the second/top coating layer (511, in FIG. 5, 311 FIG. 3D) having the shape of a "T" was visible from −15° to about −65° with a maximum value of brightness at an observation angle of about −35°.

Figure 9A:
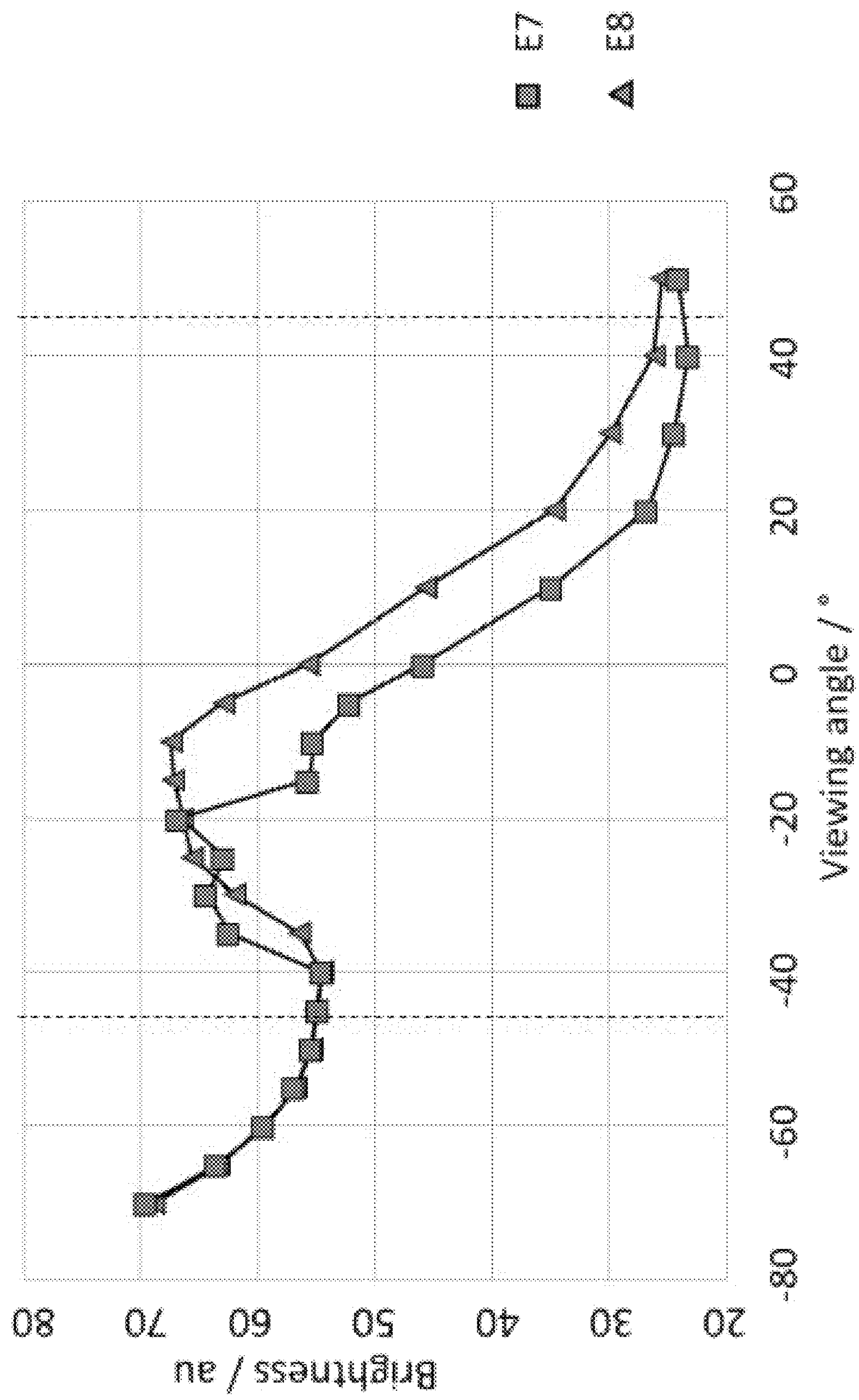
FIG. 9A-B illustrates curves of brightness values of two OELs comprising mono-axially oriented pigment particles with an elevation angle γ of about 20°, wherein the OELs have been printed on a transparent PET substrate disposed on a black substrate (FIG. 9A) or on a white substrate (FIG. 9B). The y-axis represents the brightness of the OEL in arbitrary units as calculated on 100×100 pixels areas of OEL's pictures, the x-axis representing the observation angles θ.
Figure 9B:
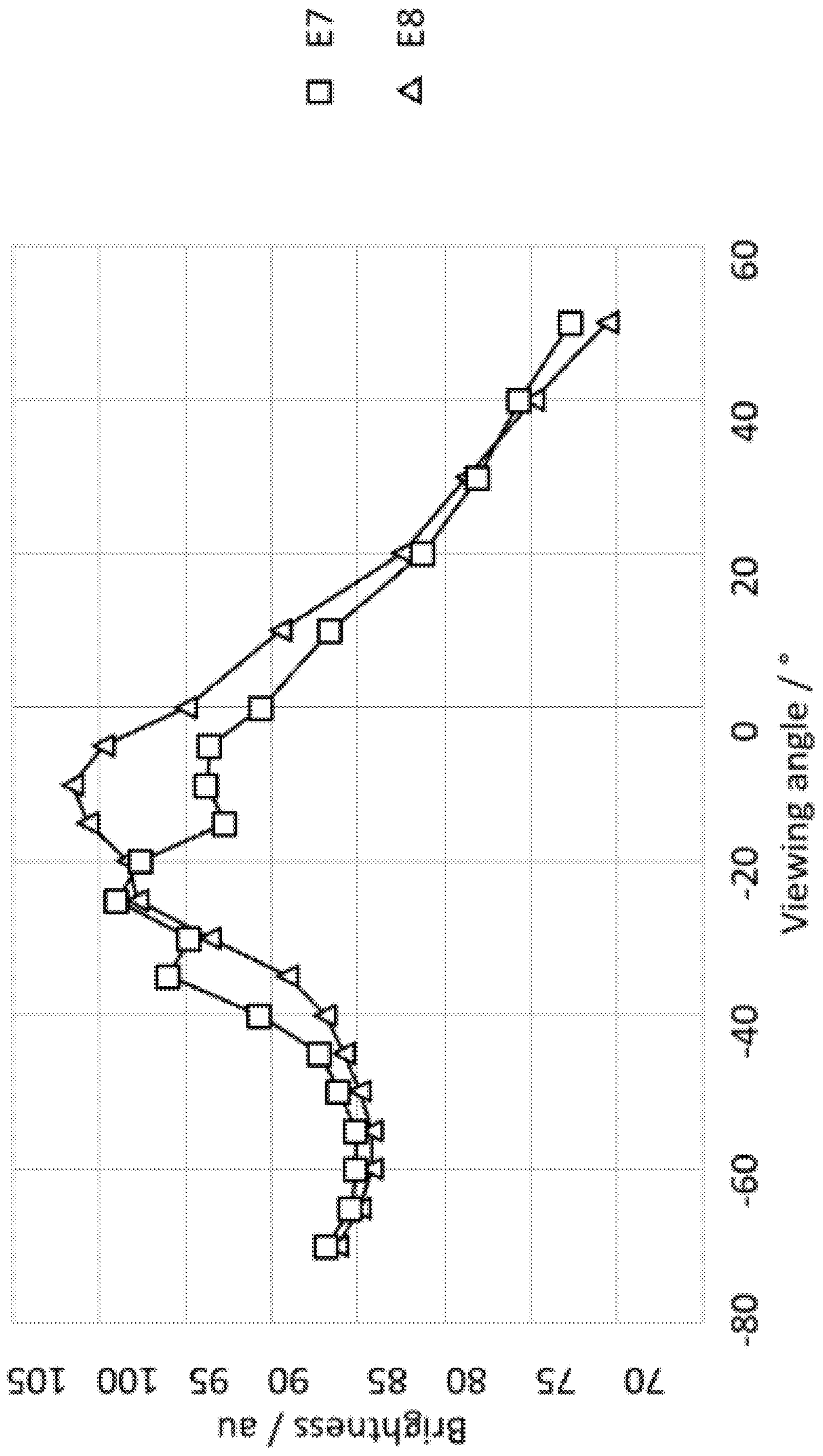

As shown in FIGS. 9A (black substrate) and 9B (white substrate), E7-E8 exhibited an easily observable increase and decrease of the brightness with a maximum value of brightness at an observation angles θ of about—(20°-25°) for E7 and—(10°-15°) for E8.

The invention claimed is:

1. A security document or a decorative article comprising a substrate having a two-dimensional surface and one or more optical effect layers on said substrate, wherein said one or more optical effect layers comprise magnetically oriented platelet-shaped magnetic or magnetizable pigment particles having a main axis X and being in an at least partially cured coating layer, wherein an orientation of the platelet-shaped pigment particles is defined by a platelet vector which is a vector parallel to the main axis X of each particle, wherein the platelet vectors of neighboring platelet-shaped magnetic or magnetizable pigment particles are substantially parallel to each other, wherein the platelet vectors of the platelet-shaped magnetic or magnetizable pigment particles are angled with respect to the two-dimensional surface of the substrate at positions of each of the particles by an elevation angle γ, said elevation angle γ being larger than 0° and smaller than 30° (0°<γ<30°) or larger than 150° and smaller than 180° (150°<γ<180°), so that the one or more optical effects layers exhibit an increase of brightness to reach a maximum value of brightness and a decrease of brightness within a viewing angle from −45° to +45° of the substrate.

2. The security document or article according to claim 1, wherein at least a part of the platelet-shaped magnetic or magnetizable particles is constituted by platelet-shaped optically variable magnetic or magnetizable pigment particles.

3. The security document or article according to claim 1, wherein at least a part of the platelet-shaped magnetic or magnetizable particles is constituted by platelet-shaped magnetic or magnetizable pigment particles exhibiting a metallic color.

4. The security document or article according to claim 3, wherein the metallic color is a silver color or a gold color.

5. The security document or article according to claim 1, wherein the platelet-shaped magnetic or magnetizable particles are substantially parallel to each other.

6. The security document or article according to claim 1, further comprising one or more indicia, said one or more indicia being present between the substrate and the one or more optical effect layers.

7. The security document or article according to claim 1, wherein the one or more optical effect layers comprise the magnetically oriented platelet-shaped magnetic or magnetizable pigment particles in the at least partially cured coating layer and comprise magnetically oriented second platelet-shaped magnetic or magnetizable pigment particles in an at least partially cured second coating layer, wherein the at least partially cured second coating layer is either at least partially or fully overlapping the at least partially cured coating layer, or the at least partially cured second coating layer is adjacent to the at least partially cured coating layer, or the at least partially cured second coating layer is spaced apart from the at least partially cured coating layer, wherein the platelet vectors of the second platelet-shaped magnetic or magnetizable pigment particles are angled with respect to the two-dimensional surface of the substrate at positions of each of the particles by an additional elevation angle γ' in the at least partially cured second coating layer, the additional elevation angle γ being larger than 0° and smaller than 30° (0°<γ'<30°) or larger than 150° and smaller than 180° (150°<γ'<180°), said elevation angle γ and additional elevation angle γ being different from each other and/or being not coplanar.

8. The security document or article according to claim 1, wherein the said elevation angle γ is larger than or equal to 5° and smaller than 30° (5°≤γ<30°) or larger than 150° and smaller than or equal to 175° (150°<γ≤175°).

9. The security document or article according to claim 8, wherein the said elevation angle γ is in the range from 5° to 25° (5°≤γ≤25°) or from 155° to 175° (155°≤γ≤175°).

10. A method for producing an optical effect layer on a substrate having a two-dimensional surface, said method comprising the steps of:

a) applying on the substrate surface a radiation curable coating composition comprising platelet-shaped magnetic or magnetizable pigment particles, said radiation curable coating composition being in a first, liquid state so as to form a coating layer;

b) exposing the coating layer to a magnetic field of a magnetic-field generating device in one or more areas wherein the magnetic field is substantially homogeneous so as to orient at least a part of the platelet-shaped magnetic or magnetizable pigment particles, wherein the substrate carrying the coating layer is provided in said one or more areas wherein the magnetic field is substantially homogeneous with an angle α, formed by the coating layer and a tangent to magnetic field lines of the magnetic field within the one or more areas wherein the magnetic field is substantially homogeneous, being larger than 0° and smaller than 30° (0°<α<30°) or larger than 150° and smaller than 180° (150°<α<180°)

c) partially simultaneously with or subsequently to step b), a step of at least partially curing the coating layer with a curing unit so as to at least partially fix a position and orientation of the platelet-shaped magnetic or magnetizable pigment particles in the coating layer so as to produce an at least partially cured coating layer, wherein an orientation of the platelet-shaped pigment particles is defined by a platelet vector which is a vector parallel to the main axis X of each particle, wherein the platelet vectors of neighboring platelet-shaped magnetic or magnetizable pigment particles are substantially parallel to each other, and wherein the platelet vectors of the platelet-shaped magnetic or magnetizable pigment particles are angled with respect to the two-dimensional surface of the substrate at positions of each of the particles by an elevation angle γ, said elevation angle γ being larger than 0° and smaller than 30° (0°<γ<30°) or larger than 150° and smaller than 180° (150°<γ<180°).

11. The method according to claim 10, wherein the platelet-shaped magnetic or magnetizable pigment particles have a second main axis Y and the orientation of the platelet-shaped pigment particles is further defined by a second platelet vector which is a vector parallel to the second main axis Y of each particle, and wherein the step b) of exposing the coating layer is carried out so as to bi-axially orient at least a part of the platelet-shaped magnetic or magnetizable pigment particles, so that the platelet vectors of neighboring platelet-shaped magnetic or magnetizable pigment particles are substantially parallel to each other and the second platelet vectors of said neighboring platelet-shaped magnetic or magnetizable pigment particles are substantially parallel to each other.

12. The method according to claim 11, wherein the step c) is carried out partially simultaneously with step b).

13. The method according to claim 10, wherein the optical effect layer comprise the at least partially cured coating layer comprising the platelet-shaped magnetic or magnetizable pigment particles and, at least partially on said at least partially cured coating layer, an at least partially cured second coating layer comprising second platelet-shaped magnetic or magnetizable pigment particles, wherein an orientation of each of the second platelet-shaped pigment particles is defined by the platelet vector which is a vector parallel to the main axis X of the second platelet-shaped pigment particles, wherein the platelet vectors of neighboring second platelet-shaped magnetic or magnetizable pigment particles are substantially parallel to each other, wherein the platelet vectors of the second platelet-shaped magnetic or magnetizable pigment particles are angled with respect to the two-dimensional surface of the substrate at positions of each of the particles by an additional elevation angle γ' being larger than 0° and smaller than 30° (0°<γ'<30°) or larger than 150° and smaller than 180° (150°<γ'<180°), said elevation angle γ and additional elevation angle γ' being different from each other and/or being not coplanar, the method further comprising:

subsequently to step c), a step d) of applying at least partially or fully on the at least partially cured coating layer a second radiation curable coating composition comprising the second platelet-shaped magnetic or magnetizable pigment particles, said second radiation curable coating composition being in a first, liquid state so as to form a second coating layer, wherein said second radiation curable coating composition is the same as or is different from the radiation curable coating composition of step a);

a step e) of exposing the second coating layer to a second magnetic field of a second magnetic-field generating device in one or more areas wherein the second magnetic field is homogeneous so as to orient at least a part of the second platelet-shaped magnetic or magnetizable pigment particles, wherein the substrate carrying the second coating layer is provided in said one or more areas wherein the magnetic field is substantially homogeneous with an angle α', formed by the second coating layer and a tangent to magnetic field lines of the second magnetic field within the one or more areas wherein the magnetic field is homogeneous, being larger than 0° and smaller than 30° (0°<α'<30°) or larger than 150° and smaller than 180° (150°<α'<180°), wherein the second magnetic-field generating device is the same or is different from the magnetic-field generating device of step b), α' being different from α; and f) partially simultaneously with or subsequently to the step e) of exposing the second coating layer to the second magnetic field, a step of at least partially curing the second coating layer with a curing unit so as to at least partially fix a position and orientation of the second platelet-shaped magnetic or magnetizable pigment particles in the second coating layer so as to produce the at least partially cured second coating layer.

14. The method according to claim 13, wherein the angle α' is larger than or equal to 5° and smaller than 30° (5°≤α'<30°) or larger than 150° and smaller than or equal to 175° (150°<α'≤175°).

15. The method according to claim 14, wherein the angle α' is in the range from 5° to 25° (5°≤α'≤25°) or from 155° to about 175° (155°≤α'≤175°).

16. The method according to claim 10, wherein the optical effect layer comprise the at least partially cured coating layer comprising the platelet-shaped magnetic or magnetizable pigment particles and an at least partially cured second coating layer comprising second platelet-shaped magnetic or magnetizable pigment particles, wherein an orientation of each of the second platelet-shaped pigment particles is defined by the platelet vector which is a vector parallel to the main axis X of the second platelet-shaped pigment particles, wherein the platelet vectors of neighboring second platelet-shaped magnetic or magnetizable pigment particles are substantially parallel to each other, the at least partially cured second coating layer being adjacent to or spaced apart from the at least partially cured coating layer, wherein the platelet vectors of the second platelet-shaped magnetic or magnetizable pigment particles are angled with respect to the two-dimensional surface of the substrate at positions of each of the particles by an additional elevation angle γ' in the at least partially cured second coating layer, the additional elevation angle γ being larger than 0° and smaller than 30° (0°<γ'<30°) or larger than 150° and smaller than 180° (150°<γ'<180°), said elevation angle γ and additional elevation angle γ' being different from each other and/or being not coplanar, the method further comprising:

subsequently to step c), a step d) of applying a second radiation curable coating composition comprising the second platelet-shaped magnetic or magnetizable pigment particles, said second radiation curable coating composition being in a first, liquid state so as to form a second coating layer, wherein said radiation curable coating composition is the same as or is different from the radiation curable coating composition of step a) and said second coating layer is adjacent to or spaced apart from the at least partially cured coating layer;

a step e) of exposing the second coating layer to a second magnetic field of a second magnetic-field generating device in one or more areas wherein the magnetic field is homogeneous so as to orient at least a part of the second platelet-shaped magnetic or magnetizable pigment particles, wherein the substrate carrying the second coating layer is provided in said one or more areas wherein the magnetic field is substantially homogeneous with an angle α', formed by the second coating layer and a tangent to magnetic field lines of the second magnetic field within the one or more areas wherein the magnetic field is substantially homogeneous, being larger than 0° and smaller than 30° (0°<α'<30° or larger than 150° and smaller than 180° (150°<α'<180°), wherein the second magnetic-field generating device is the same as or is different from the magnetic-field generating device of step b); α' being different from α;

f) partially simultaneously with or subsequently to the step e) of exposing the second coating layer to the second magnetic field, as step of at least partially curing the second coating layer with a curing unit so as to at least partially fix a position and orientation of the second platelet-shaped magnetic or magnetizable pigment particles in the second coating layer so as to produce the at least partially cured second coating layer.

17. The method according to claim 10, wherein the angle α is larger than or equal to 5° and smaller than 30° (5°≤α<30°) or larger than 150° and smaller than or equal to 175° (150°<α≤175°).

18. The method according to claim 17, wherein the angle α is in the range from 5° to 25° (5°≤α≤25°) or from 155° to 175° (155°≤α≤175°).

19. An optical effect layer produced by the method recited in claim 10.

* * * * *